US008798082B2

(12) United States Patent
Tanimoto

(10) Patent No.: US 8,798,082 B2

(45) Date of Patent: Aug. 5, 2014

(54) RELAY COMMUNICATION SYSTEM AND FIRST RELAY SERVER

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 280 days.

(21) Appl. No.: 13/320,034

(22) PCT Filed: May 13, 2010

(86) PCT No.: PCT/JP2010/003240

§ 371 (c)(1),
(2), (4) Date: Nov. 11, 2011

(87) PCT Pub. No.: WO2010/131468

PCT Pub. Date: Nov. 18, 2010

(65) Prior Publication Data

US 2012/0057602 A1 Mar. 8, 2012

(30) Foreign Application Priority Data

May 15, 2009 (JP) ................................. 2009-119157
Jul. 7, 2009 (JP) ................................. 2009-160795

(51) Int. Cl.

*H04L 12/28* (2006.01)
*H04L 12/46* (2006.01)
*H04L 29/08* (2006.01)
*G06F 13/00* (2006.01)

(52) U.S. Cl.

CPC ............ *H04L 12/4641* (2013.01); *H04L 12/46* (2013.01); *H04L 12/28* (2013.01); *H04L 12/4604* (2013.01); *G06F 13/00* (2013.01); *H04L 67/28* (2013.01)

USPC ........... 370/401; 370/400; 709/227; 709/228; 709/229

(58) Field of Classification Search

CPC ............ H04L 12/4641; H04L 61/2589; H04L 67/104; H04L 12/4675; H04L 63/0272; H04L 63/10; H04L 67/10; H04L 65/1069; H04L 12/28; H04L 49/354; H04L 45/66; H04L 45/02; H04L 41/0893; H04L 67/16; H04L 69/08; H04L 67/28; H04L 67/2838; H04L 67/2814; H04L 67/1059; H04L 67/1065; H04L 67/02; H04L 67/2842; H04L 12/4604; H04L 67/288; H04L 67/06; H04L 29/12528; H04L 67/14; H04L 29/12537; H04L 61/2578; H04L 61/2575

USPC .......... 370/401, 352–356; 709/228, 205, 225, 709/226, 227, 229, 238

See application file for complete search history.

(56) References Cited

U.S. PATENT DOCUMENTS

| | | | | |
|---|---|---|---|---|
| 6,574,656 | B1 | 6/2003 | Nagaoka et al. | |
| 2003/0028537 | A1 * | 2/2003 | Nakamura et al. .............. | 707/10 |
| 2003/0140637 | A1 | 7/2003 | Masui et al. | |
| 2003/0144872 | A1 | 7/2003 | Masui et al. | |
| 2004/0218611 | A1 | 11/2004 | Kim | |
| 2007/0097990 | A1 * | 5/2007 | Ozaki et al. .............. | 370/395.52 |
| 2007/0233844 | A1 | 10/2007 | Tanimoto | |
| 2008/0147825 | A1 | 6/2008 | Tanimoto | |
| 2008/0155082 | A1 * | 6/2008 | Ohtani et al. ................. | 709/223 |
| 2008/0225839 | A1 * | 9/2008 | Gobara et al. ................ | 370/389 |
| 2008/0298367 | A1 | 12/2008 | Furukawa | |
| 2009/0052436 | A1 * | 2/2009 | Kotera et al. ................. | 370/352 |
| 2009/0073969 | A1 * | 3/2009 | Gobara et al. ................ | 370/389 |
| 2009/0316708 | A1 * | 12/2009 | Yahyaoui et al. ............. | 370/401 |
| 2009/0319674 | A1 * | 12/2009 | Yahyaoui et al. ............. | 709/228 |
| 2011/0246624 | A1 * | 10/2011 | Kato et al. .................... | 709/219 |

FOREIGN PATENT DOCUMENTS

| | | | |
|---|---|---|---|
| JP | 09-168055 | A | 6/1997 |
| JP | 2000-059465 | A | 2/2000 |
| JP | 2002-217943 | A | 8/2002 |
| JP | 2002-247036 | A | 8/2002 |
| JP | 2004-213533 | A | 7/2004 |
| JP | 2004-229299 | A | 8/2004 |
| JP | 2005-157699 | A | 6/2005 |
| JP | 2006-202218 | A | 8/2006 |
| JP | 2006-337021 | A | 12/2006 |
| JP | 2007-267136 | A | 10/2007 |
| JP | 2007-310508 | A | 11/2007 |
| JP | 2008-028600 | A | 2/2008 |
| JP | 2008-092520 | A | 4/2008 |
| JP | 2008-129991 | A | 6/2008 |

| | | | |
|---|---|---|---|
| JP | 2010-178089 | A | 8/2010 |
| JP | 2010-256989 | A | 11/2010 |
| JP | 2010-267084 | A | 11/2010 |
| JP | 2010-278636 | A | 12/2010 |
| JP | 2011-055452 | A | 3/2011 |
| JP | 2011-055453 | A | 3/2011 |
| JP | 2011-055454 | A | 3/2011 |
| JP | 2011-160103 | A | 8/2011 |

OTHER PUBLICATIONS

Inai et al., "A Scalable Log Collecting Scheme for Host-Based Traffic Monitoring System," Information Processing Society of Japan Symposium Series, vol. 2008, No. 1, Jul. 2, 2008, 27 pages.
English translation of Official Communication issued in corresponding International Application PCT/JP2010/003240, mailed on Dec. 22, 2011.
Tanimoto, "Relay-Server Arranged to Carry Out Communications Between Communication Terminals on Different LANS," U.S. Appl. No. 11/853,943, filed Sep. 12, 2007.
Tanimoto, "File Server Device Arranged in a Local Area Network and Being Communicable With an External Service Arranged in a Wide Area Network," U.S. Appl. No. 11/862,654, filed Sep. 27, 2007.
Tanimoto, "File Transfer Server," U.S. Appl. No. 11/870,622, filed Oct. 11, 2007.
Tanimoto, "Relay Server and Client Terminal," U.S. Appl. No. 11/953,351, filed Dec. 10, 2007.
Tanimoto, "Relay Server, Relay Communication System, and Communication Device," U.S. Appl. No. 11/944,495, filed Nov. 23, 2007.
Tanimoto, "Relay Server and Relay Communication System Arranged to Share Resources Between Networks," U.S. Appl. No. 11/953,505, filed Dec. 10, 2007.
Tanimoto, "Relay Server and Relay Communication System," U.S. Appl. No. 12/103,933, filed Apr. 16, 2008.
Tanimoto, "Relay Server and Relay Communication System," U.S. Appl. No. 12/112,127, filed Apr. 30, 2008.
Tanimoto, "Relay Server and Relay Communication System," U.S. Appl. No. 12/107,793, filed Apr. 23, 2008.
Tanimoto, "Relay Server and Relay Communication System," U.S. Appl. No. 12/270,883, filed Nov. 14, 2008.
Tanimoto, "Relay Server ADN Relay Communication System," U.S. Appl. No. 12/335,642, filed Dec. 16, 2008.
Tanimoto, "Relay Server and Relay Communication System," U.S. Appl. No. 12/335,661, filed Dec. 16, 2008.
Tanimoto, "Relay Server and Relay Communication System," U.S. Appl. No. 12/340,868, filed Dec. 22, 2008.
Tanimoto, "Relay Server and Relay Communication System," U.S. Appl. No. 13/061,234, filed Feb. 28, 2011.
Tanimoto, "Relay Server, Relay Communication System, amd Communication Apparatus," U.S. Appl. No. 13/061,725, filed Mar. 2, 2011.
Tanimoto, "Relay Server, Communication System and Facsimile System," U.S. Appl. No. 10/045,698, filed Jan. 10, 2002.
Tanimoto, "Relay Server, Communication System and Facsimile System," U.S. Appl. No. 10/045,897, filed Jan. 10, 2002.
Tanimoto, "Relay Server for Relaying Communications Between Network Devices," U.S. Appl. No. 10/114,720, filed Apr. 1, 2002.
Tanimoto, "Relay Server," U.S. Appl. No. 10/114,963, filed Apr. 2, 2002.
Tanimoto, "Relay Server, Network Device, Communication System, and Communication Method," U.S. Appl. No. 10/116,615, filed Apr. 2, 2002.
Tanimoto, "Relay Device and Communication System," U.S. Appl. No. 11/723,466, filed Mar. 20, 2007.
Tanimoto, "Relay Device and Communication System," U.S. Appl. No. 13/341,711, filed Dec. 30, 2011.
Tanimoto, "First Relay Server and Second Relay Server," U.S. Appl. No. 13/255,958, filed Oct. 3, 2011.
Tanimoto et al., "Relay Communication System and Access Management Apparatus," U.S. Appl. No. 13/390,561, filed Feb. 15, 2012.
Tanimoto, "Relay Server and Relay Communication System," U.S. Appl. No. 13/496,664, filed Mar. 16, 2012.
Official Communication issued in International Patent Application No. PCT/JP2010/003240, mailed on Jun. 15, 2010.
Tanimoto, "Relay Server and Relay Communication System Arranged to Share Resources Between Networks." U.S. Appl. No. 13/153,497, filed Jun. 6, 2011.

* cited by examiner

*Primary Examiner* — Asad Nawaz
*Assistant Examiner* — Najeebuddin Ansari
(74) *Attorney, Agent, or Firm* — Keating & Bennett, LLP

(57) ABSTRACT

A relay communication system includes a first client terminal which creates routing group information including network addresses of first and second LANs, and identification information of the first client terminal and a second client terminal which execute routing processing, and which shares the routing group information with the second client terminal. Based on the routing group information, a routing session is established between the first and second client terminals. A communication terminal connected to the first LAN sends out a communication packet in which an IP address of a communication terminal connected to the second LAN is designated. The communication packet is encapsulated by the first client terminal, and is routed by using the routing session.

7 Claims, 45 Drawing Sheets

51-1

```
<?xml version="1.0" encoding="UTF-8"?>
-<root>
  -<site id="relay-server-1@abc.net"
    name="RELAY SERVER 1" stat="active">              } 511-1
    -<node div="software" group=""          513-1
      id="client-11@relay-server-1.abc.net"
      name="CLIENT 11" site="relay-server-1@abc.net"/>   } 512-1
    -<node div="software" group=""               514-1
      id="client-12@relay-server-1.abc.net"
      name="CLIENT 12" site=""/>
  </site>                                514-1
</root>
```

61

```
<?xml version="1.0" encoding="UTF-8"?>
-<root>
  -<node addr="192.168.1.11"   611
    div="software" expr="1213"   612
    group=""
    id="client-11@relay-server-1.abc.net"
    name="CLIENT 11" pass="abc" port="5070">
   </node>                               613
  -<node addr=""   611
    div="software" expr="0"   612
    group=""
    id="client-12@relay-server1.abc.net"
    name="CLIENT 12" pass="def" port="0">
   </node>                               613
</root>
```

```
 <?xml version="1.0" encoding="UTF-8"?>
-<root>
  -<site id="relay-server-1@abc.net"
    name="RELAY SERVER 1" stat="active">                    } 521-1
    -<node div="software" group=""
       id="client-11@relay-server-1.abc.net"
       name="CLIENT 11" site="relay-server-1@abc.net"/>     } 522-1
    -<node div="software" group=""              524-1
       id="client-12@relay-server-1.abc.net"
       name="CLIENT 12" site="relay-server-1@abc.net"/>
   </site>                                       524-1
 </root>
```

62

```
 <?xml version="1.0" encoding="UTF-8"?>
-<root>
  -<node addr="192.168.1.11"
     div="software" expr="1213"
     group=""
     id="client-11@relay-server-1.abc.net"
     name="CLIENT 11" pass="abc" port="5070">
   </node>                                   621
  -<node addr="192.168.2.22"
     div="software" expr="1213"  622
     group=""
     id="client-12@relay-server1.abc.net"
     name="CLIENT 12" pass="def" port="5070">
   </node>                                  623
 </root>
```

FIG. 6

```
                                    ┌─51-2
┌─────────────────────────────────────────────────────┐
│ <?xml version="1.0" encoding="UTF-8"?>              │
│ -<root>                                             │
│   -<site id="relay-server-2@abc.net"      ⎫ 511-2   │
│     name="RELAY SERVER 2" stat="active">  ⎭ ─────   │
│     -<node div="sales"      ⌐513-2                  │
│       group=""                            ⎫         │
│       id="client-21@relay-server-2.abc.net"⎬ 512-2  │
│       name="CLIENT 21" site="relay-server-2@abc.net"/>⎭ ─────│
│   </site>              ⌐514-2                       │
│ </root>                                             │
└─────────────────────────────────────────────────────┘

                                    ┌─71
┌─────────────────────────────────────────────────────┐
│ <?xml version="1.0" encoding="UTF-8"?>              │
│ -<root>                    ⌐711                     │
│   -<node addr="192.100.1.21"                        │
│     div="sales" expr="1213"⌐ 712                    │
│     group=""                                        │
│     id="client-21@relay-server-2.abc.net"           │
│     name="CLIENT 21" pass="nhy" port="5070">        │
│   </node>                  ⌐713                     │
│ </root>                                             │
└─────────────────────────────────────────────────────┘
```

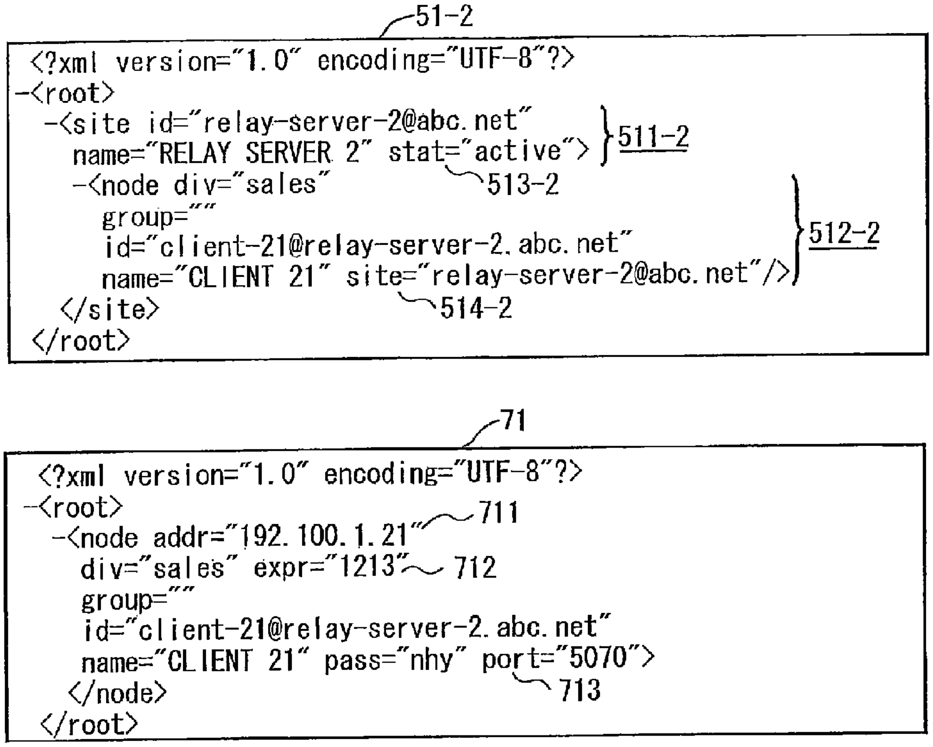

```
<?xml version="1.0" encoding="UTF-8"?>
-<root>
  -<site id="relay-server-3@abc.net"
    name="RELAY SERVER 3" stat="active">                    } 511-3
    -<node div="manufacture"        513-3
      group=""
      id="client-31@relay-server-3.abc.net"
      name="CLIENT 31" site="relay-server-3@abc.net"/>      } 512-3
    -<node div="manufacture"                 514-3
      group=""
      id="client-32@relay-server-3.abc.net"
      name="CLIENT 32" site=""/>
  </site>                    514-3
</root>
```

81

```
<?xml version="1.0" encoding="UTF-8"?>
-<root>
  -<node addr="200.1.2.31"   811
    div="manufacture" expr="1213"   812
    group=""
    id="client-31@relay-server-3.abc.net"
    name="CLIENT 31" pass="xyz" port="5070">
   </node>                              813
  -<node addr=""   811
    div="manufacture" expr="0"   812
    group=""
    id="client-32@relay-server-3.abc.net"
    name="CLIENT 32" pass="123" port="0">
   </node>                              813
</root>
```

```
 <?xml version="1.0" encoding="UTF-8"?>
-<root>
  -<site id="relay-server-3@abc.net"
    name="RELAY SERVER 3" stat="active">   } 521-3
    -<node div="manufacture"
      group=""
      id="client-31@relay-server-3.abc.net"
      name="CLIENT 31" site="relay-server-3@abc.net"/>   } 522-3
    -<node div="manufacture"
      group=""
      id="client-32@relay-server-3.abc.net"
      name="CLIENT 32" site="relay-server-3@abc.net"/>
                             524-3
   </site>
 </root>
```

82

```
 <?xml version="1.0" encoding="UTF-8"?>
-<root>
  -<node addr="200.1.2.31"
    div="manufacture" expr="1213"
    group=""
    id="client-31@relay-server-3.abc.net"
    name="CLIENT 31" pass="xyz" port="5070">
   </node>
  -<node addr="200.1.3.132"   ~821
    div="manufacture" expr="1213"   ~822
    group=""
    id="client-32@relay-server-3.abc.net"
    name="CLIENT 32" pass="123" port="5070">
   </node>                  823
 </root>
```

```
<?xml version="1.0" encoding="UTF-8" standalone="no"?>
-<root>
  -<group id="group-a@relay-server-1.abc.net"
     lastmod="20070402133100" name="GROUP A">          } 411
     <site id="relay-server-1@abc.net" rel="allow"/>  }
     <site id="relay-server-2@abc.net" rel="allow"/>  } 412
     <site id="relay-server-3@abc.net" rel="allow"/>  }
   </group>
 </root>
```

52-1

```
<?xml version="1.0" encoding="UTF-8"?>
-<root>
  -<site id="relay-server-1@abc.net"
     name="RELAY SERVER 1" stat="active">  } 521-1
    -<node div="software" group=""
       id="client-11@relay-server-1.abc.net"
       name="CLIENT 11" site="relay-server-1@abc.net"/>  } 522-1
    -<node div="software" group=""
       id="client-12@relay-server-1.relay.net"
       name="CLIENT 12" site="relay-server-1@abc.net"/>
   </site>
 </root>
```

62

```
<?xml version="1.0" encoding="UTF-8"?>
-<root>
  -<node addr="192.168.1.11"
     div="software" expr="1213"
     group=""
     id="client-11@relay-server-1.abc.net"
     name="CLIENT 11" pass="abc" port="5070">
   </node>
  -<node addr="192.168.2.22"
     div="software" expr="1213"
     group=""
     id="client-12@relay-server-1.abc.net"
     name="CLIENT 21" pass="def" port="5070">
   </node>
 </root>
```

NO CHANGE FROM FIG. 11

53

```
<?xml version="1.0" encoding="UTF-8"?>
-<root>
  -<site id="relay-server-1@abc.net"
    name="RELAY SERVER 1" stat="active">                      } 531-1
    -<node div="software"
      group="group-a@relay-server-1.abc.net"
      id="client-11@relay-server-1.abc.net"
      name="CLIENT 11" site="relay-server-1@abc.net"/>
    -<node div="software"                                       } 532-1
      group="group-a@relay-server-1.abc.net"
      id="client-12@relay-server-1.abc.net"
      name="CLIENT 12" site="relay-server-1@abc.net"/>
   </site>
  -<site id="relay-server-2@abc.net"
    name="RELAY SERVER 2" stat="active">                      } 531-2
    -<node div="sales"
      group="group-a@relay-server-1.abc.net"                  } 532-2
      id="client-21@relay-server-2.abc.net"
      name="CLIENT 21" site="relay-server-2@abc.net"/>
   </site>
  -<site id="relay-server-3@abc.net"
    name="RELAY SERVER 3" stat="active">                      } 531-3
    -<node div="manufacture"
      group="group-a@relay-server-1.abc.net"
      id="client-31@relay-server-3.abc.net"
      name="CLIENT 31" site="relay-server-3@abc.net"/>
    -<node div="manufacture"                                    } 532-3
      group="group-a@relay-server-1.abc.net"
      id="client-32@relay-server-3.abc.net"
      name="CLIENT 32" site="relay-server-3@abc.net"/>
   </site>
 </root>
```

63

```
<?xml version="1.0" encoding="UTF-8"?>
-<root>
  -<node addr="192.168.1.11"
    div="software" expr="1213"
    group="group-a@relay-server-1.abc.net"
    id="client-11@relay-server-1.abc.net"
    name="CLIENT 11" pass="abc" port="5070">
   </node>
  -<node addr="192.168.2.22"
    div="software" expr="1213"
    group="group-a@relay-server-1.abc.net"
    id="client-12@relay-server-1.abc.net"
    name="CLIENT 12" pass="def" port="5070">
   </node>
 </root>
```

NO CHANGE FROM FIG. 12

53

NO CHANGE FROM FIG. 12

72

```
<?xml version="1.0" encoding="UTF-8"?>
-<root>
  -<node addr="192.100.1.21"
     div="salse" expr="1213"
     group="group-a@relay-server-1.abc.net"
     id="client-21@relay-server-2.abc.net"
     name="CLIENT 21" pass="nhy" port="5070">
    </node>
 </root>
```

NO CHANGE FROM FIG. 12

53

NO CHANGE FROM FIG. 12

83

```
<?xml version="1.0" encoding="UTF-8"?>
-<root>
  -<node addr="200.1.2.31"
     div="manufacture" expr="1213"
     group="group-a@relay-server-1.abc.net"
     id="client-31@relay-server-3.abc.net"
     name="CLIENT 31" pass="xyz" port="5070">
   </node>
  -<node addr="200.1.3.132"
     div="manufacture" expr="1213"
     group="group-a@relay-server-1.abc.net"
     id="client-32@relay-server-3.abc.net"
     name="CLIENT 32" pass="123" port="5070">
   </node>
</root>
```

```
<?xml version="1.0" encoding="UTF-8" standalone="no"?>
<root>
  <iprouting group="routing-a"
    id="-397de" lastmod="1215530239484"
    name="IP-routing-group-1"
    owner="client-11@relay-server-1.abc.net">                          911
    <routing_network id="3407e8" lastmod="1215530239484">
      <network addr="192.168.2.0/24"
        router="client-11@relay-server-1.abc.net"/>        912-1
      <network addr="192.100.1.0/24"
        router="client-21@relay-server-2.abc.net"/>        912-2
      <network addr="200.1.2.0/24"
        router="client-31@relay-server-3.abc.net"/>        912-3
    </routing_network>                                                 912
    <routing_terminal id="-120ef" lastmod="1215531987906">
      <terminal lastmod="1215562271562"
        name="pc-16" addr="192.168.2.150"/>    913-1
      <terminal lastmod="1215562271562"
        name="pc-23" addr="192.100.1.150"/>    913-2
      <terminal lastmod="1215562271562"
        name="LAN30-2" addr="200.1.2.*"/>      913-3
    </routing_terminal>                                                913
    <routing_session id="3407e8" lastmod="1215530239484">
      <session start="client-11@relay-server-1.abc.net"
        end="client-21@relay-server-2.abc.net"/>    914-1
      <session start="client-11@relay-server-1.abc.net"
        end="client-31@relay-server-3.abc.net"/>    914-2
      <session start="client-21@relay-server-2.abc.net"
        end="client-31@relay-server-3.abc.net"/>    914-3
    </routing_session>                                                 914
  </iprouting>
</root>
```

```
<?xml version="1.0" encoding="UTF-8" standalone="no"?>
<root>
  <iprouting group="routing-a"
    id="-397de" lastmod="1215530239484"
    name="IP-routing-group-1"
    owner="client-11@relay-server-1.abc.net">
    <routing_network id="3407e8" lastmod="1215530239484">                 } 922
      <network addr="192.168.1.0/24"
        router="relay-server-1@abc.net"/>                                  } 922-1
      <network addr="200.1.3.0/24"
        router="client-32@relay-server-3.abc.net"/>                        } 922-2
    </routing_network>
    <routing_terminal id="-120ef" lastmod="1215531987906">                } 923
      <terminal lastmod="1215562271562"
        name="pc-15" addr="192.168.1.150"/>                                } 923-1
      <terminal lastmod="1215562271562"
        name="LAN30-3" addr="200.1.3.*"/>                                  } 923-2
    </routing_terminal>
    <routing_session id="3407e8" lastmod="1215530239484">                 } 924
      <session start="relay-server-1@abc.net"
        end="client-32@relay-server-3.abc.net"/>                           } 924-1
    </routing_session>
  </iprouting>
</root>
```

FIG. 22

```xml
<?xml version="1.0" encoding="UTF-8" standalone="no"?>
<root>
    <iprouting group="routing-a"
        id="-397de" lastmod="1359821645742"
        name="IP-routing-group-1"
        owner="client-11@relay-server-1.abc.net">
        <routing_network id="3407e8" lastmod="1359821645742">
            <network addr="192.168.2.0/24"
                router="client-11@relay-server-1.abc.net"/>
            <network addr="200.1.3.0/24"
                router="client-32@relay-server-3.abc.net"/>
            <network addr="200.1.2.0/24"
                router="client-31@relay-server-3.abc.net"/>
        </routing_network>
        <routing_terminal id="-120ef" lastmod="1359821645742">
            <terminal lastmod="1359821645742"
                name="pc-16" addr="192.168.2.150"/>
            <terminal lastmod="1359821645742"
                name="LAN30-3" addr="200.1.3.*"/>
            <terminal lastmod="1359821645742"
                name="LAN30-2" addr="200.1.2.*"/>
        </routing_terminal>
        <routing_session id="3407e8" lastmod="1359821645742">
            <session start=client-11@relay-server-1.abc.net
                end="client32@relay-server-3.abc.net"/>
            <session start=client-11@relay-server1.abc.net
                end="client-31@relay-server-3.abc.net"/>
            <session start=client-31@relay-server3.abc.net
                end="client-32@relay-server-3.abc.net"/>
        </routing_session>
    </iprouting>
</root>
```

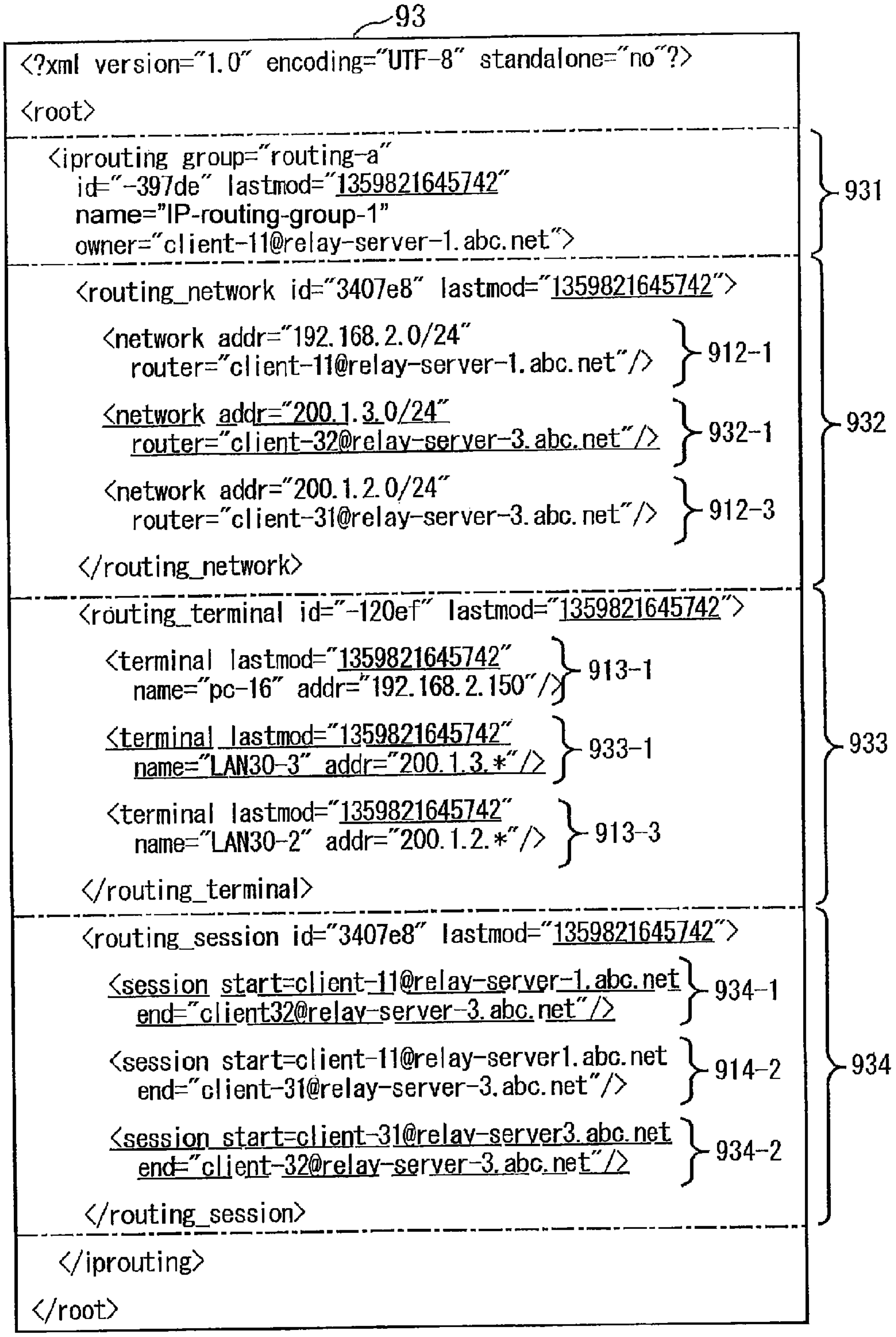

```
<?xml version="1.0" encoding="UTF-8" standalone="no"?>
<root>
  <iprouting group="routing-a"
    id="-397de" lastmod="1215530239484"
    name="IP routing map"
    owner="relay-server-2@abc.net">                              } 1911
    <routing_network id="3407e8" lastmod="1215530239484">          ⎫
      <network addr="192.100.1.0/24"                               ⎪
        router="client-21@relay-server-2.abc.net"/>  } 1912-1      ⎪
      <network addr="192.100.1.0/24"                               ⎬ 1912
        router="relay-server-2@abc.net"/>  } 1912-2                ⎪
    </routing_network>                                             ⎭
  </iprouting>
</root>
```

```
<?xml version="1.0" encoding="UTF-8" standalone="no"?>
<root>
  <iprouting group="routing-a"
    id="-397de" lastmod="1215530239484"
    name="IP routing map"
    owner="relay-server-3@abc.net">                              } 1921
    <routing_network id="3407e8" lastmod="1215530239484">
      <network addr="200.1.2.0/24"
        router="client-31@relay-server-3.abc.net"/>  } 1922-1
      <network addr="200.1.3.0/24"
        router="client-32@relay-server-3.abc.net"/>  } 1922-2
        </routing_network>                                       } 1922
    </iprouting>
</root>
```

```
<?xml version="1.0" encoding="UTF-8" standalone="no"?>
<root>
  <iprouting group="routing-a"
    id="-397de" lastmod="1215530239484"
    name="IP routing map"
    owner="client-11@relay-server-1.abc.net">
    <routing_network id="3407e8" lastmod="1215530239484">
      <network addr="192.100.1.0/24"
       router="client-21@relay-server-2.abc.net"/>
      <network addr="192.100.1.0/24"
       router="relay-server-2@abc.net"/>
      <network addr="200.1.2.0/24"
       router="client-31@relay-server-3.abc.net"/>
      <network addr="200.1.3.0/24"
       router="client-32@relay-server-3.abc.net"/>
      <network addr="192.168.1.0/24"
       router="relay-server-1@abc.net"/>
      <network addr="192.168.2.0/24"
       router="client-11@relay-server-1.abc.net"/>
    </routing_network>
  </iprouting>
</root>
```

| ROUTING TARGET IP ADDRESS | ROUTING DEVICE |
|---|---|
| 192.100.1.0 | client-21@relay-server-2.abc.net<br>relay-server-2@abc.net |
| 200.1.2.0 | client-31@relay-server-3.abc.net |
| 200.1.3.0 | client-32@relay-server-3.abc.net |
| 192.168.1.0 | relay-server-1@abc.net |
| 192.168.2.0 | client-11@relay-server-3.abc.net |

```
<?xml version="1.0" encoding="UTF-8" standalone="no"?>
<root>
  <iprouting group="routing-a"
    id="-397de" lastmod="1215530239484"
    name="IP-routing-group-1"
    owner="client-11@relay-server-1.abc.net">            1951
    <routing_network id="3407e8" lastmod="1215530239484">
      <network addr="192.168.1.0/24"
        router="relay-server-1@abc.net"/>                1952-1
      <network addr="200.1.3.0/24"
        router="client-32@relay-server-3.abc.net"/>      1952-2
    </routing_network>                                   1952
  </iprouting>
</root>
```

```
<?xml version="1.0" encoding="UTF-8" standalone="no"?>
<root>
  <iprouting group="routing-a"
    id="-397dc" lastmod="1215530239484"
    name="IP-routing-group-1"
    owner="client-11@relay-server-1.abc.net">                              1951
    <routing_network id="3407e8" lastmod="1215530239484">                  1952
      <network addr="192.168.1.0/24"
        router="relay-server-1@abc.net"/>                                  1952-1
      <network addr="200.1.3.0/24"
        router="client-32@relay-server-3.abc.net"/>                        1952-2
    </routing_network>
    <routing_terminal id="-120ef" lastmod="1215531987906">                 1963
      <terminal lastmod="1215562271562"
        name="LAN10-1" addr="192.168.1.*"/>                                1963-1
      <terminal lastmod="1215562271562"
        name="LAN30-3" addr="200.1.3.*"/>                                  1963-2
    </routing_terminal>
    <routing_session id="3407e8" lastmod="1215530239484">                  1964
      <session start="relay-server-1@abc.net"
        end="client-32@relay-server-3.abc.net"/>                           1964-1
    </routing_session>
  </iprouting>
</root>
```

FIG. 44

RELAY COMMUNICATION SYSTEM AND FIRST RELAY SERVER

BACKGROUND OF THE INVENTION

1. Field of the Invention

The present invention relates to a relay communication system that enables client terminals connected to local area networks (LANs) to communicate with one another beyond a wide area network (WAN).

2. Description of the Related Art

By using a virtual private network (VPN), a client terminal can communicate with another client terminal remotely located beyond a WAN. However, it is difficult for the VPN to construct a network having expandability and flexibility.

A relay communication system disclosed in Japanese Patent Laid-Open Publication No. 2008-129991 can construct a network which appears as if remote LANs were directly connected to one another in a similar way to the VPN. This relay communication system is superior in terms of expandability and flexibility to the general VPN in that it is possible to dynamically change a group relationship among the LANs, and so on.

In the relay communication system disclosed in Japanese Patent Laid-Open Publication No. 2008-129991, the respective relay servers share identification information of the client terminals connected to the respective LANs, thus enabling communication among the client terminals. Specifically, association information between identification information of the relay servers and identification information of the client terminals is shared by the entire network, thus making it possible for the relay servers to relay communication packets among the client terminals.

SUMMARY OF THE INVENTION

Preferred embodiments of the present invention provide a communication method having excellent flexibility and expandability in a communication system in which client terminals communicate with one another through a WAN.

A relay communication system according to a preferred embodiment of the present invention includes a first relay server connected to a first LAN and a second relay server connected to a second LAN that are connected to each other. Each of the first relay server and the second relay server preferably includes a relay server information sharing unit, a routing group information sharing unit, and a routing control unit. The relay server information sharing unit shares relay server information between the first relay server and the second relay server, the relay server information including activation information of the first relay server and the second relay server, and activation/registration information of client terminals connected to the first relay server and the second relay server. The routing group information sharing unit shares routing group information with a first routing device that executes routing control for the first LAN and a second routing device that executes routing control for the second LAN, the routing group information including a network address of the first LAN, a network address of the second LAN, first specifying information that specifies either a relay server or a client terminal, which is the first routing device, and second specifying information that specifies either a relay server or a client terminal, which is the second routing device. Upon receiving a request to start routing control, preferably, the routing control unit specifies the first routing device and the second routing device from the first specifying information and the second specifying information, which are included in the routing group information, establishes a routing session between the first routing device and the second routing device based on the relay server information, executes routing control for a communication packet between the first LAN and the second LAN through the routing session, and, upon receiving an instruction to end the routing control, disconnects the routing session, and ends the routing control for the communication packet between the first LAN and the second LAN. When a first communication packet destined for a destination address of an IP address belonging to the second LAN is sent out from a communication terminal connected to the first LAN, the first routing device refers to the routing group information to decide that routing of the first communication packet to the second LAN is possible, and transfers the first communication packet by using the established routing session.

Preferably, a plurality of relay servers including the first relay server and the second relay server are connected to one another through a wide area network, and the routing group information includes network addresses of LANs to which the relay servers connect, and information that specifies routing devices executing routing control for LANs to which the relay servers connect.

Preferably, the first routing device is a client terminal connected to the first relay server, and is arranged to perform communication with the second relay server through the first relay server.

Preferably, the second routing device is the second relay server.

Preferably, the first relay server and the second relay server are defined by the same device, the first routing device is a first client terminal connected to the first relay server, and the second routing device is a second client terminal connected to the first relay server.

Preferably, the routing group information includes permitted terminal information in which an address of the communication terminal connected to the first LAN is registered, and in a case in which a transmission source address of the first communication packet is registered in the permitted terminal information, the first routing device permits routing of the first communication packet.

Preferably, the routing group information includes permitted terminal information in which an address of the communication terminal connected to the second LAN is registered, and in a case in which a destination address of the first communication packet is registered in the permitted terminal information, the first routing device permits routing of the first communication packet.

A relay communication system according to another preferred embodiment of the present invention includes a first relay server connected to a first LAN and a second relay server connected to a second LAN are connected to each other. The first relay server preferably includes a relay server information sharing unit, an acquisition unit, a request unit, and a routing setting information creation unit. The relay server information sharing unit is arranged to share relay server information with the second relay server, the relay server information including activation information of the first relay server and the second relay server, and activation/registration information of client terminals connected to the first relay server and the second relay server. The acquisition unit acquires first specifying information specifying either a relay server or a client terminal, which is a first routing device executing routing control for the first LAN based on a network address of the first LAN. The request unit requests the second relay server to provide second specifying information specifying either a relay server or a client terminal, which is a second routing device executing routing control for the second LAN based on a network address of the second LAN. The routing setting information creation unit creates routing setting information based on the first specifying information and the second specifying information, the routing setting information including information in which the network address of the first LAN and the first routing device are associated with each other, and information in which the network address of the second LAN and the second routing device are associated with each other. The second relay server preferably includes a response unit that, in response to a request from the request unit, acquires the second specifying information, and transmits the second specifying information to the first relay server. Each of the first relay server and the second relay server preferably includes a sharing unit, and a routing control unit. The sharing unit shares the routing setting information. Upon receiving a request to start routing control, the routing control unit specifies the first routing device and the second routing device based on the routing setting information, establishes a routing session between the first routing device and the second routing device based on the relay server information, executes routing control for a communication packet between the first LAN and the second LAN through the routing session, and, upon receiving an instruction to end the routing control, disconnects the routing session, and ends the routing control for the communication packet between the first LAN and the second LAN. When a communication packet destined for a destination address as an IP address belonging to the second LAN is sent out from a communication terminal connected to the first LAN, the first routing device refers to the routing setting information to determine that routing of the communication packet to the second LAN is possible, and transfers the communication packet by using the established routing session.

Preferably, the first relay server further includes a list creation unit that searches LANs capable of routing control, and creates a list of the LANs, and a selection unit that selects the network address of the first LAN and the network address of the second LAN by using the list.

Preferably, the first routing device is a client terminal connected to the first relay server, and is arranged to perform communication with the second relay server through the first relay server, and the client terminal shares the routing setting information with the first relay server and the second relay server.

Preferably, the second routing device is the second relay server.

A first relay server according to another preferred embodiment of the present invention is preferably a first relay server for use in a relay communication system in which the first relay server connected to a first LAN and a second relay server connected to a second LAN are connected to each other, the first relay server preferably including a relay server information sharing unit, a routing group information sharing unit, and a routing control unit. The relay server information sharing unit shares relay server information with the second relay server, the relay server information including activation information of the first relay server and the second relay server, and activation/registration information of client terminals connected to the first relay server and the second relay server. The routing group information sharing unit shares routing group information with a first routing device that executes routing control for the first LAN and a second routing device that executes routing control for the second LAN, the routing group information including a network address of the first LAN, a network address of the second LAN, first specifying information that specifies either a relay server or a client terminal, which is the first routing device, and second specifying information that specifies either a relay server or a client terminal, which is the second routing device. Upon receiving a request to start routing control, the routing control unit preferably specifies the first routing device and the second routing device from the first specifying information and the second specifying information, which are included in the routing group information, establishes a routing session between the first routing device and the second routing device based on the relay server information, executes routing control for a communication packet between the first LAN and the second LAN through the routing session, and, upon receiving an instruction to end the routing control, disconnects the routing session, and ends the routing control for the communication packet between the first LAN and the second LAN. When a first communication packet destined for a destination address of an IP address belonging to the second LAN is sent out from a communication terminal connected to the first LAN, the first routing device refers to the routing group information to determine that routing of the first communication packet to the second LAN is possible, and transfers the first communication packet by using the established routing session.

A first relay server according to still another preferred embodiment of the present invention is preferably used for a relay communication system in which the first relay server connected to a first LAN and a second relay server connected to a second LAN are connected to each other, and includes a relay server information sharing unit, an acquisition unit, a request unit, a routing setting information creation unit, a sharing unit, and a routing control unit. The relay server information sharing unit shares relay server information with the second relay server, the relay server information including activation information of the first relay server and the second relay server, and activation/registration information of client terminals connected to the first relay server and the second relay server. The acquisition unit acquires first specifying information specifying either a relay server or a client terminal, which is a first routing device executing routing control for the first LAN based on a network address of the first LAN. The request unit requests the second relay server to provide second specifying information specifying either of a relay server or a client terminal, which is a second routing device executing routing control for the second LAN based on a network address of the second LAN. The routing setting information creation unit creates routing setting information based on the first specifying information and the second specifying information, the routing setting information including information in which the network address of the first LAN and the first routing device are associated with each other, and information in which the network address of the second LAN and the second routing device are associated with each other. The sharing unit shares the routing setting information with the second relay server. Upon receiving a request to start routing control, the routing control unit specifies the first routing device and the second routing device based on the routing setting information, establishes a routing session between the first routing device and the second routing device based on the relay server information, executes routing control for a communication packet between the first LAN and the second LAN through the routing session, and upon receiving an instruction to end the routing control, disconnects the routing session, and ends the routing control for the communication packet between the first LAN and the second LAN. When a communication packet destined for a destination address of an IP address belonging to the second LAN is sent out from a communication terminal connected to the first LAN, the first routing device refers to the routing setting information to determine that routing of the communication packet to the second LAN is possible, and transfers the communication packet by using the established routing session.

The relay communication system according to various preferred embodiments of the present invention establishes the routing session between the routing devices based on the routing group information including the network addresses of the LANs and the information regarding the client terminals or the relay servers, which function as the routing devices. By using the routing session, the routing devices execute the routing control for the communication packets transmitted from communication terminals connected to the LAN. By using the routing group information, the client terminals or the relay servers can function as the routing devices, and accordingly, it is possible to flexibly execute the routing control.

In the relay communication system according to other preferred embodiments of the present invention, the routing devices establish the routing session based on the routing setting information. By using the routing session, the routing devices execute the routing control for the communication packets transmitted from communication terminals connected to the LAN. Route information is created by specifying the routing devices which correspond to the routing for the LANs and by associating the network addresses of the LANs and the routing devices with each other.

In this manner, the creation of the routing setting information necessary to validate the routing function of the relay communication system is simplified. When the configuration of the relay communication system is changed, it is easy to update the route information, and accordingly, it is easy to manage the routing function using the relay communication system. Moreover, the relay communication system can search for the LAN that can be used for the routing, and based on the search result, can designate the LAN as the routing target. Accordingly, the creation of the routing setting information is further simplified.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a view showing information created in response to processing of Step S9 shown in FIG. 4.

FIG. 6 is a view showing information created in response to processing of Step S10 shown in FIG. 4.

FIG. 7 is a view showing information created in response to processing of Step S12 shown in FIG. 4.

FIG. 8 is a view showing information created in response to processing of Step S13 shown in FIG. 4.

FIG. 9 is a view showing information created in response to processing of Step S14 shown in FIG. 4.

FIG. 11 is a view showing information created in response to an instruction to construct the relay group according to a preferred embodiment of the present invention.

FIG. 12 is a view showing information created up to processing of Step S20 shown in FIG. 4.

FIG. 14 is a view showing information created up to processing of Step S24 shown in FIG. 13.

FIG. 15 is a view showing information created up to processing of Step S28 shown in FIG. 13.

FIG. 18 is a view showing routing group information according to a preferred embodiment of the present invention.

FIG. 22 is a view showing routing group information according to a preferred embodiment of the present invention.

FIG. 25 is a view showing routing group information according to a preferred embodiment of the present invention.

FIG. 33 is a view showing network search information according to a preferred embodiment of the present invention.

FIG. 34 is a view showing network search information according to a preferred embodiment of the present invention.

FIG. 35 is a view showing network search information according to a preferred embodiment of the present invention.

FIG. 36 is a table showing network search results displayed on a monitor of the client terminal according to a preferred embodiment of the present invention.

FIG. 40 is a view showing route search information according to a preferred embodiment of the present invention.

FIG. 44 is a view showing routing group information according to a preferred embodiment of the present invention.

DETAILED DESCRIPTION OF THE PREFERRED EMBODIMENTS

1. Entire Configuration of Relay Communication System

Figure 1:
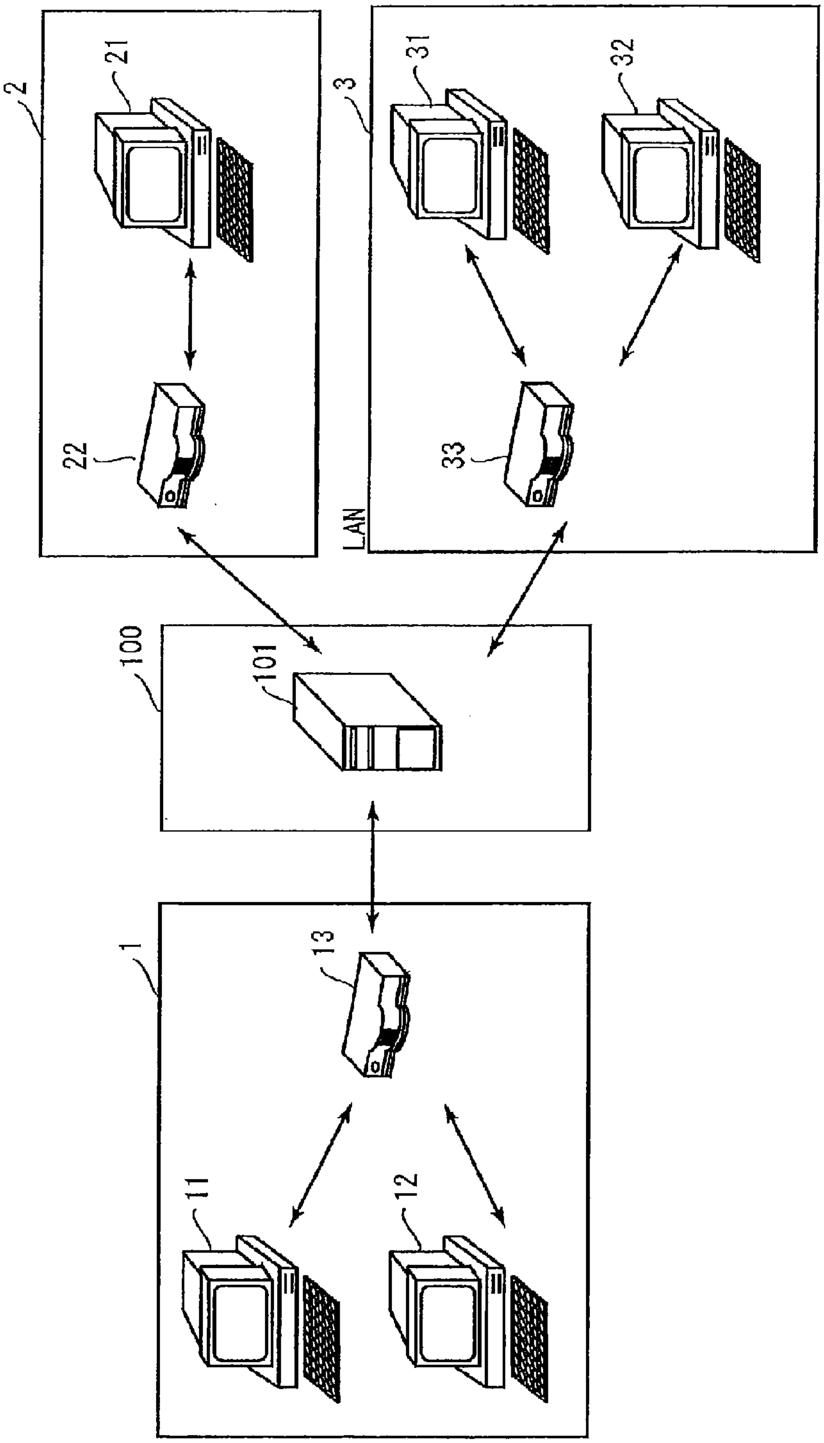
FIG. 1 is a schematic view of an entire configuration of a relay communication system according to a preferred embodiment of the present invention.

A description will be provided below of preferred embodiments of the present invention with reference to the drawings. FIG. 1 is a schematic view showing an entire configuration of a relay communication system according to a preferred embodiment of the present invention. The relay communication system includes LANs 1, 2 and 3 and a wide area network (WAN) 100. The WAN 100 is a wide area network, such as the Internet, for example.

Client terminals 11 and 12 and a relay server 13 are connected to the LAN 1. A client terminal 21 and a relay server 22 are connected to the LAN 2. Client terminals 31 and 32 and a relay server 33 are connected to the LAN 3. A session initiation protocol (SIP) server 101 is connected to the WAN 100.

The client terminals individually connected to the LANs 1 to 3 are preferably personal computers or other suitable devices, for example. The relay servers 13, 22 and 33 relay communication between the client terminals respectively connected to two different LANs. The SIP server 101 relays communication among the relay servers. In this preferred embodiment, each of the relay servers preferably uses SIP, for example, to communicate with the other relay server. However, protocols other than the SIP may be used.

2. Configuration of Relay Server

Figure 2:
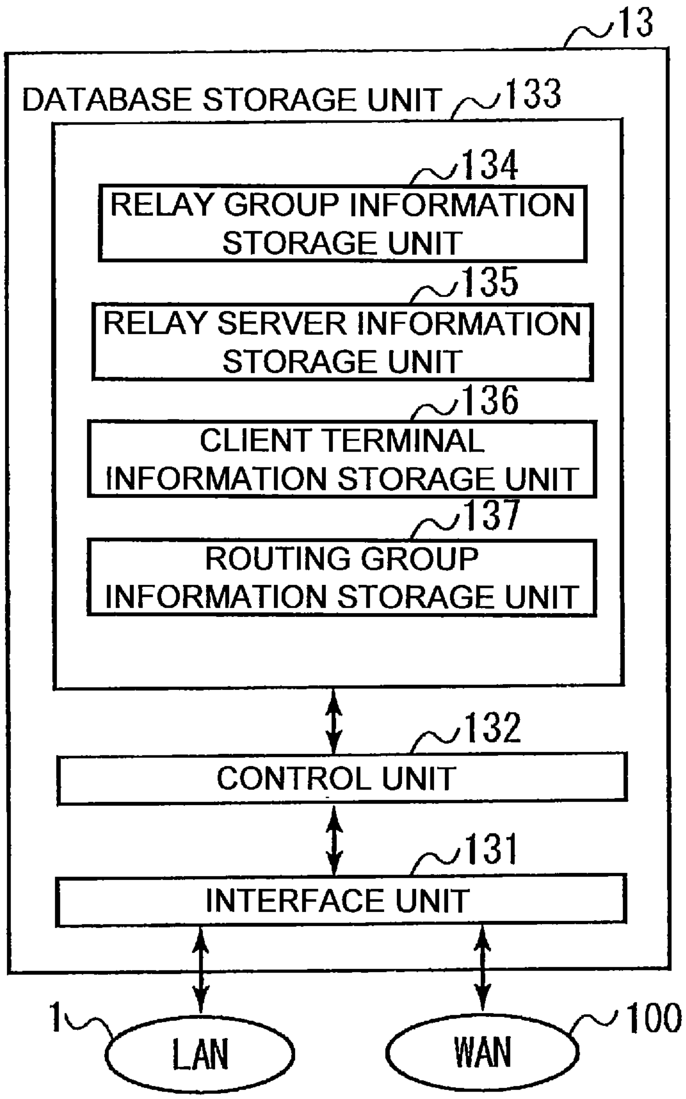
FIG. 2 is a diagram showing a configuration of a relay server according to a preferred embodiment of the present invention.

FIG. 2 is a block diagram showing a configuration of the relay server 13. The relay server 13 preferably includes an interface unit 131, a control unit 132, and a database storage unit 133. Configurations of the relay servers 22 and 33 are preferably similar to that of the relay server 13. The interface unit 131 performs communication with the client terminals 11 and 12 by using private internet protocol (IP) addresses. The interface unit 131 performs communication with the SIP server 101 by using a global IP address.

The control unit 132 manages a variety of databases stored in the database storage unit 133. The database storage unit 133 preferably includes a relay group information storage unit 134, a relay server information storage unit 135, a client terminal information storage unit 136, and a routing group information storage unit 137. Moreover, the control unit 132 has a similar configuration to that of a control unit 112 of the client terminal 11 to be described later.

3. Configuration of Client Terminal

Figure 3:
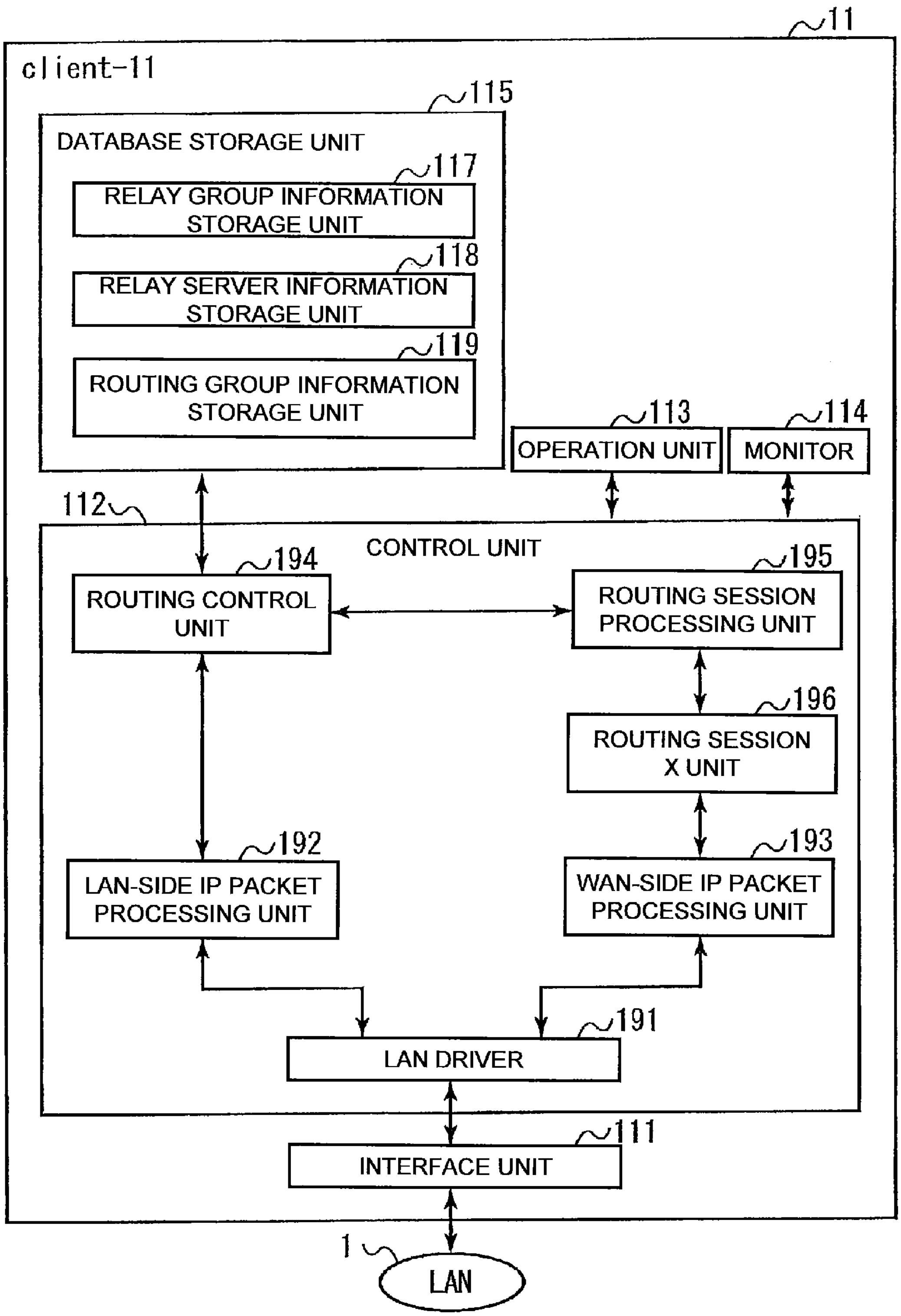
FIG. 3 is a diagram showing a configuration of a client terminal according to a preferred embodiment of the present invention.

FIG. 3 is a diagram showing the configuration of the client terminal 11. The client terminal 11 preferably includes an interface unit 111, a control unit 112, an operation unit 113, a monitor 114, and a database storage unit 115. Note that configurations of the client terminals 12, 21, 31 and 32 are preferably similar to that of the client terminal 11.

The interface unit 111 performs communication with the relay server 13 by using the private IP address.

The control unit 112 preferably includes a LAN driver 191, a LAN-side IP packet processing unit 192, a WAN-side IP packet processing unit 193, a routing control unit 194, a routing session processing unit 195, and a routing session X unit 196.

The LAN driver 191 is preferably driver software, for example, that controls the interface unit 111. The LAN-side IP packet processing unit 192 processes a communication packet received from the client terminal 12 or other suitable device, and outputs the communication packet to the routing control unit 194. The routing control unit 194 determines a routing destination of the communication packet based on information stored in the database storage unit 115. Based on the information stored in the database storage unit 115, the routing session processing unit 195 determines a routing session to relay the communication packet, and outputs the routing session to the routing session X unit 196. The routing session X is a media session to be established between the client terminal 11 and a specific relay server or client terminal. The routing session X unit 196 outputs the communication packet to the WAN-side IP packet processing unit 193. The WAN-side IP packet processing unit 193 transmits and receives the communication packet through the routing session X.

The operation unit 113 is preferably a keyboard, a mouse and other suitable device, for example, and receives an instruction to the client terminal 11. The monitor 114 is preferably a liquid crystal display or other suitable display device, for example.

The database storage unit 115 preferably includes a relay group information storage unit 117, a relay server information storage unit 118, and a routing group information storage unit 119.

A description will be provided below of a processing flow of the relay communication system shown in FIG. 1, in order from construction of a relay group to the routing processing.

4. Construction of Relay Group

Figure 4:
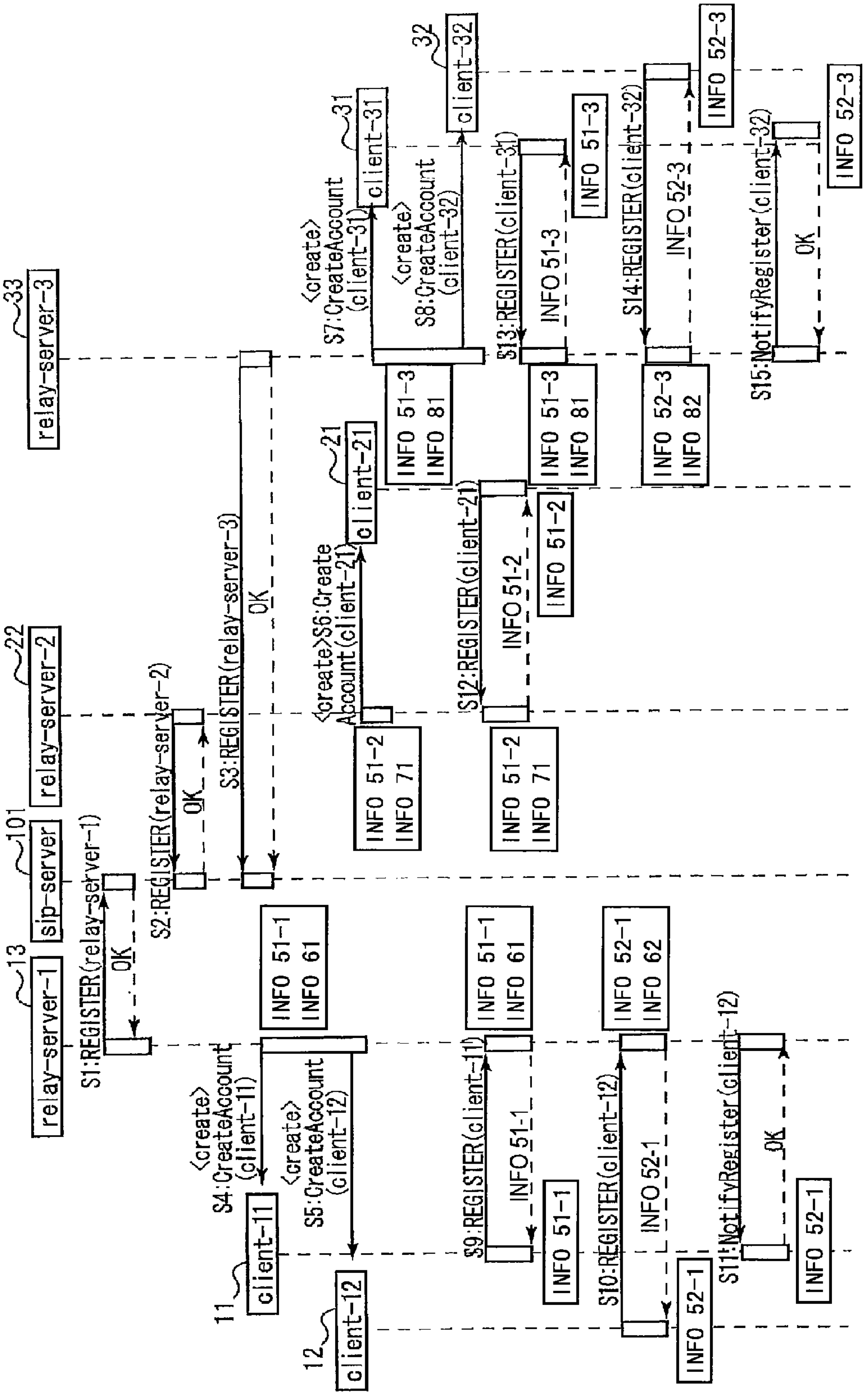
FIG. 4 is a flowchart showing registration processing for the relay servers and the client terminals according to a preferred embodiment of the present invention.

FIG. 4 is a flowchart showing the process for registering the relay servers and the client terminals, which participate in the relay group. The respective administrators of the relay servers 13, 22 and 33 agree and decide to construct a group of the relay communication system among the LANs 1, 2 and 3.

4.1. Registration of Relay Servers and Client Terminals

First, the administrator of the relay server 13 registers identification information and global IP address of the relay server 13 in the SIP server 101 (Step S1). In a similar manner, the respective administrators of the relay servers 22 and 33 register identification information and global IP addresses of the relay servers 22 and 33 in the SIP server 101, respectively (Steps S2, S3).

The SIP server 101 manages the identification information and global IP address of each of the relay servers in association with each other. In this manner, the SIP server 101 is capable of relaying the communication among the relay servers by using the global IP addresses of the respective relay servers.

Next, accounts of the respective client terminals are created (Steps S4 to S8). Specifically, the administrator of the relay server 13 creates the account for the user of the client terminal 11 (Step S4), and creates the account for the user of the client terminal 12 (Step S5). The relay server 13 creates relay server information 51-1, which indicates details of the relay server 13, and client terminal information 61, which indicates details of the client terminals 11 and 12. The relay server information 51-1 and the client terminal information 61 are stored in the relay server information storage unit 135, and the client terminal information storage unit 136, respectively.

In a similar manner, the administrator of the relay server 22 creates the account for the user of the client terminal (Step S6). The relay server 22 creates relay server information 51-2, which indicates details of the relay server 22, and client terminal information 71, which indicates details of the client terminal 21.

The administrator of the relay server 33 creates the account for the user of the client terminal 31 (Step S7), and creates the account for the user of the client terminal 32 (Step S8). The relay server 33 creates relay server information 51-3, which indicates details of the relay server 33, and client terminal information 81, which indicates details of the client terminals 31 and 32.

4.2. Logon Processing of Client Terminals

After the accounts for the users of the client terminals have been created, the client terminals log on to the respective relay servers (Steps S9 to S15). Note that the order in which the respective client terminals log on does not have to be the order described below.

First, a description will be provided of an example of the logon (Steps S9 to S11) of the client terminals 11 and 12. The user of the client terminal 11 inputs the identification information and password of the client terminal 11, and logs on to the relay server 13 (Step S9). In response to the logon of the client terminal 11, the relay server information 51-1 and the client terminal information 61 are updated. The client terminal 11 receives the relay server information 51-1 as a response to the logon to the relay server 13.

FIG. 5 is a view showing information stored in the relay server 13 after processing indicated in Step S9. The relay server information 51-1 preferably includes upper information 511-1 regarding the relay server 13 and lower information 512-1 regarding the client terminals 11 and 12.

In the upper information 511-1, "id" and "name" indicate the identification information and the name of the relay server 13. In "id", the identification information "relay-server-1@abc.net" of the relay server 13 is set. In activation information 513-1, "active" is set, indicating that the relay server 13 has been activated.

In the lower information 512-1, two node tags, which correspond to the client terminals 11 and 12, respectively, are created. In each of the node tags, "div", "id" and "name" indicate a name of a division in which the client terminal is installed, the identification information of the client terminal, and the name thereof. These pieces of information are set at the time of creating the client terminal information 61. "group" indicates the relay group in which the client terminals participate. Site information 514-1 indicates the identification information of the relay servers as logon destinations of the client terminals.

"group" of each of the node tags in the lower information 512-1 is blank since the relay group has not been constructed at this time. The upper node tag of the lower information 512-1 corresponds to the client terminal 11, in which, as "id", the identification information "client-11@relay-server-1.abc.net" of the client terminal 11 is set. In the site information 514-1, the identification information of the relay server 13 is set following the logon of the client terminal 11.

The lower node tag of the lower information 512-1 corresponds to the client terminal 12, in which, as "id", the identification information "client-12@relay-server-1.abc.net" of the client terminal 12 is set. The site information 514-1 is blank since the client terminal 12 has not logged on.

In the client terminal information 61, two node tags, which correspond to the client terminals 11 and 12, respectively, are created. In each of the node tags, "div", "id", "name", and "pass" indicate the name of the division in which the client terminal is installed, the identification information of the client terminal, the name thereof, and the password thereof, respectively. These pieces of information are set at the time of creating the client terminal information 61. "group" indicates the relay group in which the client terminals participate. Address information 611, expiration period information 612, and port information 613 indicate the IP address of the client terminal, a registration expiration period thereof, and a port number thereof, respectively, and are set at the time when each of the client terminals logs on.

In the client terminal information 61, "group" of each of the node tags is blank since the relay group has not been constructed. The upper node tag of the client terminal information 61 corresponds to the client terminal 11, in which, as "id", the identification information of the client terminal 11 is set. The client terminal 11 logs on (Step S9), whereby "192.168.1.11", "1213" and "5070" are set in the address information 611, the expiration period information 612, and the port information 613, respectively.

The lower node tag of the client terminal information 61 corresponds to the client terminal 12, in which, as "id", the identification information of the client terminal 12 is set. The client terminal 12 has not logged on to the relay server 13 at the point of time in Step S9, and accordingly, the address information 611 is blank. Moreover, "0" is set in the expiration period information 612 and the port information 613.

After the logon (Step S9) of the client terminal 11, the user of the client terminal 12 inputs the identification information and password of the client terminal 12, and logs on to the relay server 13 (Step S10).

Following the logon of the client terminal 12, the relay server 13 updates the relay server information 51-1 and the client terminal information 61 to relay server information 52-1 and client terminal information 62, respectively. The client terminal 12 receives the relay server information 52-1 as a response to the logon to the relay server 13.

FIG. 6 is a view showing information stored in the relay server 13 after the processing indicated in Step S10. The fields that are updated following the logon of the client terminal 12 are underlined.

Due to the logon of the client terminal 12, the identification information of the relay server 13 is set in site information 524-1 in a lower node tag of lower information 522-1. In a lower node tag of the client terminal information 62, "192.168.2.22", "1213" and "5070" are set in address information 621, expiration period information 622, and site information 623, respectively.

After the logon of the client terminal 12, the relay server 13 transmits the relay server information 52-1 to the client terminal 11 (Step S11). In this manner, the relay server information 51-1 of the client terminal 11 is updated to the relay server information 52-1.

Next, a description will be provided of the logon (Step S12) of the client terminal 21. The user of the client terminal 21 inputs the identification information and password of the client terminal 21, and logs on to the relay server 22 (Step S12). Following the logon of the client terminal 21, the relay server 22 updates the relay server information 51-2 and the client terminal information 71. The client terminal 21 receives the relay server information 51-2 as a response to the logon to the relay server 22.

FIG. 7 is a view showing information stored in the relay server 22 after processing of Step S12. The relay server information 51-2 preferably includes upper information 511-2 and lower information 512-2. In "id" of the upper information 511-2, identification information "relay-server-2@abc.net" of the relay server 22 is registered. In activation information 513-2, "active" is set, indicating that the relay server 22 has been activated.

"group" of each of the node tags in the lower information 512-2 and the client terminal information 71 is blank since the relay group has not yet been constructed.

In the node tag of the lower information 512-2, the information regarding the client terminal 21 is registered. In "id", identification information "client-21@relay-server-2.abc-.net" of the client terminal 21 is registered. Following the logon of the client terminal 21, the identification information of the relay server 22 is set in site information 514-2.

In the client terminal information 71, the node tag corresponds to the client terminal 21, and as "id", the identification information of the client terminal 21 is set. Following the logon of the client terminal 21, "172.16.1.21", "1213" and "5070" are registered in the address information 711, the expiration period information 712, and the port information 713, respectively.

Next, a description will be provided of the logon processing (Steps S13 to S15) of the client terminals 31 and 32. The user of the client terminal 31 inputs the identification information and password of the client terminal 31, and logs on to the relay server 33 (Step S13). In response to the logon of the client terminal 31, the relay server information 51-3 and the client terminal information 81 are updated. The client terminal 31 receives the relay server information 51-3 as a response to Step S13, and stores the relay server information 51-3 in a relay server information storage unit 318.

FIG. 8 is a view showing information stored in the relay server 33 after processing of Step S13. The relay server information 51-3 preferably includes upper information 511-3 and lower information 512-3. In the upper information 511-3, as "id", identification information "relay-server-3@abc.net" of the relay server 33 is registered. In activation information 513-3, "active" is set, indicating that the relay server 33 has been activated.

"group" of each of the node tags in the lower information 512-3 and the client terminal information 81 is blank since the relay group has not yet been constructed.

The upper node tag of the lower information 512-3 corresponds to the client terminal 31, and as "id", identification information "client-31@relay-server-3.abc.net" of the client terminal 31 is set. Due to the log on of the client terminal 31, the identification information of the relay server 33 is set in the site information 514-3.

The lower node tag of the lower information 512-3 corresponds to the client terminal 32, in which, as "id", the identification information "client-32@relay-server-3.abc.net" of the client terminal 32 is set. The site information 514-3 is blank since the client terminal 32 has not logged on.

The upper node tag of the client terminal information corresponds to the client terminal 31, in which the identification information of the client terminal 31 is set as "id". Following the logon of the client terminal 31, "200.1.2.31", "1213", and "5070" are set in the address information 811, the expiration period information 812, and the port information 813, respectively.

The lower node tag of the client terminal information 81 corresponds to the client terminal 32, in which, as "id", the identification information of the client terminal 32 is set. The address information 811 is blank since the client terminal 32 has not logged on. Moreover, "0" is set in the expiration period information 812 and the port information 813.

After the logon (Step S13) of the client terminal 31, the user of the client terminal 32 inputs the identification information and password of the client terminal 32, and logs on to the relay server 33 (Step S14).

Following the logon of client terminal 32, the relay server 33 updates the relay server information 51-3 and the client terminal information 81 to relay server information 52-3 and client terminal information 82, respectively. The client terminal 32 receives the relay server information 52-3 as a response to Step S14.

FIG. 9 is a view showing information stored in the relay server 33 after processing of Step S14. Fields that have been updated following the logon of the client terminal 32 are underlined.

In the site information 524-3 of a lower node tag of the lower information 522-3, the identification information of the relay server 33 is set. Moreover, in a lower node tag of the client terminal information 82, "200.1.3.132", "1213", and "5070" are set in the address information 821, the expiration period information 822, and the site information 823, respectively.

After the logon of the client terminal 32, the relay server 33 transmits the relay server information 52-3 to the client terminal 31 (Step S15). The client terminal 31 updates the relay server information 51-3, which is stored in the relay server information storage unit 318, to the relay server information 52-3.

4.3. Creation of Relay Group Information

Figure 10:
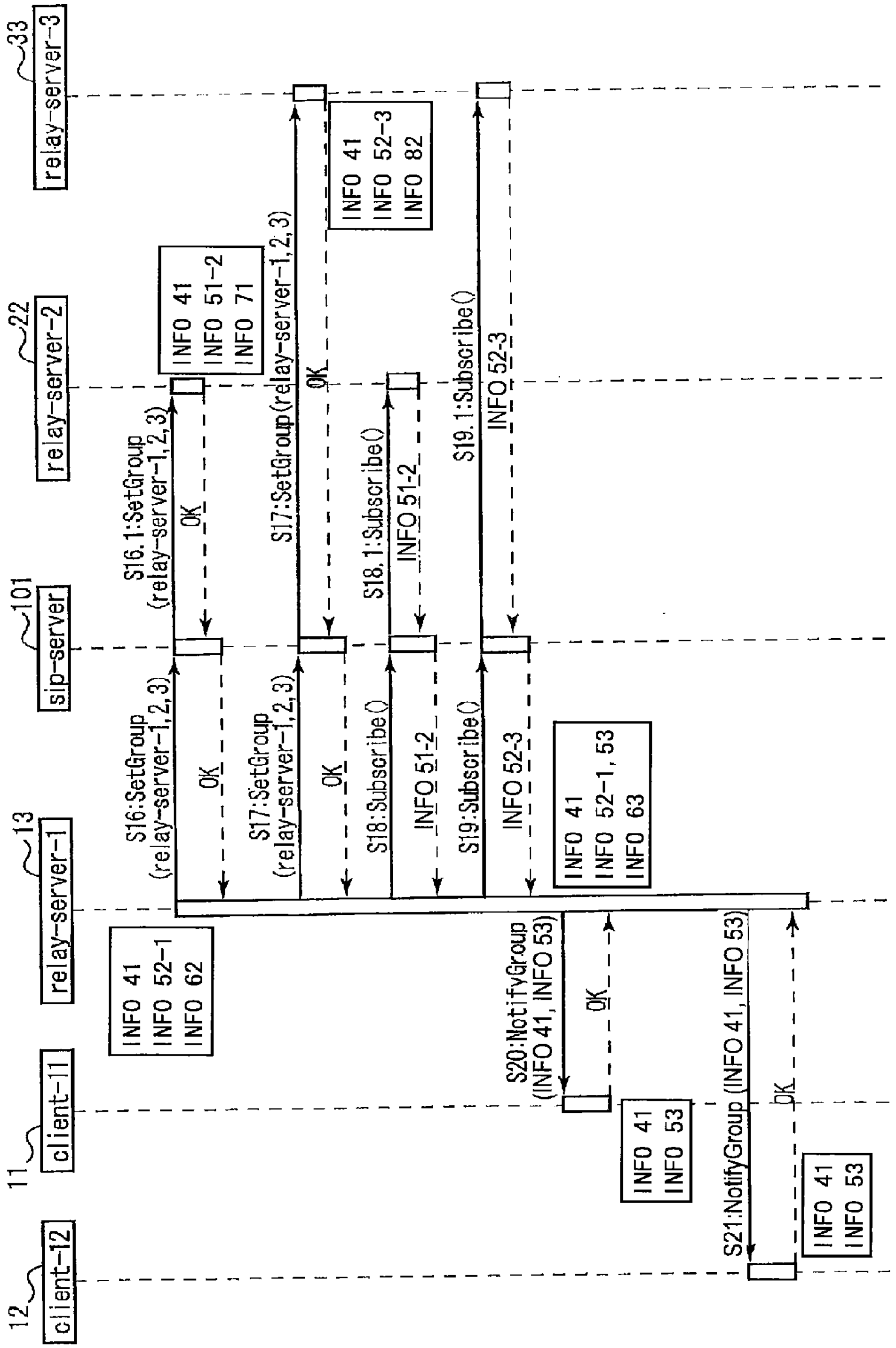
FIG. 10 is a flowchart showing a construction of a relay group according to a preferred embodiment of the present invention.

FIG. 10 is a flowchart showing processing regarding construction of the relay group. In FIG. 10, the client terminals 22 and 33 are not shown.

After the processing of Step S15, the administrator of the relay server 13 inputs the identification information of the relay servers 13, 22 and 33, and instructs the relay server 13 to construct the relay group. The relay server 13 creates new relay group information 41, and stores the relay group information 41 in the relay group information storage unit 134.

FIG. 11 is a view showing information stored in the relay server 13 after the construction of the relay group is instructed. The relay server information 52-1 and the client terminal information 62 are preferably the same as those in FIG. 6.

The relay group information 41 preferably includes upper information 411 regarding the relay group and lower information 412 regarding the relay servers which participate in the relay group. In the upper information 411, in "id", identification information "group-a@relay-server-1.abc.net" of the relay group is set. "lastmod" and "name" indicate a latest update time of the relay group information 41 and a name of the relay group. Moreover, in the respective site tags of the lower information 412, the identification information of the relay servers 13, 22 and 33 are set.

Through the SIP server 101, the relay server 13 requests the relay server 22 to construct the relay group in which the relay servers 13, 22 and 33 participate (Steps S16, S16.1). In a similar manner, through the SIP server 101, the relay server 13 requests the relay server 33 to construct the relay group (Steps S17, S17.1). At the time of requesting the construction of the relay group, the relay group information 41 is transmitted to the relay servers 22 and 33.

4.4. Synthesis of Relay Server Information

Next, through the SIP server 101, the relay server 13 requests the relay server 22 to provide the relay server information 51-2 (Steps S18, S18.1), and requests the relay server 33 to provide the relay server information 52-3 (Steps S19, S19.1). The relay server 13 synthesizes the relay server information 52-1, 51-2 and 52-3, and creates relay server information 53. The client terminal information 62 is updated to client terminal information 63. In the relay server information storage unit 135, the relay server information 52-1 and 53 are stored.

FIG. 12 is a view showing information stored in the relay server 13 after processing of Step S19. Fields that are updated following the processing of Step S18 are underlined.

In the relay server information 53, upper information 531-1 and lower information 532-1 correspond to the upper information 521-1 and the lower information 522-1, which are shown in FIG. 6, respectively. In a similar manner, upper information 531-2 and lower information 532-2 correspond to the upper information 511-2 and the lower information 512-2, which are shown in FIG. 7, respectively. Upper information 531-3 and lower information 532-3 correspond to the upper information 521-3 and the lower information 522-3, which are shown in FIG. 9, respectively.

Following the construction of the relay group, identification information of the relay group is set in "group" of each of the node tags of the lower information 532-1, 532-2 and 532-3 and "group" of each of the node tags of the client terminal information 63.

By referring to the client terminal information 63, the relay server 13 confirms that the client terminals 11 and 12 are logged on. The relay group information 41 and the relay server information 53 are transmitted to the client terminals 11 and 12 (Steps S20, S21).

Figure 13:
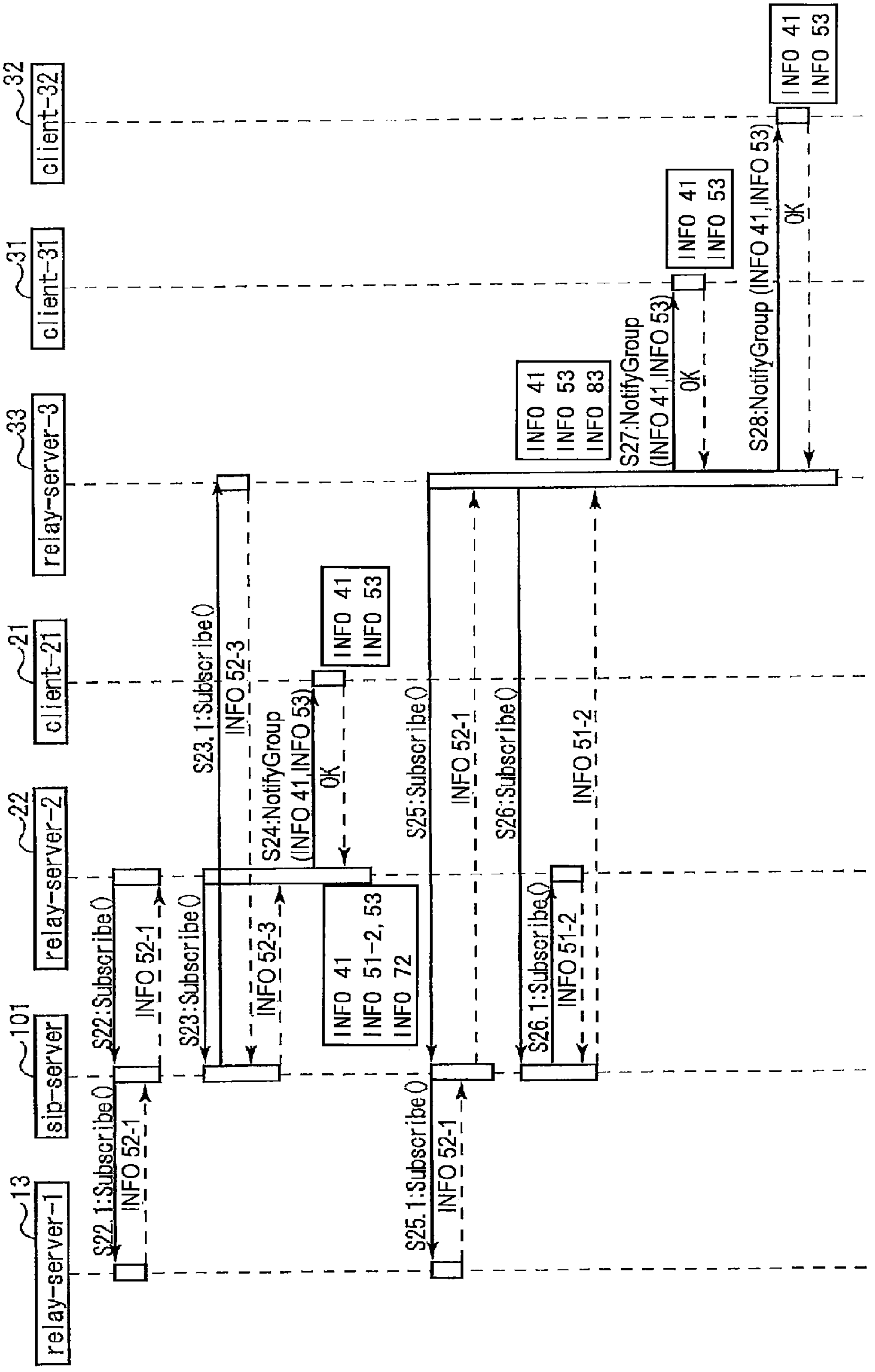
FIG. 13 is a flowchart showing the construction of the relay group according to a preferred embodiment of the present invention.

FIG. 13 is a flowchart showing processing during and after Step 22 in the construction of the relay group. In FIG. 13, the client terminals 11 and 12 are not shown.

Through the SIP server 101, the relay server 22 requests the relay server 13 to provide the relay server information 52-1 (Steps S22, S22.1), and requests the relay server 33 to provide the relay server information 52-3 (Steps S23, S23.1). The relay server 22 synthesizes the relay server information 52-1, 51-2 and 52-3, and creates the relay server information 53. The client terminal information 71 is updated to the client terminal information 72. The relay server 22 continues to store the relay server information 51-2.

FIG. 14 is a view showing information stored in the relay server 22 after processing of Step S23. Fields that are changed following the processing of Step S23 are underlined. The identification information of the relay group is newly set in "group" of the client terminal information 72.

By referring to the client terminal information 72, the relay server 22 confirms that the client terminal 21 is logged on. The relay group information 41 and the relay server information 53 are transmitted to the client terminal 21 (Step S24).

Next, through the SIP server 101, the relay server 33 requests the relay server 13 to provide the relay server information 52-1 (Steps S25, S25.1), and requests the relay server 22 to provide the relay server information 51-2 (Steps S26, S26.1). The relay server 33 synthesizes the relay server information 52-1, 51-2 and 52-3, and creates relay server information 53. The client terminal information 82 is updated to the client terminal information 83.

FIG. 15 is a view showing information stored in the relay server 33 after processing of Step S26. Fields that are changed following the processing of Step S26 are underlined. The identification information of the relay group is newly set in "group" of each of the node tags of the client terminal information 83.

By referring to the client terminal information 83, the relay server 33 confirms that the client terminals 31 and 32 are logged on. The relay group information 41 and the relay server information 53 are transmitted to both of the client terminals 31 and 32 (Steps S27, S28).

As a result of the processing up to this point, the relay group is constructed in which the client terminals 11, 12, 21, 31 and 32 and the relay servers 13, 22 and 33 participate. The computers which participate in the relay group can confirm the configuration of the relay group, operation states of the individual computers, and other information thereof, by referring to the relay group information 41 and the relay server information 53.

5. Flow of Routing Processing (First Preferred Embodiment)

A description will be provided of routing processing according to a first preferred embodiment of the present invention in the relay communication system shown in FIG. 1.

5.1. Detailed Configuration of LAN

Figure 16:
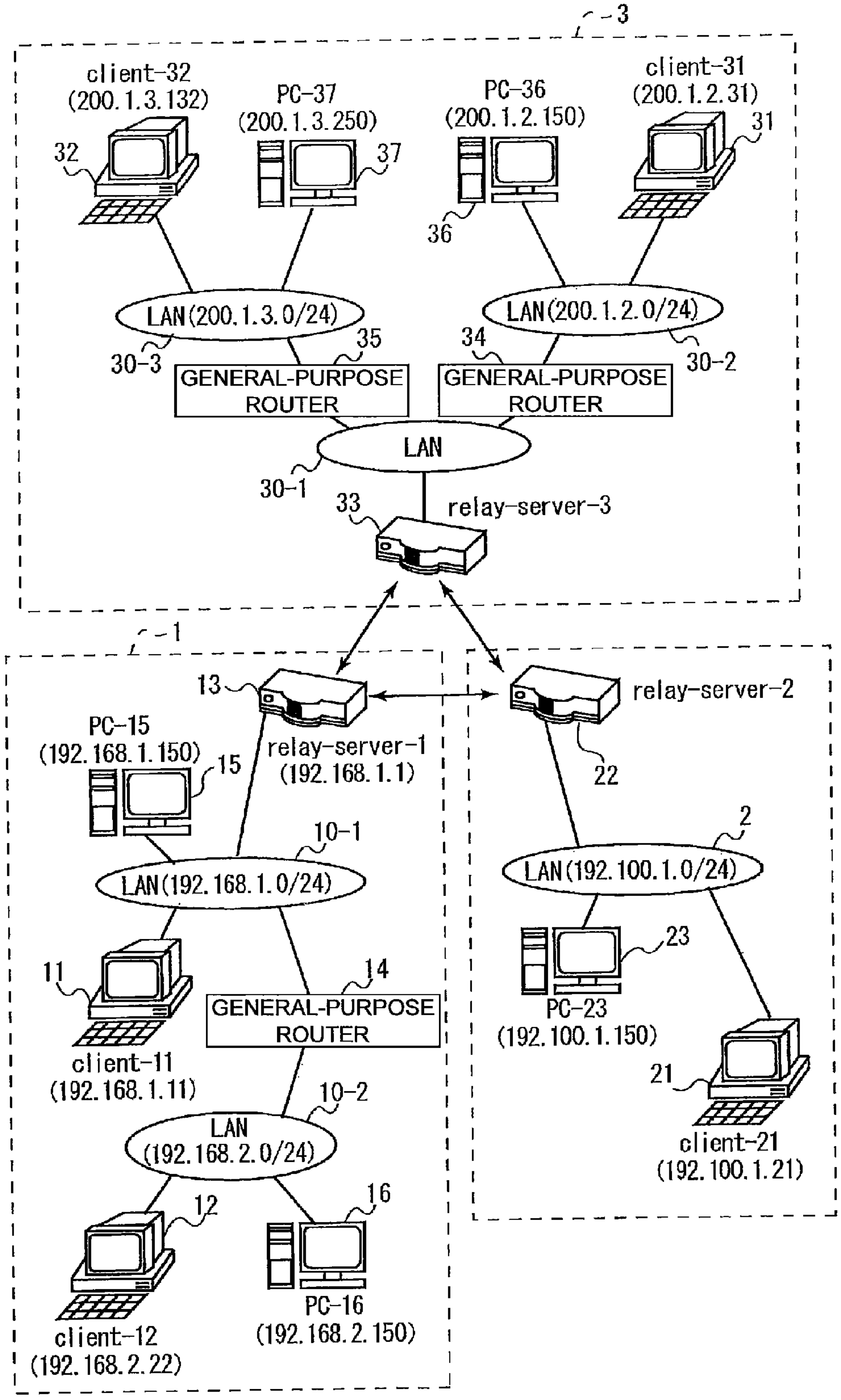
FIG. 16 is a diagram showing detailed configurations of the respective LANs according to a preferred embodiment of the present invention.

FIG. 16 is a diagram showing detailed configurations of the LANs 1 to 3. In FIG. 16, the SIP server 101 is not shown. General terminals are preferably connected to the LANs 1 to 3 as personal computers that do not function as client terminals.

The LAN 1 preferably includes a LAN 10-1 and a LAN 10-2 that are connected to each other through a general-purpose router 14, for example. The client terminal 11, the relay server 13, and a general terminal 15 are connected to the LAN 10-1. The client terminal 12 and a general terminal 16 are connected to the LAN 10-2. Network addresses of the LANs 10-1 and 10-2 are "192.168.1.0/24" and "192.168.2.0/24" (24 at the end is a subnet mask).

A general terminal 23 is preferably connected to the LAN 2, in addition to the client terminal 21 and the relay server 22. The network address of the LAN 2 is "192.100.1.0/24".

The LAN 3 preferably includes a LAN 30-1 and a LAN 30-2 that are connected to each other through a general-purpose router 34, and the LAN 30-1 and a LAN 30-3 are connected to each other through a general-purpose router 35. The relay server 33 is connected to the LAN 30-1. The client terminal 31 and a general terminal 36 are connected to the LAN 30-2. The client terminal 32 and a general terminal 37 are connected to the LAN 30-3. Network addresses of the LANs 30-2 and 30-3 are "200.1.2.0/24" and "200.1.3.0/24".

5.2. Sharing Routing Group Information

A description will be provided of sharing of routing group information 91 for use in the routing processing according to this preferred embodiment.

Figure 17:
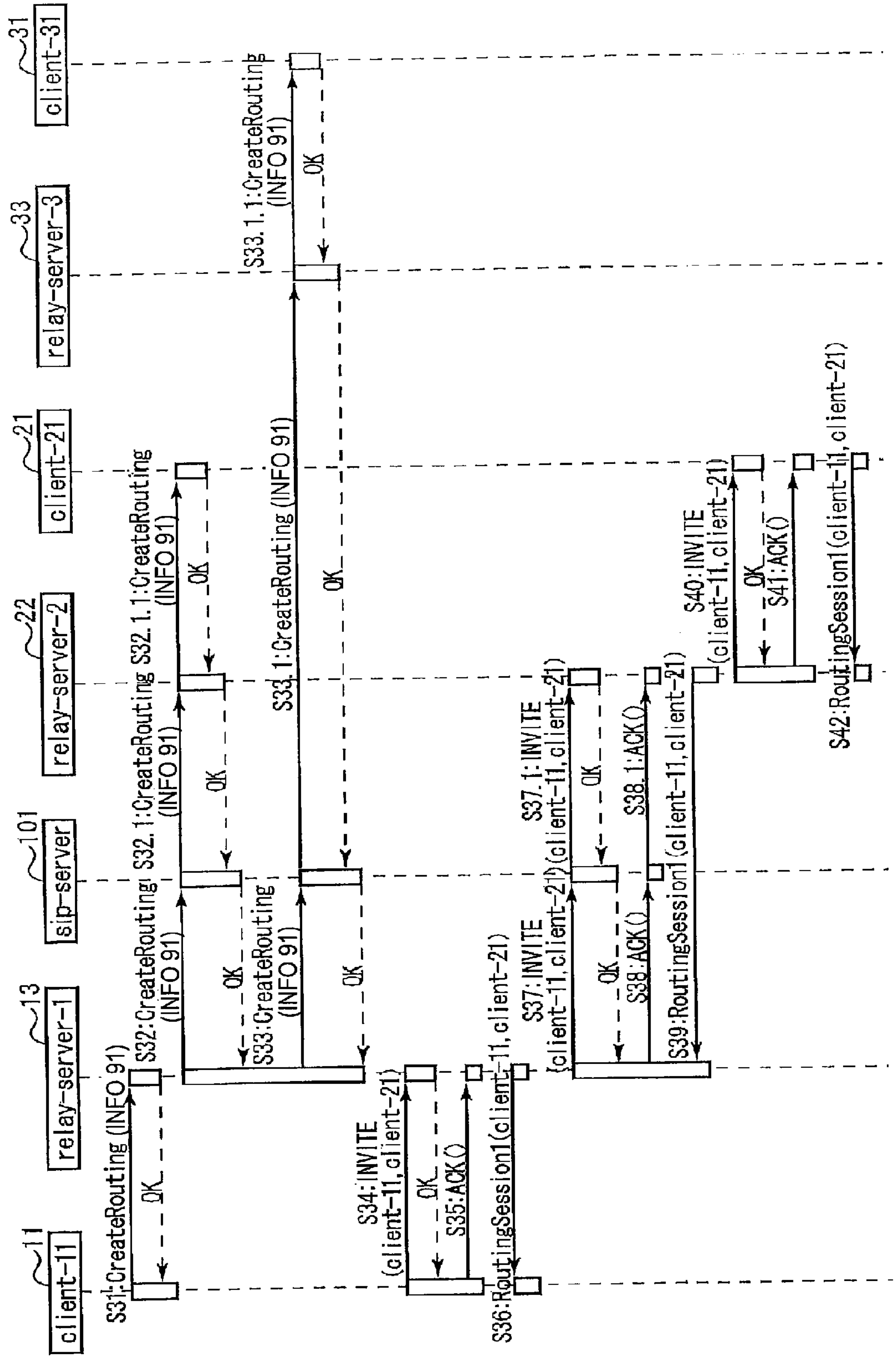
FIG. 17 is a flowchart showing the establishment of a first routing session according to a preferred embodiment of the present invention.

FIG. 17 is referred to below. The user of the client terminal 11 instructs construction of a first routing group. The client terminal 11 stores routing group information 91, which is created in response to the instruction of the user, in the routing group information storage unit 119. The client terminal 11 transmits the routing group information 91 to the relay server 13 (Step S31), and issues a notice to the relay server 13 of the construction of the first routing group. The relay server 13 stores the received routing group information 91 in the routing group information storage unit 137.

FIG. 18 is a view showing the routing group information 91. The routing group information 91 preferably includes body information 911, routing target information 912, routing permission information 913, and session information 914.

The body information 911 is information regarding the routing group information 91 itself. "group" indicates identification information of the relay group. "id", "lastmod", "name", and "owner" indicate identification information, latest update time, name, and creation source of the routing group information 91.

The routing target information 912 is information regarding a network that functions as a routing target, and includes network information 912-1 to 912-3. In each network information, "addr" indicates the network address of the network that functions as the routing target. "router" indicates a client terminal that routes an IP packet from the network set in "addr".

In the network information 912-1, the network address of the LAN 10-2 is set as "addr", and the identification information of the client terminal 11 is set as "router". In the network information 912-2, the network address of the LAN 2 is set as "addr", and the identification information of the client terminal 21 is set as "router". In the network information 912-3, the network address of the LAN 30-2 is set as "addr", and the identification information of the client terminal 31 is set as "router". That is to say, the client terminals 11, 21 and 31 are preferably set so as to function as routing devices.

The routing permission information 913 indicates communication terminals that are capable of using the routing function of the relay communication system, and includes permitted terminal information 913-1 to 913-3. Here, "communication terminals" refer to all of the relay servers, the client terminals, and the general terminals, which are individually connected to the LANs 1 to 3. For example, in the LAN 1, the client terminals 11 and 12, the relay server 13, and the general terminals 15 and 16 all correspond to the communication terminals. Accordingly, even the general terminals which are not included in the relay communication system can use the routing function of the relay communication system.

In each of the permitted terminal information, "name" and "addr" indicate the name and IP address of the communication terminal capable of using the routing function. The permitted terminal information 913-1 corresponds to the general terminal 16, in which "192.168.2.150" is set as "addr". The permitted terminal information 913-2 corresponds to the general terminal 23, in which "192.100.1.150" is set as "addr". In the permitted terminal information 913-3, as "addr", "200.1.2.*" is set, which indicates that all of the communication terminals connected to the LAN 30-2 can use the routing function. Note that, although the identification information of the general terminal is preferably set in the permitted terminal information 913-1 and 913-2, the identification information of the client terminals and the relay servers may be set therein.

The session information 914 includes point information 914-1 to 914-3 regarding routing sessions for use in the routing of the communication packet. "start" and "end" of each of the point information indicate a start point and an end point of the routing session.

Since the point information 914-1 to 914-3 have been created, three routing sessions are established in the first routing group. The point information 914-1 corresponds to a first routing session, in which the identification information of the client terminals 11 and 21 are set in "start" and "end". The point information 914-2 corresponds to a second routing session, in which the identification information of the client terminals 11 and 31 are set in "start" and "end". The point information 914-3 corresponds to a third routing session, in which the identification information of the client terminals 21 and 31 are set in "start" and "end".

FIG. 17 is referred to again below. The relay server 13 issues a notice of the construction of the first routing group to the client terminals 21 and 31 which function as the routing devices. Specifically, the relay server 13 transmits the routing group information 91 to the client terminal 21 through the SIP server 101 and the relay server 22 (Steps S32, S32.1 and S32.1.1). In a similar manner, the routing group information 91 is transmitted to the client terminal 31 through the SIP server 101 and the relay server 33 (Steps S33, S33.1 and S33.1.1). In this manner, the relay servers 13, 22 and 33, and the client terminals 11, 21 and 31 which function as the routing devices share the routing group information 91.

5.3. Establishment of Routing Session

Next, first to third routing sessions are established. The client terminal 11 refers to the point information 914-1 and 914-2, and confirms that the terminal itself has been set at the start points of the first and second routing sessions.

In order to establish the first routing session between the client terminals 11 and 21, the client terminal 11 transmits an establishment request of the first routing session to the relay server 13 (Step S34). In response to a response from the relay server 13, the client terminal 11 transmits an ACK to the relay server 13 (Step S35). In response to the ACK, the relay server 13 establishes a media session between the client terminal 11 and the relay server 13 (Step S36).

After step S36, the relay server 13 transmits the establishment request of the first routing session to the relay server 22 through the SIP server 101 (Steps S37, S37.1). In response to a response from the relay server 22, the relay server 13 transmits an ACK to the relay server 22 through the SIP server 101 (Steps S38, S38.1). In response to the ACK, the relay server 22 establishes a media session between the relay servers 13 and 22 (Step S39).

After Step S39, a media session is established between the client terminal 21 and the relay server 22 (Steps S40, S41 and S42). The processing is similar to those of Steps S34 to S36.

The first routing session is preferably composed based on the three media sessions established in Steps S36, S39 and S42.

Figure 19:
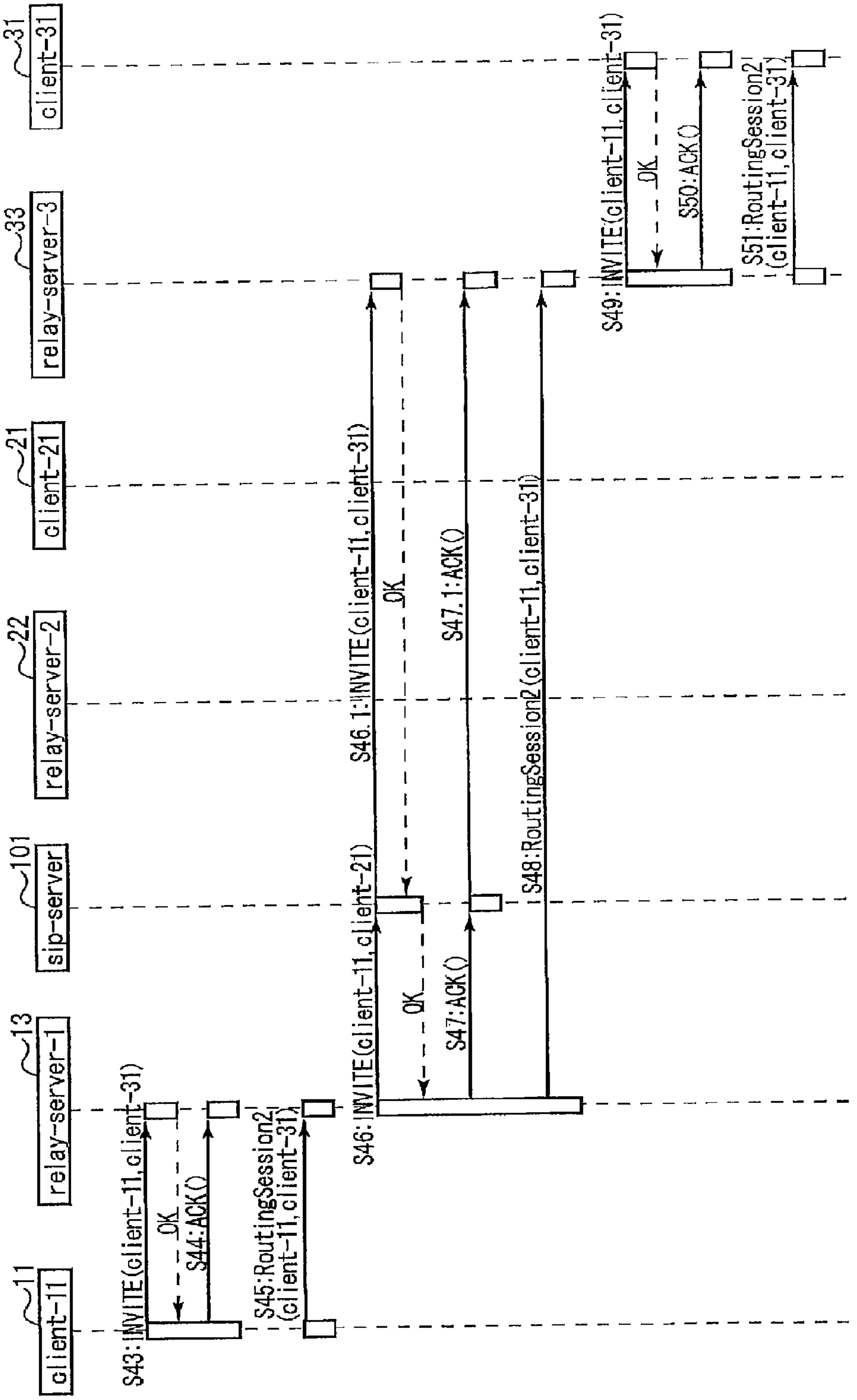
FIG. 19 is a flowchart showing the establishment of a second routing session according to a preferred embodiment of the present invention.
Figure 20:
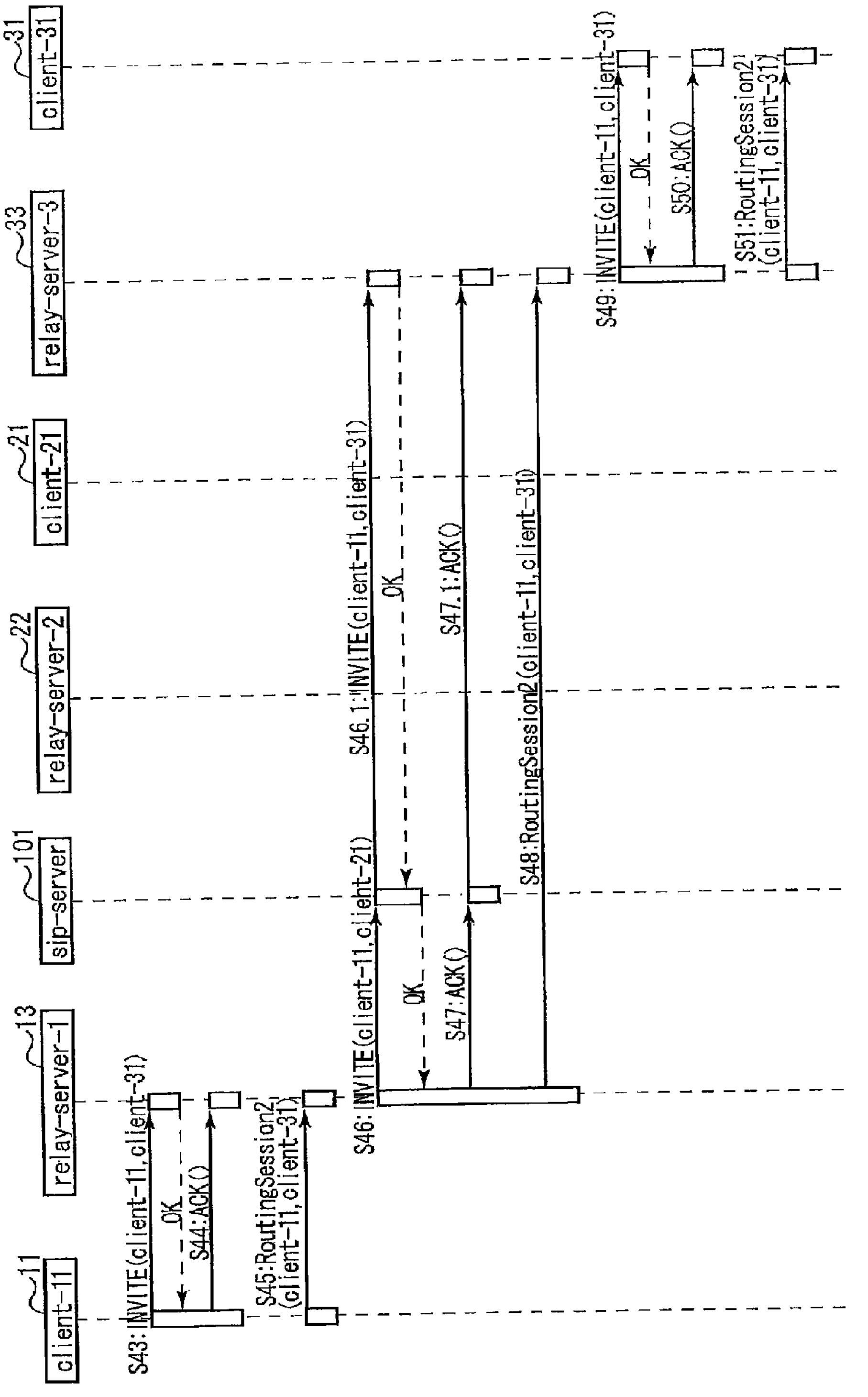
FIG. 20 is a flowchart showing the establishment of a third routing session according to a preferred embodiment of the present invention.

FIG. 19 is referred to below. In a similar manner to the establishment of the first routing session, the second routing session is established between the client terminals 11 and 31. A media session is established between the client terminal 11 and the relay server 13 (Steps S43, S44 and S45). A media session is established between the relay servers 13 and 33 (Steps S46. S46.1, S47, S47.1 and S48). A media session is established between the client terminal 31 and the relay server 33 (Steps S49, S50 and S51). The second routing session is preferably composed of the three media sessions established in Steps S45, S48 and S51, for example.

The client terminal 21 refers to the point information 914-3, and confirms that the terminal itself has been set at the start point of the third routing session. Then, the third routing session is established between the client terminals 21 and 31.

A media session is established between the client terminal 21 and the relay server 22. A media session is established between the relay servers 22 and 33. A media session is established between the client terminal 31 and the relay server 33. The third routing session is preferably composed of the three media sessions established, for example.

5.4. Routing Control of Communication Packet

The communication terminals set in the permitted terminal information 913-1 to 913-3 can perform communication, in which IP addresses are directly designated, with one another through the first to third routing sessions.

Figure 21:
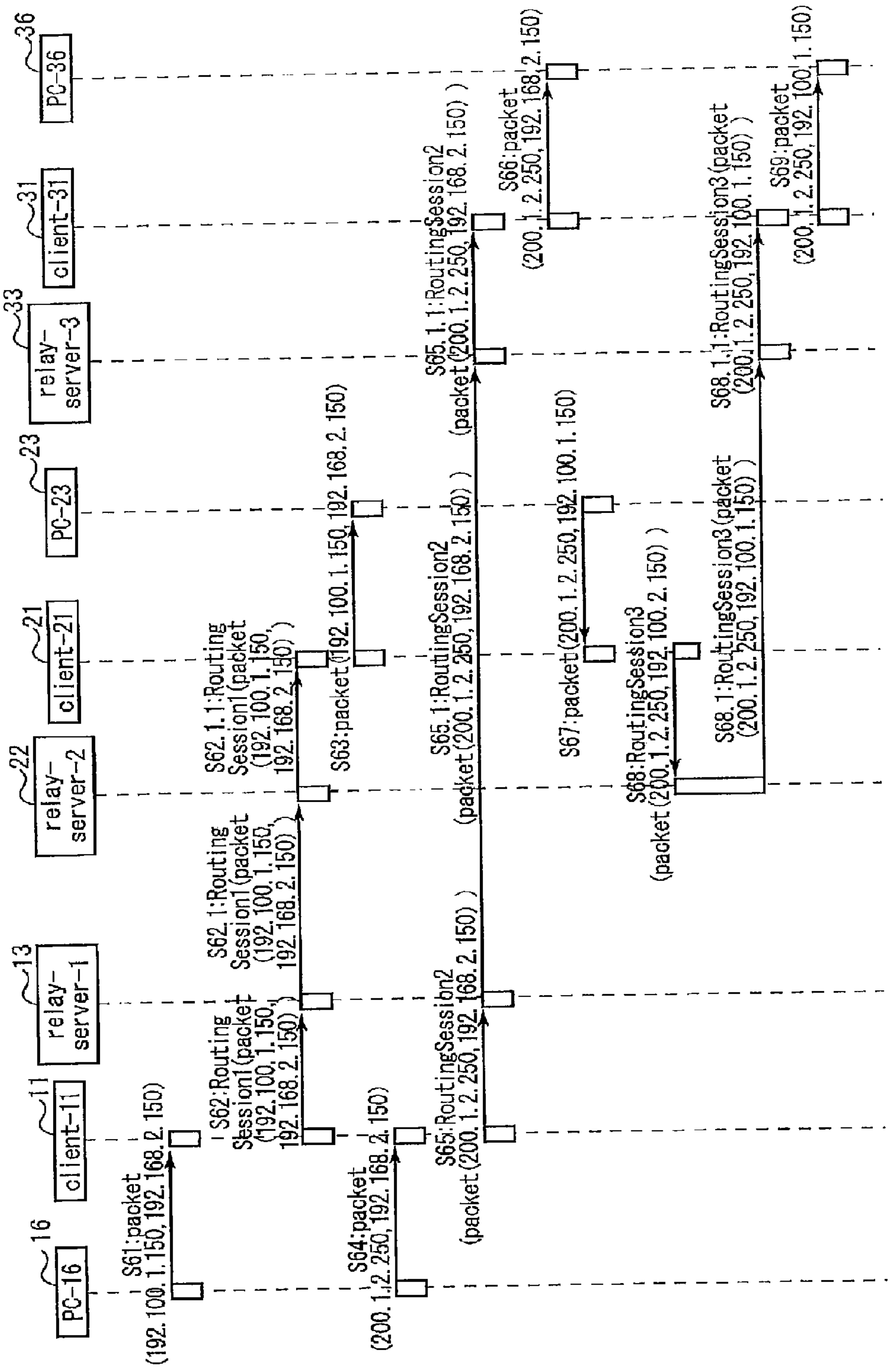
FIG. 21 is a flowchart showing the transfer of a communication packet by using the first to third routing sessions according to a preferred embodiment of the present invention.

FIG. 21 is referred to below. The general terminal 16 sends out a first communication packet destined for the general terminal 23 (Step S61). When the first communication packet is received, the client terminal 11 refers to the routing group information 91, and determines whether or not it is possible to route the first communication packet.

First, based on the routing target information 912, the client terminal 11 determines whether or not the first communication packet can be routed. An IP address "192.100.1.150" of the destination (general terminal 23) of the first communication packet corresponds to the network address of the LAN 2 set in the network information 912-2. An IP address "192.168.2.150" of the transmission source (general terminal 16) corresponds to the network address of the LAN 10-2 set in the network information 912-1. Therefore, the client terminal 11 determines that the first communication packet can be routed.

Next, the client terminal 11 refers to the routing permission information 913, and confirms whether or not the routing of the first communication packet is permitted. The IP address of the transmission source (general terminal 16) of the first communication packet is set in the permitted terminal information 913-1, and the IP address of the destination (general terminal 23) of the first communication packet is set in the permitted terminal information 913-2. Therefore, the client terminal 11 determines that the routing of the first communication packet is permitted. Note that the determination as to whether or not such routing is possible may also be performed based on just one of the IP address of the transmission source of the first communication packet and the IP address of the destination of the same.

Since the identification information of the client terminal 21 is set in the network information 912-2 and the point information 914-1, the client terminal 11 decides to use the first routing session for the routing of the first communication packet. Then, the first communication packet is sent out by using the first routing session (Steps S62, S62.1 and S62.1.1). The client terminal 21 transfers the first communication packet, which has been received through the first routing session, to the general terminal 23 (Step S63).

The first communication packet is encapsulated at the time of being transferred using the first routing session, and accordingly, the general terminals 16 and 23 can communicate with each other without being conscious of the route of the network from the client terminal 11 to the client terminal 21. That is to say, the general terminals 16 and 23 can communicate with each other through the WAN 100 by using the private IP addresses.

Next, the general terminal 16 sends out a second communication packet destined for the general terminal 36 (Step S64). The destination of the second communication packet corresponds to the network information 912-3, and the transmission source of the second communication packet corresponds to the network information 912-1. Accordingly, the client terminal 11 determines that the second communication packet can be routed. Moreover, the IP address "200.1.2.150" of the destination (general terminal 36) of the second communication packet corresponds to "200.1.2.*" set in the permitted terminal information 913-3, and the transmission source of the same corresponds to the permitted terminal information 913-1. Therefore, the client terminal 11 determines that the routing of the second communication packet is permitted, and sends out the second communication packet by using the second routing session (Steps S65, 565.1 and S65.1.1). The client terminal 31 transfers the second communication packet to the general terminal 36 (Step S66).

Next, the general terminal 23 sends out a third communication packet destined for the general terminal 36 (Step S67). The destination of the third communication packet corresponds to the network information 912-3, and the transmission source of the third communication packet corresponds to the network information 912-2. Moreover, the destination of the third communication packet corresponds to the permitted terminal information 913-3, and the transmission source of the same corresponds to the permitted terminal information 913-2. Therefore, the client terminal 21 determines that it is possible to route the received third communication packet, and sends out the third communication packet by using the third routing session (Steps S68, S68.1 and S68.1.1). The client terminal 31 transmits the third communication packet to the general terminal 36 (Step S69).

As described above, the routing function according to this preferred embodiment is validated by sharing the routing group information among the client terminals which can communicate with one another. Then, by using the first to third routing sessions established for the routing, the routing control for the IP packets is performed based on the function of the relay communication system. Accordingly, the routing validated in this preferred embodiment is preferably executed in the application layer, and differs from the conventional IP routing.

Moreover, in this preferred embodiment, in addition to the terms "client terminal" and "general terminal", the term "communication terminal" is deliberately used. The "client terminals" are terminals capable of logging on to the relay servers, the "general terminals" are terminals incapable of logging on to the relay servers, and the "communication terminals" represent all of the terminals including the "relay servers", the "client terminals" and the "general terminals". This is because, by using the above-described routing sessions, routing is possible for the "communication terminals" which are connected to the LANs 1 to 3 and are registered in the permitted terminal information without being limited to the relay servers and the client terminals which are logged on to the relay servers.

As described above, using the routing group information 91, the relay communication system of this preferred embodiment enables the client terminals to function as the routing devices. Thus, the routing control using the relay communication system can be executed with greatly increased flexibility.

Moreover, by registering the communication terminals which can use the routing function in the routing permission information 913, the communication packets to be routed can be restricted. Therefore, the communication terminals which can use the routing function of the relay communication system can be easily managed.

6. Flow of Routing Control (Second Preferred Embodiment)

A description will be provided of routing control according to a second preferred embodiment of the present invention. Configurations of LANs 1 to 3 are preferably similar to the configurations shown in FIG. 16.

This preferred embodiment is different from the above-described first preferred embodiment in that the relay server 13 functions as the routing device, and that ending processing for the routing control is performed. A description will be provided below primarily describing the differences between the second preferred embodiment and the above-described first preferred embodiment.

The relay server 13 creates the routing group information 92 in response to an instruction to construct the second routing group. Note that the control unit 132 of the relay server 13 preferably has a similar configuration to that of the control unit 112 of the client terminal 11.

FIG. 22 is a view showing the routing group information 92. In network information 922-1 of routing target information 922, the network address of the LAN 10-1 is set as "addr", and the identification information of the relay server 13 is set as "router". In network address information 922-2 of the routing target information 922, the network address of the LAN 30-3 is set as "addr", and the identification information of the client terminal 32 is set as "router".

In permitted terminal information 923-1 of routing permission information 923, an IP address "192.168.1.150" of the general terminal 15 is set. In permitted terminal information 923-2, "200.1.3.*" that indicates all of the communication terminals connected to the LAN 30-3 is set. Point information 924-1 of session information 924 corresponds to a fourth routing session, in which the identification information of the relay server 13 and the client terminal 32 are set in "start" and "end".

Figure 23:
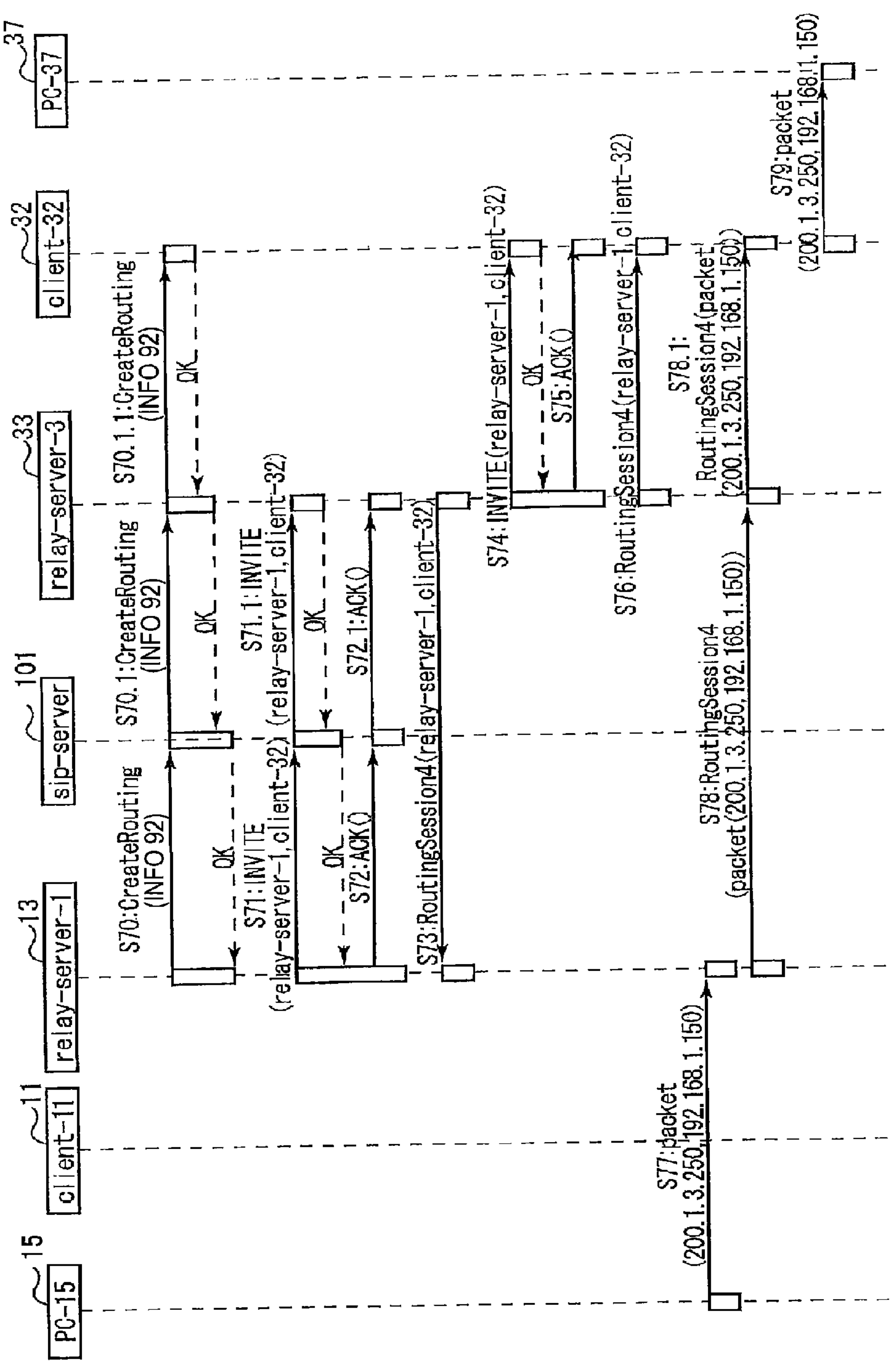
FIG. 23 is a flowchart showing the establishment of a fourth routing session and the transfer of the communication packet by using the fourth routing session according to a preferred embodiment of the present invention.

FIG. 23 is referred to below. The routing group information 92 is transferred to the client terminal 32 through the SIP server 101 and the relay server 33 (Steps S70, S70.1 and S70.1.1). In this manner, the relay server 33, and the relay server 13 and the client terminal 32, which function as the routing devices, share the routing group information 92.

Based on the routing group information 92, the fourth routing session is established between the relay server 13 and the client terminal 32. A media session is established between the relay servers 13 and 33 (Steps S71 and S71.1 and Steps S72, S72.1 and S73). A media session is established between the client terminal 32 and the relay server 33 (Steps S74, S75 and S76). The fourth routing session is composed of the two media sessions established in Steps S73 and S76, for example.

Next, the general terminal 15 sends out a fourth communication packet destined for the general terminal 37 (Step S77). The destination of the fourth communication packet corresponds to the network information 922-2, and the transmission source of the fourth communication packet corresponds to the network information 922-1. Moreover, the destination of the fourth communication packet corresponds to the permitted terminal information 923-2, and the transmission source corresponds to the permitted terminal information 923-1. Therefore, the relay server 13 determines that it is possible to route the received fourth communication packet, and transfers the fourth communication packet to the client terminal 32 by using the fourth routing session (Steps S78, S78.1). The client terminal 32 transfers the fourth communication packet to the general terminal 37 (Steps S79).

Figure 24:
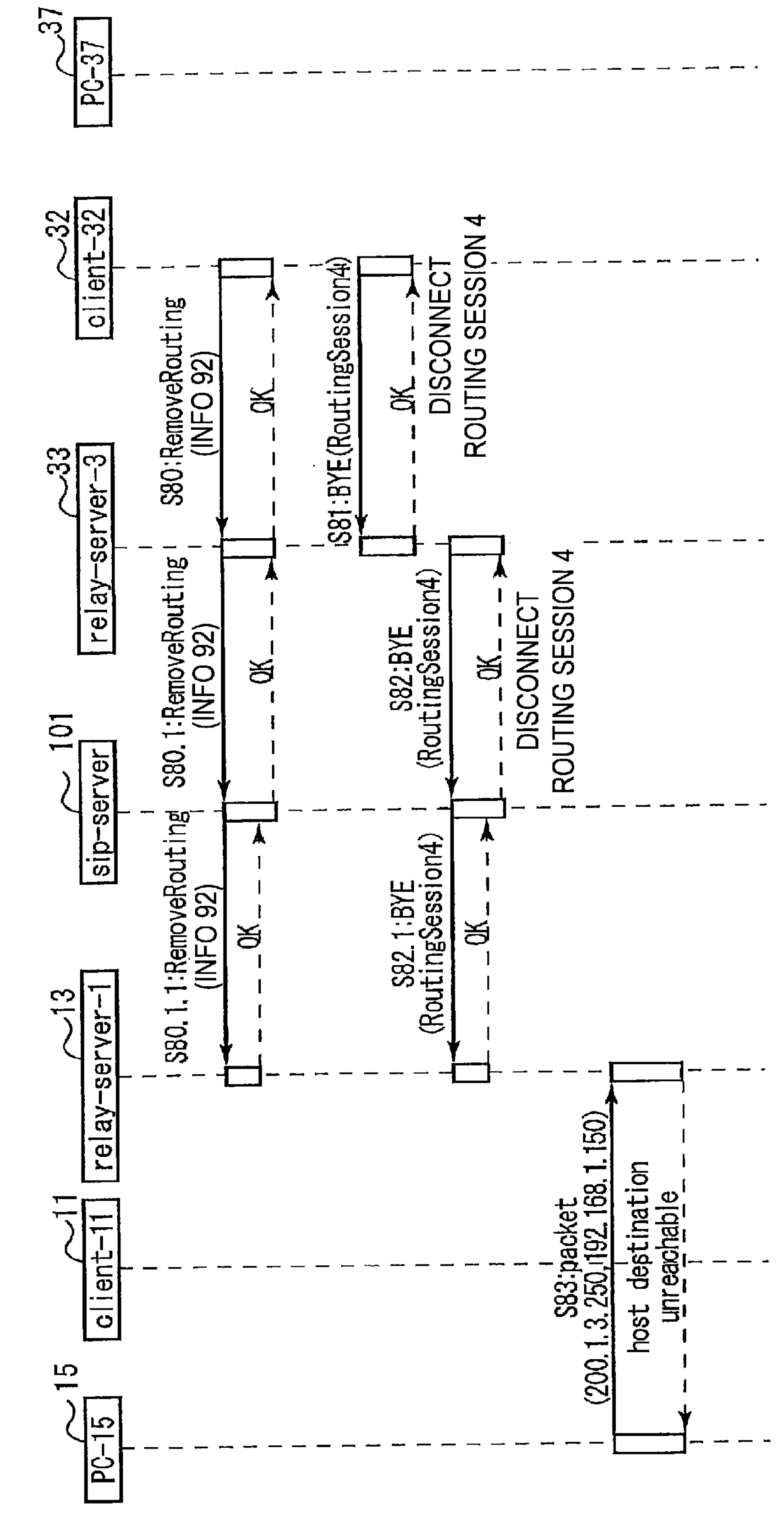
FIG. 24 is a flowchart showing the end of routing processing according to a preferred embodiment of the present invention.

With reference to FIG. 24, a description will be provided of a flow for ending the routing. In response to an instruction to end the routing, which is based on the routing group information 92, the client terminal 32 deletes the routing group information 92. Such an end instruction is transmitted to the relay server 13 through the relay server 33 and the SIP server 101 (Steps S80, S80.1 and S80.1.1.). Based on the end instruction, the relay server 13 deletes the routing group information 92.

When a response to the end instruction has been received, the client terminal 32 transmits a disconnection request of the fourth routing session to the relay server 33 (Step S81). Based on the disconnection request, the media session between the client terminal 32 and the relay server 33 in the fourth routing session is disconnected. The relay server 33 transmits the disconnection request of the fourth routing session to the relay server 13 through the SIP server 101 (Steps S82 and S82.1). Based on the disconnection request, the media session between the relay servers 13 and 33 in the fourth routing session is disconnected. In this manner, the routing processing based on the routing group information 92 is ended.

Following the end of the routing processing, the communication between the general terminals 15 and 37 is not possible. Even if the general terminal 15 sends out the fourth communication packet (Step S83), the relay server 13 cannot recognize the destination of the received fourth communication packet since the relay server 13 does not have the routing group information 92. Therefore, the relay server 13 notifies the general terminal 15 that the fourth communication packet cannot reach the destination.

As described above, in this preferred embodiment, the relay server 13 may function as the routing device. Moreover, in response to the end instruction, the fourth routing session is disconnected, and accordingly, the management of the routing function of the relay communication system is facilitated.

7. Flow of Routing Processing (Third Preferred Embodiment)

A description will be provided of routing processing according to a third preferred embodiment of the present invention. Configurations of LANs 1 to 3 are similar to the configurations shown in FIG. 16. In this preferred embodiment, the configuration of the routing sessions is changed following the change of the routing group information. A description will be provided primarily of the differences between the third preferred embodiment and the above-described first and second preferred embodiments.

First, in response to an instruction of the user, the client terminal 31 updates the routing group information 91 to routing group information 93.

FIG. 25 is a view showing the routing group information 93. Fields that are changed from the routing group information 91 are underlined. A latest update time is changed in the body information 931 and in tags in which "lastmod" had been set.

In routing target information 932, the network information 912-1 and 912-3 are not changed. In place of the network information 912-2, network information 932-1 is set, in which the network address of the LAN 30-3 is set in "addr" and the identification information of the client terminal 32 is registered in "router".

In routing permission information 933, "lastmod" is changed in the permitted terminal information 913-1 and 913-3. In place of the permitted terminal information 913-2, permitted terminal information 933-1 is registered, in which "200.1.3.*" is set in "addr", indicating all of the communication terminals in the LAN 30-3.

In session information 934, the point information 914-2 is not changed. In place of the point information 914-1, point information 934-1 is set, which corresponds to a fifth routing session, and in which the identification information of the client terminals 11 and 32 are registered in "start" and "end". In place of the point information 913-3, point information 934-2 is set, which corresponds to a sixth routing session, and in which the identification information of the client terminals 31 and 32 are registered in "start" and "end".

Figure 26:
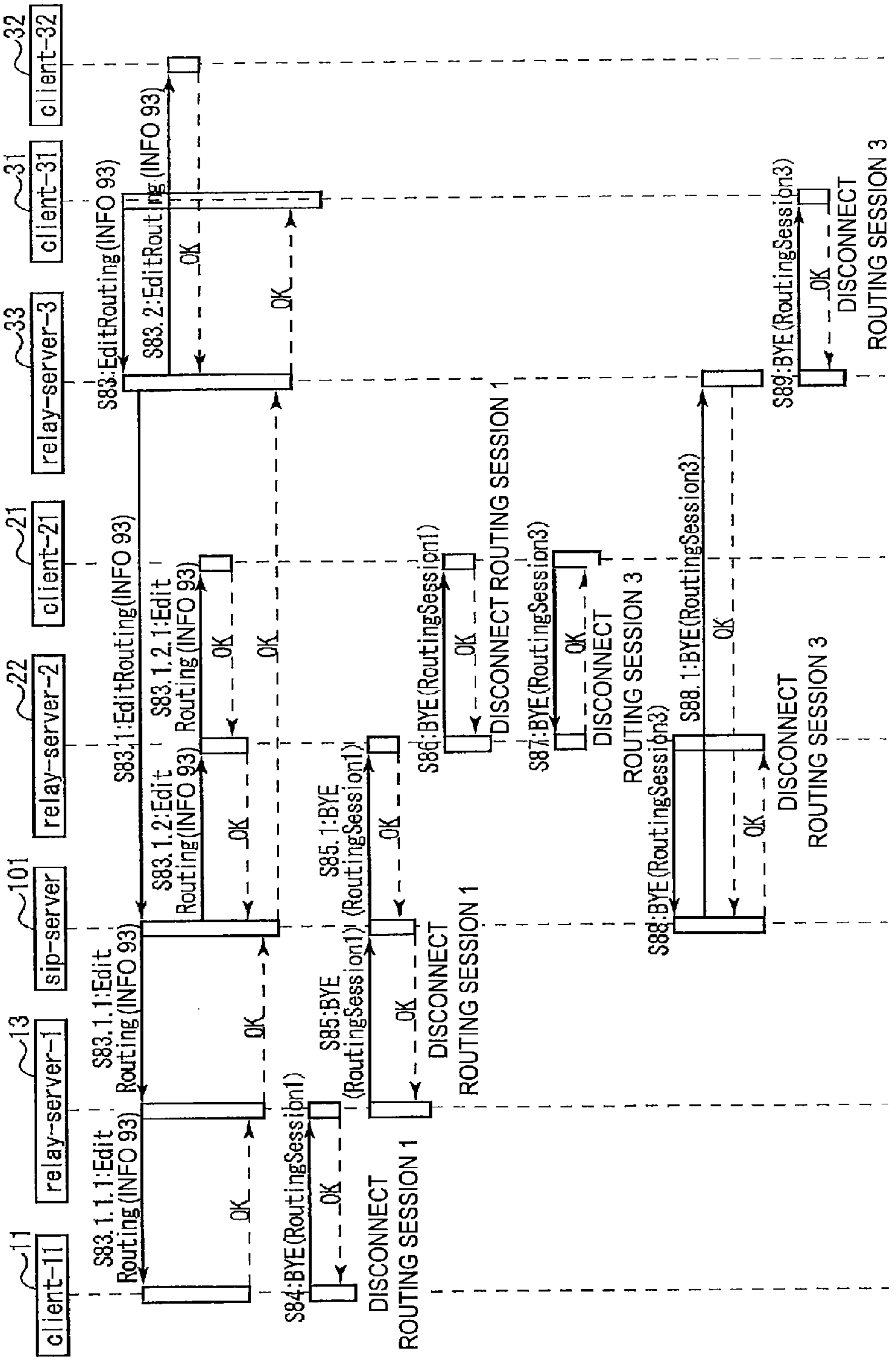
FIG. 26 is a flowchart showing the processing that follows a change of the routing group information according to a preferred embodiment of the present invention.

FIG. 26 is referred to below. As a notice of change of the routing group information 92, the client terminal 31 transmits the routing group information 93 to the relay server 33 (Step S83). The relay server 33 transfers the routing group information 93 as the notice of change to the client terminals whose identification information are set in "router" of the network information 912 and 932. The routing group information 93 is transmitted to the client terminal 11 through the SIP server 101 and the relay server 13 (Steps S83.1, S83.1.1 and S83.1.1.1). The routing group information 93 is transferred to the client terminal 21 from the SIP server 101 through the relay server 22 (Steps S83.1.2, and S83.1.2.1). Moreover, the relay server 33 transmits the routing group information 93 to the client terminal 32 (Step S83.2).

A description will be provided of the disconnection of the first and third routing sessions, which is based on the update to the routing group information 93. The client terminal 11 refers to the routing group information 93, and confirms that the point information 914-1 corresponding to the first routing session has been deleted. Then, the first routing session is disconnected (Steps S84, S85, S85.1 and S86). The client terminal 21 refers to the routing group information 93, and confirms that the terminal itself is not registered in the routing target information 932. Then, the third routing session is disconnected (Steps S87, S88, S88.1 and S89).

Note that the point information 914-2 is in a state of having been set in the routing group information 93, and accordingly, the second routing session established between the client terminals 11 and 31 is maintained.

Figure 27:
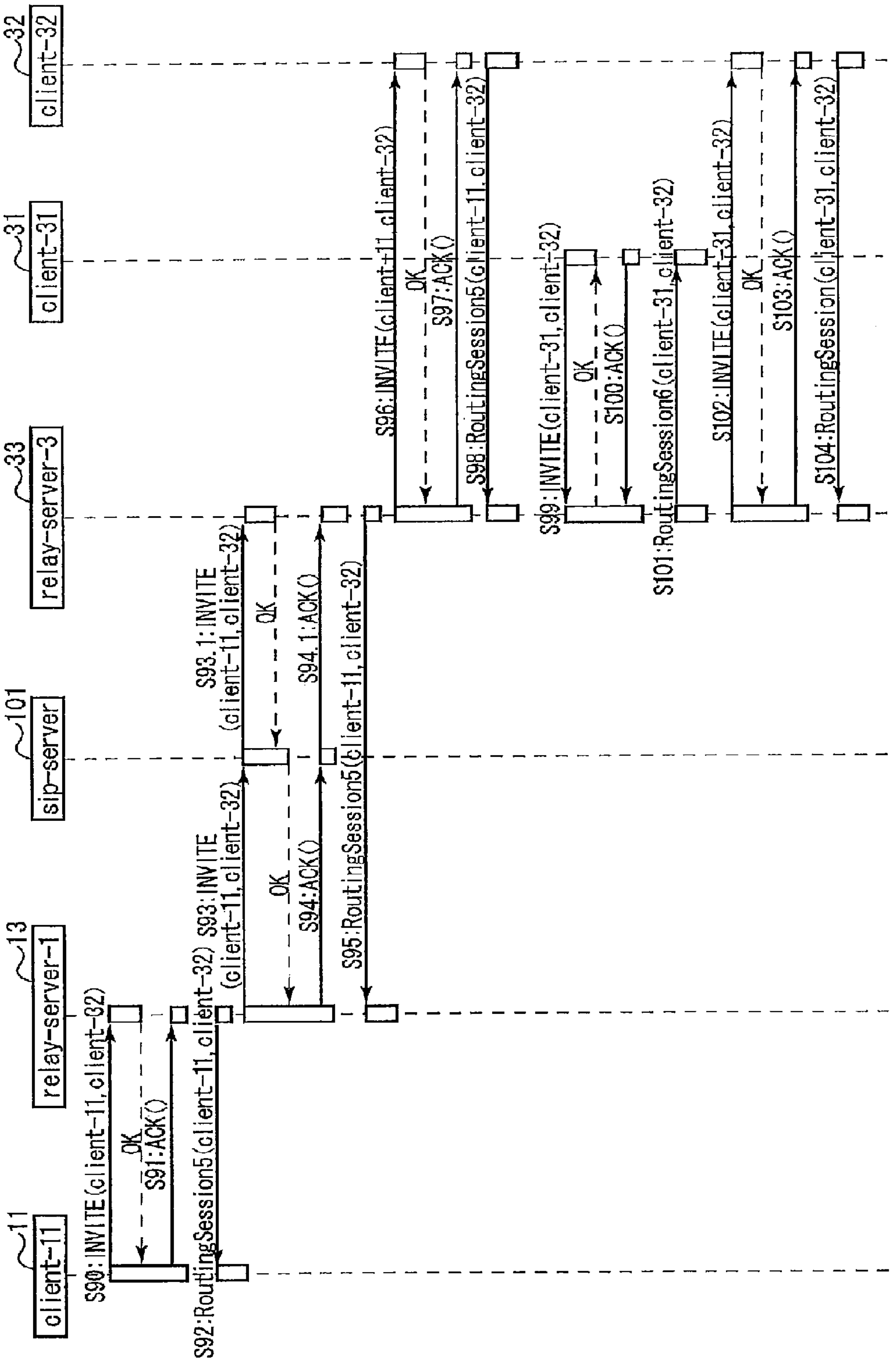
FIG. 27 is a flowchart showing the establishment of fifth and sixth routing sessions according to a preferred embodiment of the present invention.

FIG. 27 is referred to below. In order to establish the fifth routing session between the client terminals 11 and 32, a media session is established between the client terminal 11 and the relay server 13 (Steps S90, S91 and S92). A media session is established between the relay servers 13 and 33 (Steps S93, S93.1, S94, S94.1 and S95). A media session is established between the client terminals 32 and the relay server 33 (S96, S97 and S98). The three media sessions established in Steps S92, S95 and S98 compose the fifth routing session, for example.

Next, in order to establish the sixth routing session between the client terminals 31 and 32, a media session is established between the client terminal 31 and the relay server 33 (Steps S99, S100 and S101) and a media session is established between the client terminal 32 and the relay server 33 (S102, S103 and S104). The two media sessions established in Steps S101 and S104 compose the sixth routing session, for example.

Figure 28:
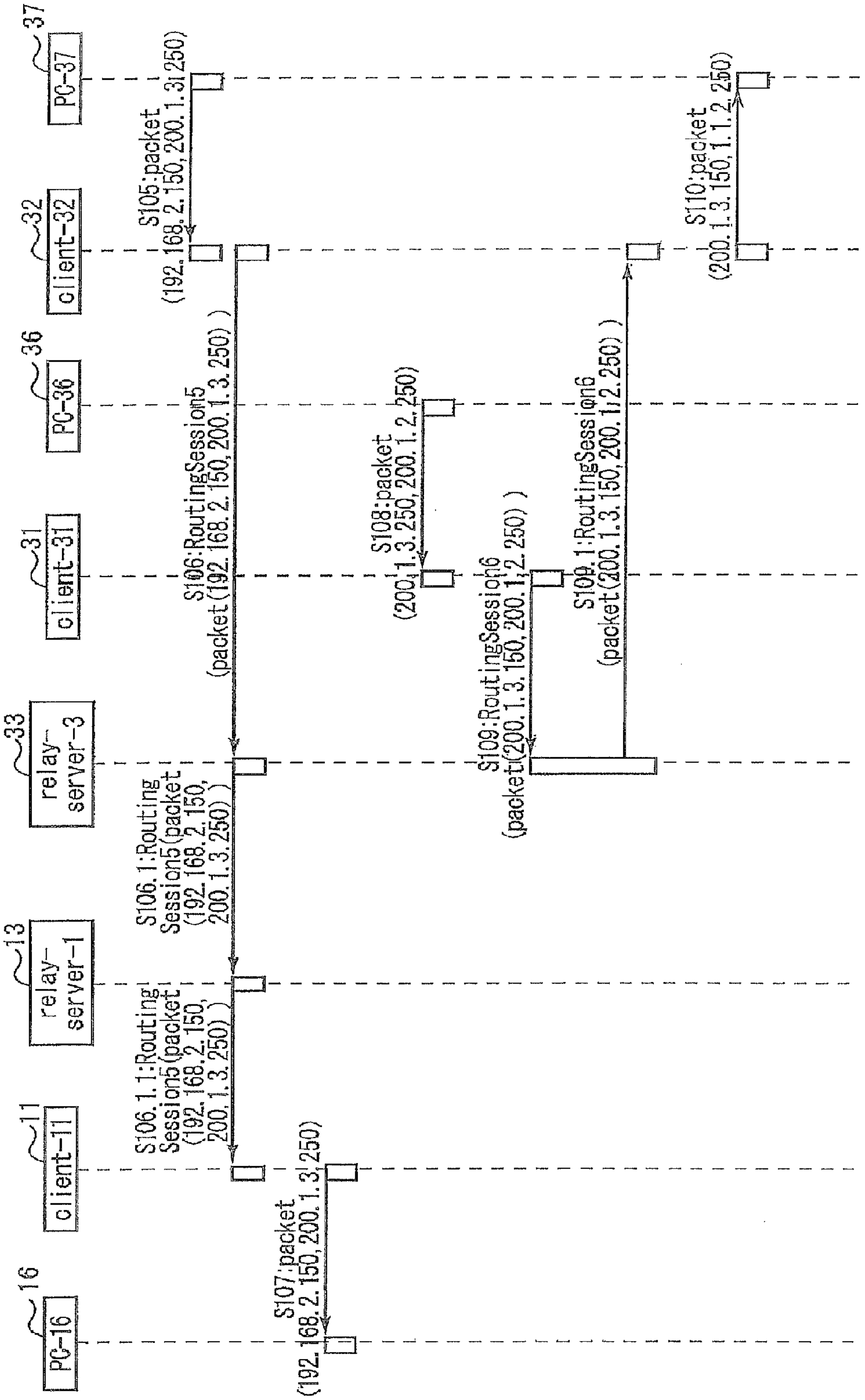
FIG. 28 is a flowchart showing the transfer of the communication packet by using the fifth and sixth routing sessions according to a preferred embodiment of the present invention.

With reference to FIG. 28, a description will be provided of routing processing using the fifth and sixth routing sessions. The general terminal 37 sends out a fifth communication packet destined for the general terminal 16 (Step S105). The destination of the fifth communication packet corresponds to the network information 912-1, and the transmission source of the fifth communication packet corresponds to the network information 932-1. Moreover, the destination of the fifth communication packet corresponds to the permitted terminal information 913-1, and an IP address "200.1.3.250" of the transmission source (general terminal 37) corresponds to "200.1.3.*" set in the permitted terminal information 933-1. Therefore, the client terminal 32 determines that it is possible to route the received fifth communication packet, and transfers the fifth communication packet to the client terminal 11 by using the fifth routing session (Steps S106, S106.1 and S106.1.1). The client terminal 11 transfers the fifth communication packet to the general terminal 16 (Step S107).

Next, the general terminal 36 sends out a sixth communication packet destined for the general terminal 37 (Step S108). The destination of the sixth communication packet corresponds to the network information 932-1, and the transmission source of the sixth communication packet corresponds to the network information 912-3. Moreover, the destination of the sixth communication packet corresponds to the permitted terminal information 933-1, and the transmission source of the same corresponds to the permitted terminal information 913-3. Therefore, the client terminal 31 determines that it is possible to route the received sixth communication packet, and transfers the sixth communication packet to the client terminal 32 by using the sixth routing session (Steps S109 and S109.1). The client terminal 32 transfers the sixth communication packet to the general terminal 37 (Step S110).

As described above, the relay communication system according to this preferred embodiment changes the routing group information 92 to the routing group information 93, and thus, can dynamically change the configurations of the routing sessions.

8. Operations of Client Terminal

Figure 29:
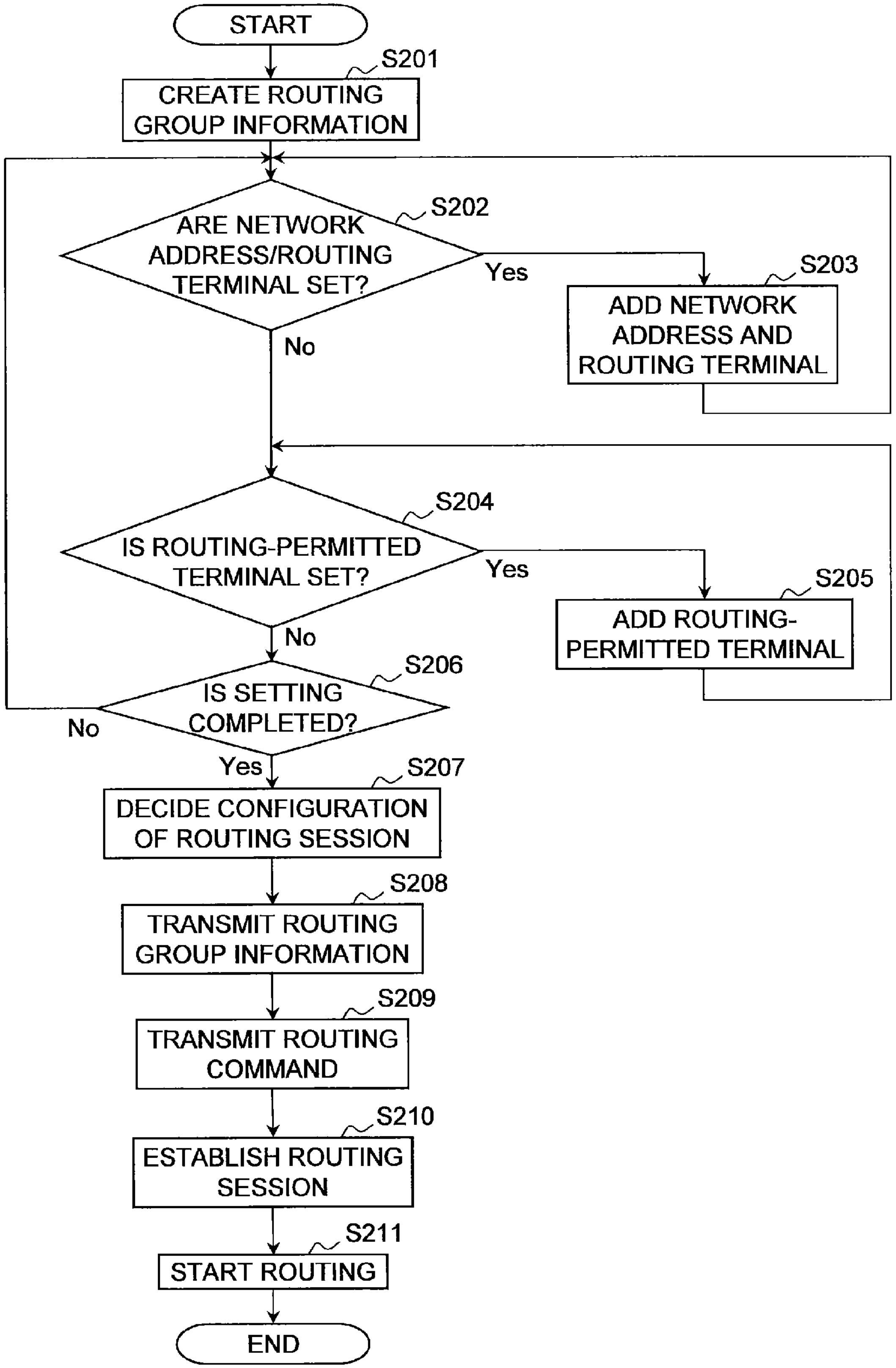
FIG. 29 is a flowchart showing the creation of the routing group information according to a preferred embodiment of the present invention.
Figure 30:
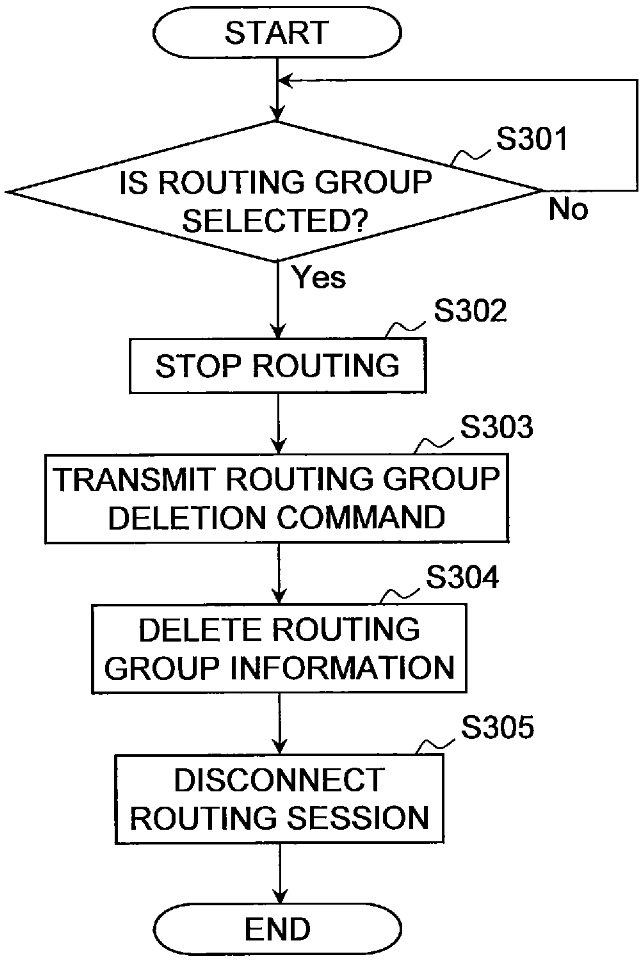
FIG. 30 is a flowchart showing the ending of the routing processing according to a preferred embodiment of the present invention.
Figure 31:
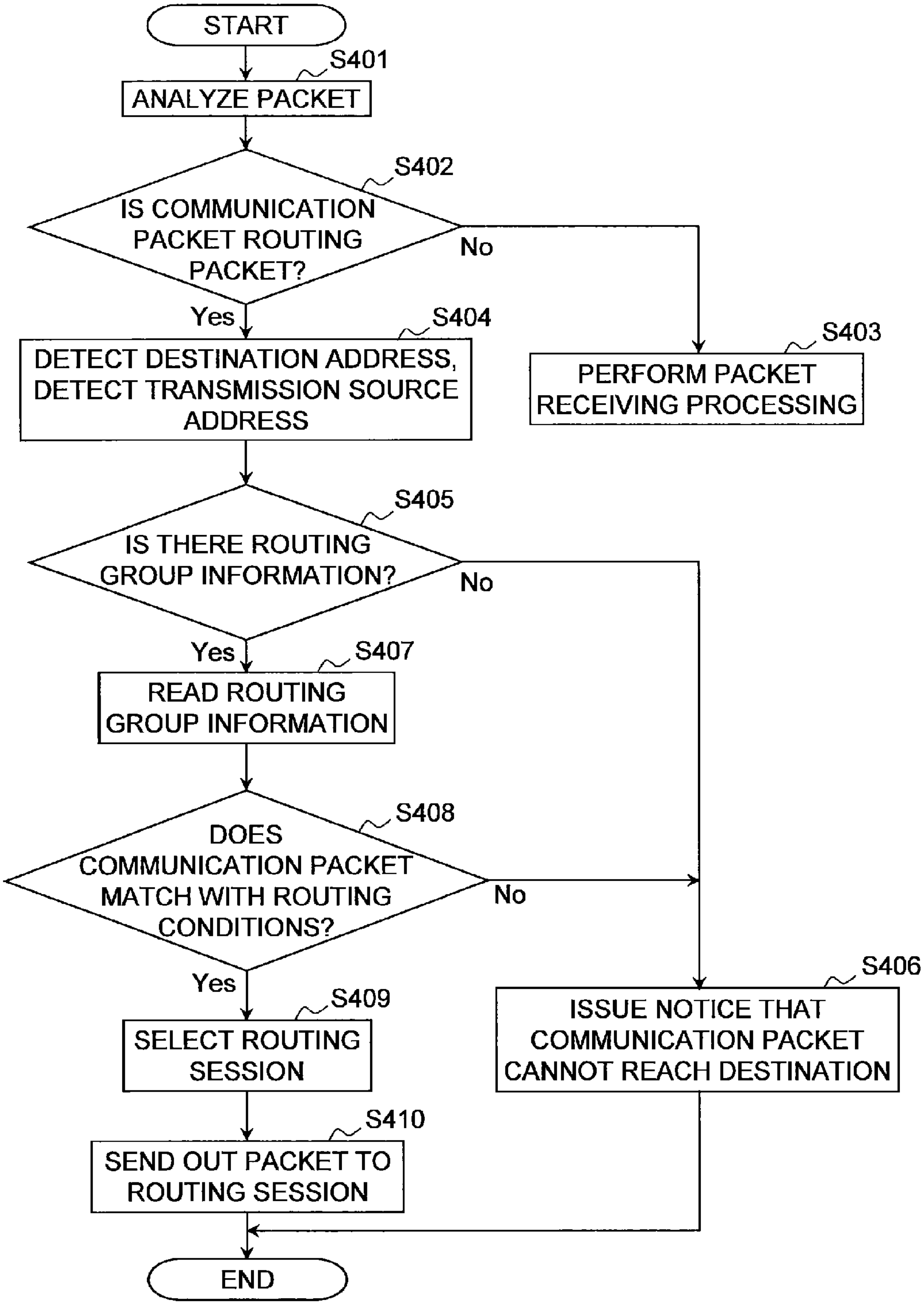
FIG. 31 is a flowchart showing operations of the client terminal that is executing the routing processing according to a preferred embodiment of the present invention.

Here, by referring to FIGS. 29 to 31, a description will be provided of operations of the client terminal that functions as the routing device. The following description is also applied to the relay server 13.

8.1. Start of Routing Processing

FIG. 29 is a flowchart showing the start of the routing processing. Here, the description will be provided using the client terminal 11 as an example.

The client terminal 11 newly creates the routing group information 91 in response to the instruction to construct the first routing group (Step S201). At this point, the network information, the permitted terminal information, and the point information are not set in the routing group information 91.

In the case in which the network address of the LAN and the identification information of the client terminal that functions as the routing device are set (Yes in Step S202), the network information is added to the routing group information 91 (Step S203). In the case in which the communication terminal permitted to use the routing function is set, (Yes in Step S204), the permitted terminal information is added to the routing group information 91 (Step S205).

In the case in which the end of the setting has been instructed (Yes in Step S206), the client terminals registered in each of the network information are set as the start point and the end point, whereby the point information is created (Step S207), and is added to the routing group information 91.

In this manner, the routing group information 91 is set to be in the state shown in FIG. 18. In order to issue a notice of the construction of the first routing group, the routing group information 91 is transmitted to the relay server 13 (Step S208). This processing corresponds to Step S31 (refer to FIG. 17).

Next, the client terminal 11 transmits a routing command that requests the establishment of the routing session (Step S209), and, as a result, the routing session is established (Step S210). The processing of Steps S209 and S210 are repeated based on the number of point information, whereby the first to third routing sessions are established. The processing of Step S209 preferably corresponds or substantially corresponds to Steps S31 to S33 (refer to FIG. 17), and the processing of Step S210 preferably corresponds or substantially corresponds to Steps S34 to S42 (refer to FIG. 17). The client terminal 11 starts routing using the routing sessions (Step S211).

8.2. End of Routing Processing

FIG. 30 is a flowchart showing operations of the client terminal at the time of ending the routing processing. Here, a description will be provided of the operations using, as an example, the client terminal 32 that is executing the routing processing according to the second preferred embodiment based on the second routing group.

First, the user instructs the client terminal 32 to end the routing processing, which is based on the routing group information 92. Since the routing group information 92 is selected as an end target (Yes in Step S301), the client terminal 32 stops the routing processing which uses the fourth routing session (Step S302).

The client terminal 32 transmits a deletion command of the routing group information 92 to the relay server 13 registered in the network information 922-2 (Step S303). This processing corresponds to Steps S80 to S80.1.1. (refer to FIG. 24). The client terminal 32 deletes the routing group information 92 (Step S304). Then, the fourth routing session is disconnected (Step S305). This processing corresponds to Steps S81 to S82.1 (refer to FIG. 24).

8.3. Packet Receiving Processing

FIG. 31 is a flowchart showing operations of the client terminal in a state in which the routing session has been established. Here, a description will be provided of the operations using the client terminal 11 as an example.

When the communication packet has been received, the client terminal 11 analyzes the communication packet (Step S401), and determines whether or not the communication packet is a routing packet (Step S402). If the communication packet is not the routing packet (No in Step S402), the client terminal 11 performs normal packet receiving processing (Step S403).

If the communication packet is the routing packet (Yes in Step S402), the client terminal 11 detects the destination IP address and the transmission source IP address of the communication packet (Step S404). When the client terminal 11 does not have or contain the routing group information 91 (No in Step S405), the client terminal 11 notifies the transmission source of the communication packet that the communication packet cannot reach the destination (Step S406).

When including the routing group information 91 (Yes in Step S405), the client terminal 11 reads the routing group information 91 (Step S407), and confirms whether or not the communication packet matches the routing conditions (Step S408).

In the case in which the communication packet satisfies the following first condition and second condition, it is determined that the communication packet satisfies the routing conditions. The first condition is that the destination IP address and transmission source IP address of the communication packet have been set in any of the network information 912-1 to 912-3. The second condition is that the destination IP address and transmission source IP address of the communication packet correspond to any of the permitted terminal information 913-1 to 913-3.

If the communication packet satisfies the routing conditions (Yes in Step S408), the client terminal 11 selects the routing session to transfer the communication packet (Step S409), and sends out the communication packet to the selected routing session (Step S410). Meanwhile, in the case in which the communication packet does not satisfy the routing conditions (No in Step S408), the client terminal 11 notifies the transmission source that the communication packet cannot reach the destination (Step S406).

As described above, the relay communication system according to the present preferred embodiment routes the communication packet among the communication terminals through the WAN 100 based on the routing group information regarding the routing sessions required for the routing. The client terminals, which function as the routing devices, and the relay servers can establish the routing sessions based on the routing group information. Accordingly, management of the routing function of the relay communication system is facilitated.

Moreover, whether or not the communication packet is to be routed is determined based on the IP addresses set in the permitted terminal information of the routing group information and on the transmission source IP address and destination IP address of the communication packet. Thus, the communication terminals capable of using the routing function of the relay communication system can be easily managed.

9. Flow of Routing Processing (Fourth Preferred Embodiment)

A description will be provided of a flow of routing processing using the relay communication system shown in FIG. 1.

9.1. Detailed Configuration of LANs

Detailed configurations of LANs are similar to those of FIG. 16, and accordingly, a description thereof is omitted herein.

Note that, in this preferred embodiment, a description thereof is provided on the assumption that, unlike other client terminals, the client terminal 12 preferably does not include the routing control function of the communication packet.

9.2. Flow of Processing of Network Search

Figure 32:
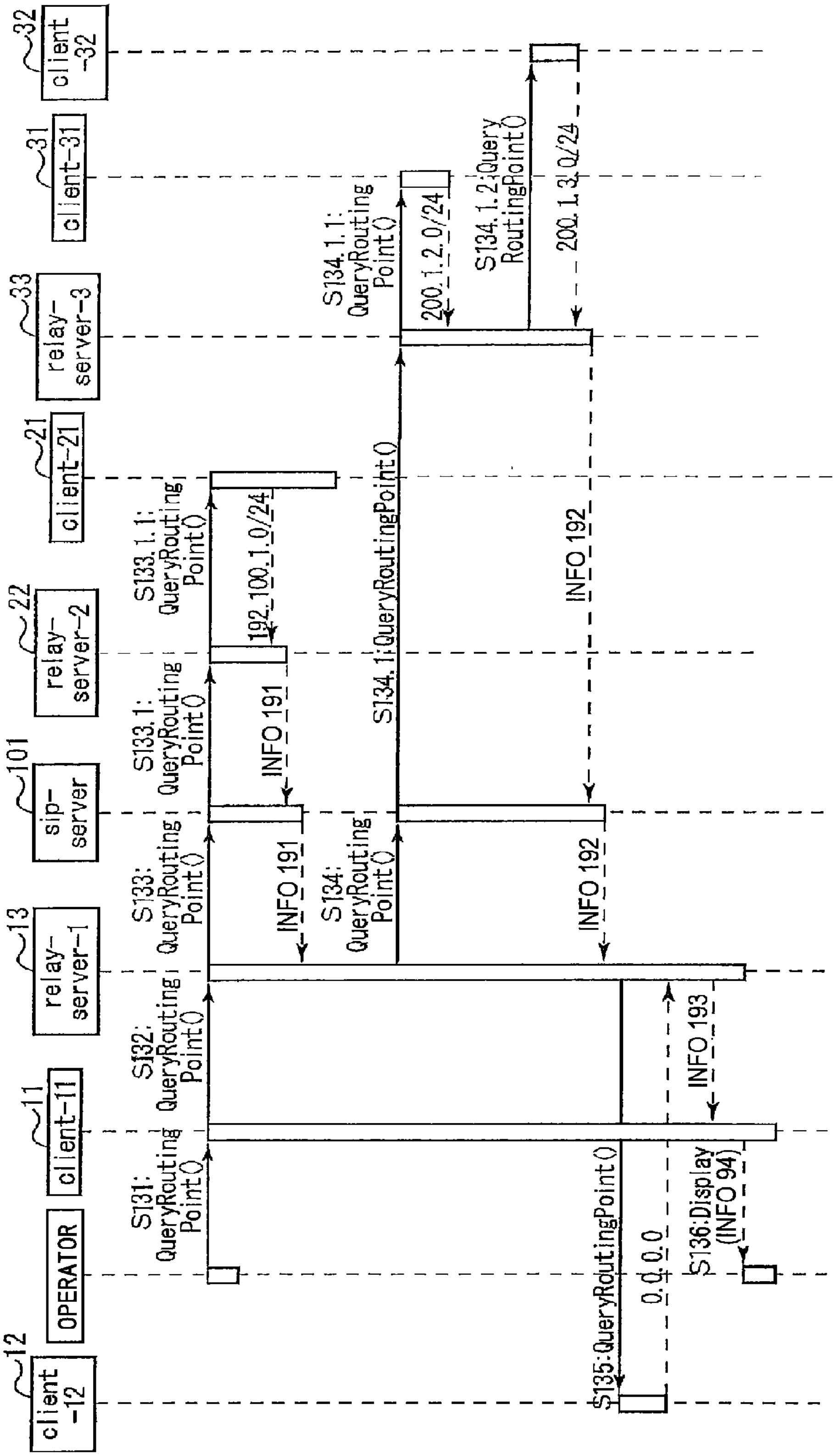
FIG. 32 is a flowchart showing the network search processing according to a preferred embodiment of the present invention.

FIG. 32 is a flowchart showing search processing for the network that is capable of routing the communication packet using the relay communication system. The user of the client terminal 11 inputs an instruction to search the network that is capable of such routing using the relay communication system (Step S131). In response, the client terminal 11 transmits a network search command to the relay server 13 (Step S132).

The relay server 13 refers to relay group information 141, and thereby specifies the relay servers 22 and 33, which define the relay group, as transfer destinations of the network search command. First, the relay server 13 transmits the network search command to the relay server 22 through the SIP server 101 (Steps S133 and S133.1). The relay server 22 refers to the client terminal information 71, and transmits the network search command to the client terminal 21 that is logged on (Step S133.1.1).

The client terminal 21 has the routing function, and is capable of performing routing for the LAN 2, and accordingly, transmits the network address of the LAN 2 to the relay server 22. The relay server 22 creates network search information 191 based on a response of the client terminal 21, and transmits the network search information 191 as a response to the network search command to the relay server 13.

FIG. 33 is a view showing the network search information 191. In the network search information 191, body information 1911 is information regarding the network search information 191 itself. In "name", "IP routing map" is set, which indicates that the network search information 191 is the response to the network search command, and in "owner", the identification information of the relay server 22 is set as a creation source of the network search information 191.

Network search list information 1912 is a list of responses from the relay servers and the client terminals that include the routing function. In routing device response information 1912-1, in "addr", the network address of the LAN 2 is set as the network that is capable of the routing, and in "router" the identification information of the client terminal 21 is set. In routing device response information 1912-2, the network address of the LAN 2, and the identification information of the relay server 22 are set. This is because the relay server 22 may function as the routing device of the LAN 2.

Next, the relay server 13 transmits the network search command to the relay server 33 through the SIP server 101 (Steps S134 and S134.1). The relay server 33 transfers the network search command to the client terminals 31 and 32 (Steps S134.1.1 and S134.1.2). The client terminals 31 and 32 including the routing function respectively transmit, to the relay server 33, the network addresses of the LANs 30-2 and 30-3 that are capable of the routing. The relay server 33 creates network search information 192 based on responses of the client terminals 31 and 32, and transmits the network search information 192 to the relay server 13.

FIG. 34 is a view showing the network search information 192. In “owner” of body information 1921, the identification information of the relay server 33 is set. In routing device response information 1922-1 of network search list information 1922, the network address of the LAN 30-2 and the identification information of the client terminal 31 are set. In routing device response information 1922-2, the network address of the LAN 30-3, and the identification information of the client terminal 32 are set. The relay server 33 that does not include the routing function is not registered in the network search information 192.

FIG. 32 is again referred to below. The relay server 13 transmits a network search command to the client terminal 12 (Step S135). Since the client terminal 12 does not include the routing function, the client terminal 12 does not transmit, as a response to the network search command, the network address of the LAN capable of the routing.

The relay server 13 synthesizes the received network search information 191 and 192, thereby creates network search information 193. As a response to the network search command, the network search information 193 is transmitted to the client terminal 11.

The client terminal 11 preferably includes the routing function, and is capable of routing for the LAN 10-2, and accordingly, updates the network search information 193 to network search information 194. Then, based on the network search information 194, the client terminal 11 displays a search result of the network on a monitor (Step S136).

FIG. 35 is a view showing the network search information 194. In “owner” of body information 1941, the identification information of the client terminal 11 is set. Network search list information 1942 is a list of the network addresses of the LANs capable of the routing in the relay communication system.

Routing device response information 1932-1 is information added at the time when the network search information 191 and 192 are synthesized and the network search information 193 is created. In the routing device response information 1932-1, the network address of the LAN 10-1 for the relay server 13 that is capable of routing, and the identification information of the relay server 13 are set.

Routing device response information 1942-1 is added when the network search information 193 is updated to the network search information 194. In routing device response information 1942-1, the network address of the LAN 10-2 for the client terminal 11 that is capable of routing, and the identification information of the client terminal 11 are set.

FIG. 36 is a list of the LANs displayed as a result of the network search on the monitor of the client terminal 11 based on the network search information 194. As shown in FIG. 36, the network addresses of the LANs that are capable of the routing and the relay servers or the client terminals, which are capable of the routing control for the respective LANs, are displayed in association with each other. The user of the client terminal 11 refers to the list shown in FIG. 36, and confirms the LANs that are capable of the routing in the relay communication system.

Note that, in the network search processing, since only networks that are capable of using the routing function of the relay communication system need to be searched, it is not necessary to set the identification information of the client terminal or the relay server in each piece of the routing device response information.

Figure 37:
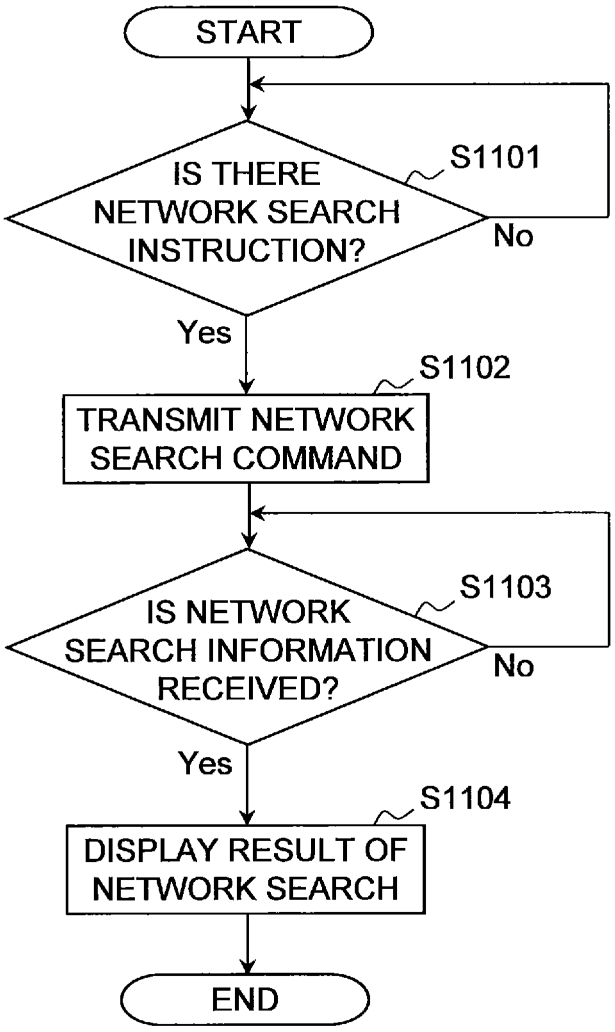
FIG. 37 is a flowchart showing operations of the client terminal instructed to search a network according to a preferred embodiment of the present invention.

FIG. 37 is a flowchart showing operations of the client terminal 11 that executes the network search. Processing shown in FIG. 37 corresponds to Steps S131 and S132 in FIG. 32. In the case in which the client terminal 11 has been instructed to perform the network search (Yes in Step S1101), the client terminal 11 transmits the network search command to the relay server 13, to which the client terminal 11 is logged on, based on the relay server information 53 (refer to FIG. 12) (Step S1102). When having received network search information 193 as a response to the network search command (Yes in Step S1103), the client terminal 11 updates the network search information 193 to the network search information 194. Then, the list shown in FIG. 36 is displayed on the monitor of the client terminal 11 based on the network search information 194 (Step S1104).

Figure 38:
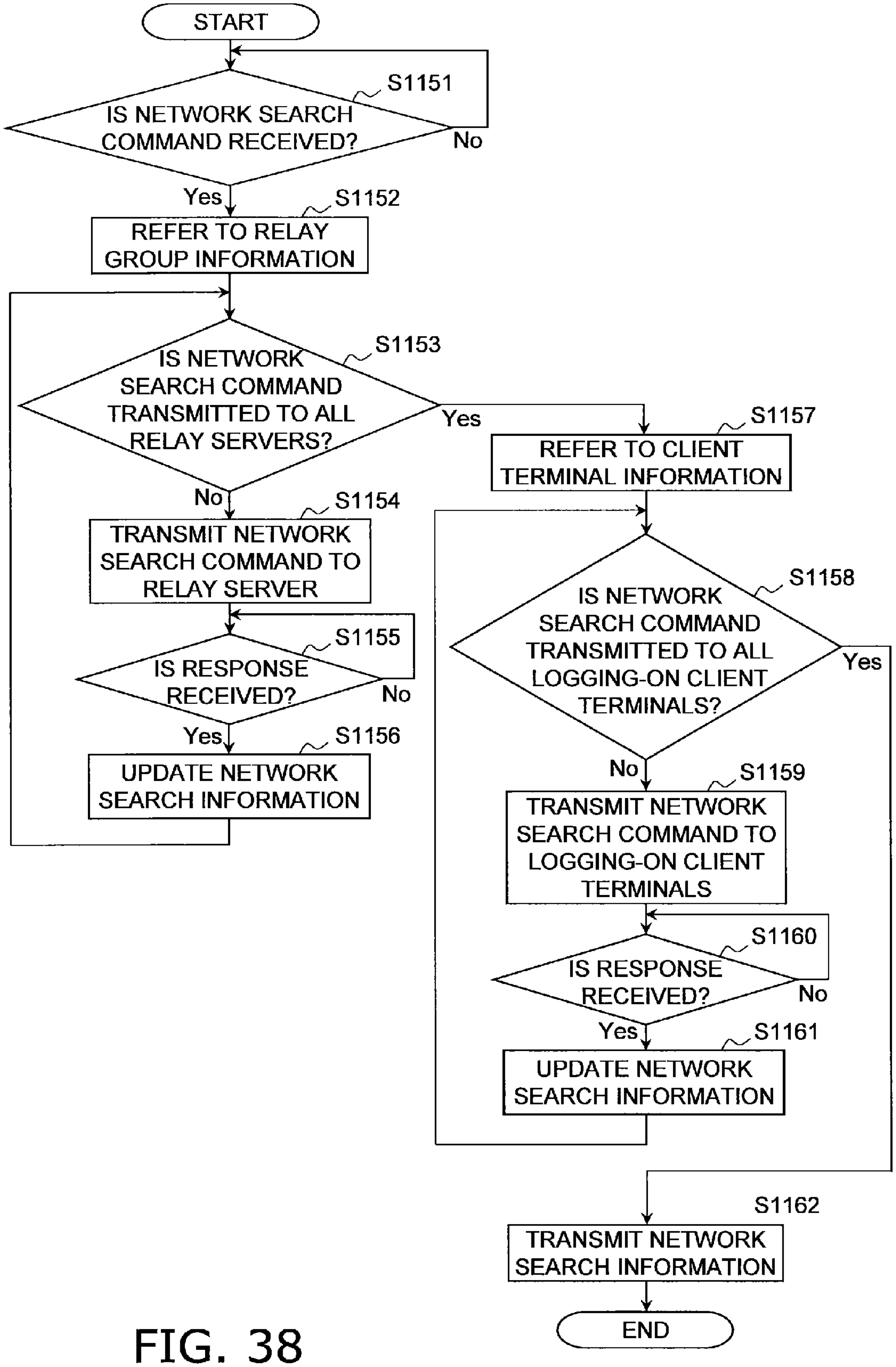
FIG. 38 is a flowchart showing operations of the relay server at a time of receiving a network search command according to a preferred embodiment of the present invention.

FIG. 38 is a flowchart showing operations of the relay server 13 that has received the network search command. When having received the network search command from the client terminal 11 (Yes in Step S1151), the relay server 13 refers to the relay group information 141 (Step S1152). In the case in which the network search command has not been transmitted to all of the relay servers registered in the relay group information 141 (No in Step S1153), the network search command is transmitted to the relay servers specified in the relay group information 141 (Step S1154). This processing corresponds to the processing of Steps S133 and S133.1 and the like (refer to FIG. 32). When having received a response to the network search command (Yes in Step S1155), the relay server 13 updates the network search information based on the received response (Step S1156), and returns to Step S1153.

In the case in which the network search command has been transmitted to all of the relay servers (Yes in Step S1153), the relay server 13 refers to the client terminal information 63 (refer to FIG. 12) (Step S1157). In the case in which the network search command has not been transmitted to all of the client terminals which are logged on (No in Step S1158), the relay server 13 specifies the client terminals, which are logged on, from the client terminal information 63 (refer to FIG. 12). The network search command is transmitted from the relay server 13 to the specified client terminals (Step S1159). This processing substantially corresponds to the processing of Step S135 in FIG. 32. When having received a response to the network search command (Yes in Step S1160), the relay server 13 updates the network search information based on the received response (Step S1161), and returns to Step S1158.

In the case in which the network search command has been transmitted to all of the client terminals which are logged on (Yes in Step S1158), the relay server 13 transmits the network search information to the client terminal as the transmission source of the network search command (Step S1162). In this manner, the processing of the relay server 13 that has received the network search command is ended.

9.3. Flow of Route Search Processing

Figure 39:
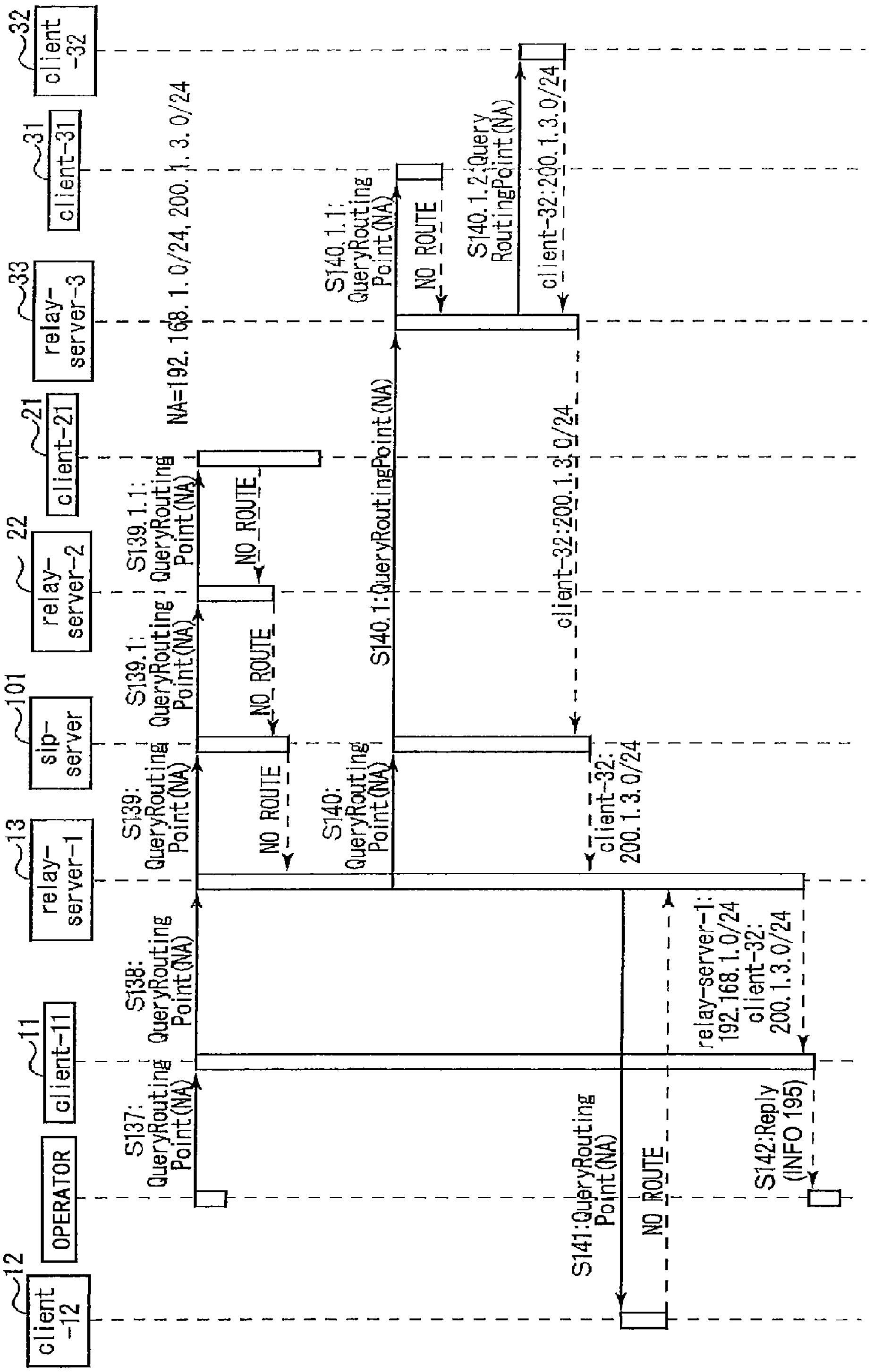
FIG. 39 is a flowchart showing route search processing according to a preferred embodiment of the present invention.

FIG. 39 is a chart showing a flow of route search processing. The user of the client terminal 11 refers to the network search information 194, and issues an instruction regarding a route search of the LANs 10-1 and 30-3 as targets of the routing control (Step S137). A route search command is a command to issue an instruction to search a routing route for routing for the LAN designated by the user. The client terminal 11 transmits a route search command, in which the network addresses of the LANs 10-1 and 30-3 are set, to the relay server 13 to which the client terminal 11 are logged on (Step S138).

In response to receiving the route search command, the relay server 13 creates new response information to the route search command. In a similar manner to the transfer of the network search command, the relay server 13 transmits the route search command to the relay servers 22 and 33 based on the relay group information 141. First, the route search command is transmitted from the relay server 13 to the client terminal 21 through the SIP server 101 and the relay server 22 (Steps S139, S139.1, and S139.1.1). The client terminal 21 and the relay server 22 cannot handle the routing of the LANs 10-1 and 30-3. Therefore, the client terminal 21 notifies the relay server 22 that the routing is not possible (NO ROUTE), and the relay server 22 notifies the relay server 13 that the routing is not possible.

Next, the route search command is transmitted from the relay server 13 to the client terminals 31 and 32 through the SIP server 101 and the relay server 33 (Steps S140, S140.1, S240.1.1 and S140.1.2).

The client terminal 31 cannot handle the routing of the LANs 10-1 and 30-3, and accordingly, issues a notice that the routing is not possible. The client terminal 32 is connected to the LAN 30-3, and includes the routing function. Therefore, the client terminal 32 transmits the identification information of itself and the network address of the LAN 30-3 to the relay server 33, and issues a notice thereto that the routing is possible. Moreover, the relay server 33 does not include the routing function. As a result, the relay server 33 creates specifying information that specifies the client terminal 32, which is capable of operating as a routing point of the LAN 30-3, and transmits the specifying information to the relay server 13. In the specifying information, the identification information of the client terminal 32 and the network address of the LAN 30-3 are associated with each other. The relay server 13 adds the specifying information to response information 195 to the route search command.

Next, the relay server 13 transmits the route search command to the client terminal 12 (Step S141). The client terminal 12 does not include the routing function, and accordingly, notifies the relay server 13 that the routing is not possible.

The relay server 13 includes the routing function, and is capable of routing for the LAN 10-1. Therefore, the relay server 13 adds, to the response information to the route search command, specifying information in which the identification information of the relay server 13 and the network address of the LAN 10-1 are associated with each other. Then, the response information to the route search command is transmitted from the relay server 13 to the client terminal 11. The client terminal 11 displays, as a result of the route search, the route search information 195 created based on the response information to the route search command (Step S142).

FIG. 40 is a view showing the route search information 195. In body information 1951, "IP routing group 1" assigned by the user at the time of issuing the instruction of the route search is set in "name", and the identification information of the client terminal 11 is set in "owner".

Routing target information 1952 is route information for use in the routing control for the LANs 10-1 and 30-3. Network information 1952-1 and 1952-2 correspond to the above-mentioned specifying information. Since the network address of the LAN 10-1 has been set, and the identification information of the relay server 13 has been set, the network information 1952-1 indicates that the relay server 13 is executing the routing control for the LAN 10-1. In a similar manner, the network information 1952-2 indicates that the client terminal 32 is executing the routing control for the LAN 30-3.

Note that the pieces of network search list information included in the network search information 191 to 194 preferably have a similar configuration to that of the routing target information 1952. As mentioned above, the routing target information 1952 indicates that the routing control for the LANs 10-1 and 30-3 is performed by the relay server 13 and the client terminal 32. On the other hand, however, the network search list information is the list of the LANs capable of the routing. Thus, there is no relationship between the routing target information 1952 and the network search list information 1912.

As described above, the user of the client terminal 11 designates the network address that functions as the target of the routing control, and issues the instruction on the route search, to thereby acquire the route search information 195. Therefore, when validating the routing function of the relay communication system, it is not necessary to confirm the relay servers, the client terminals, and other components which include the routing function.

Figure 41:
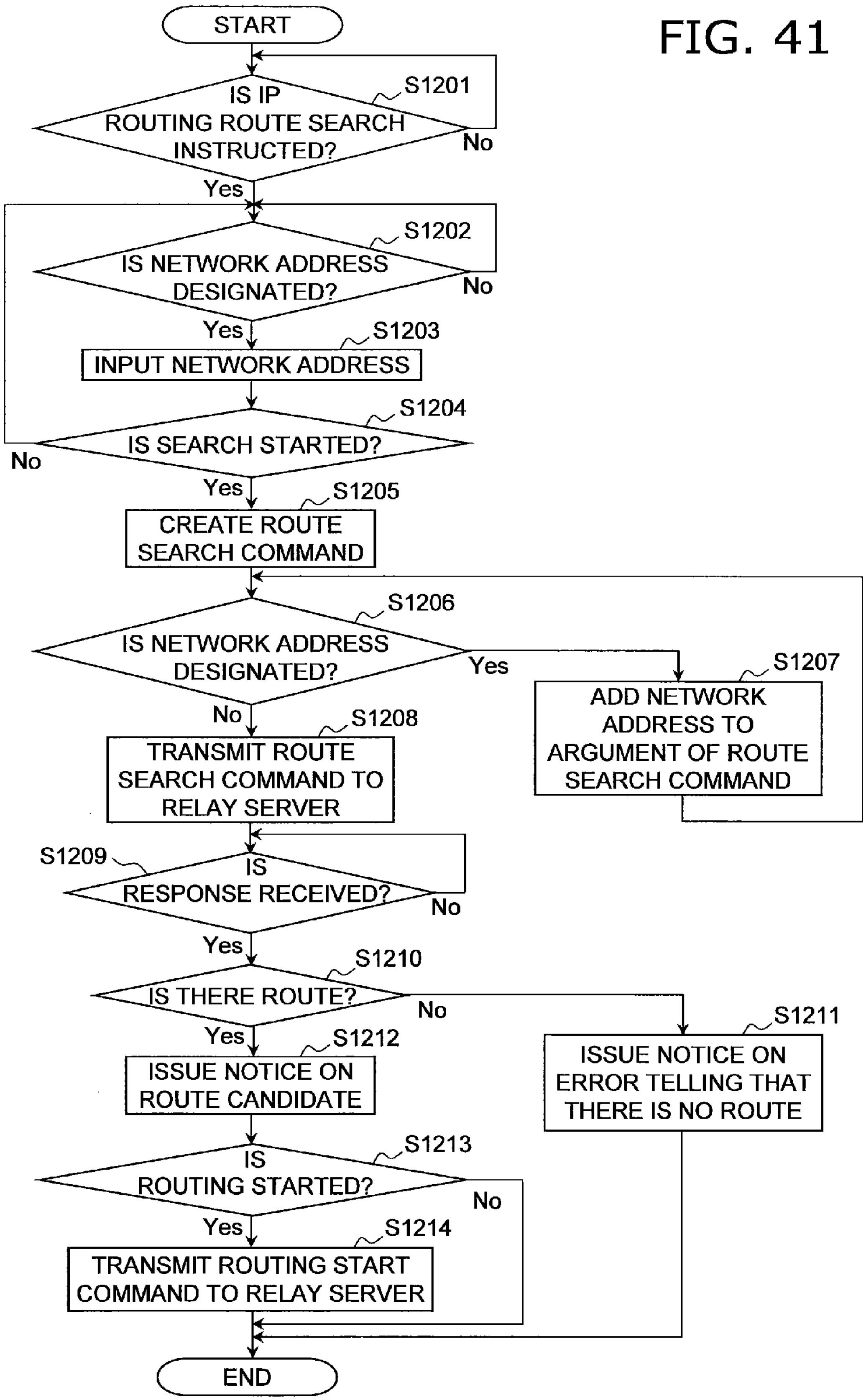
FIG. 41 is a flowchart showing operations of the client terminal instructed to search a route according to a preferred embodiment of the present invention.

FIG. 41 is a flowchart showing operations of the client terminal 11 that is instructed to perform the route search. When having been instructed to perform the route search (Yes in Step S1201), the client terminal 11 asks the user to confirm whether or not the network address functioning as the target of the route search is to be designated (Step S1202). In the case in which the network address is designated (Yes in Step S1202), the user of the client terminal 11 inputs the network address (Step S1203). Then, when the start of the route search is instructed (Yes in Step S1204), the client terminal 11 creates a route search command in which the inputted network address is set (Step S1205). In the case in which a network address is further designated (Yes in Step S1206), the client terminal 11 adds the designated network address to an argument of the route search command (Step S1207). In the case in which no network address is further added (No in Step S1206), the client terminal 11 transmits the route search command to the relay server 13 (Step S1208).

When having received the response to the route search command (Yes in Step S1209), the client terminal 11 confirms the response. In the case in which the specifying information corresponding to the designated LAN is not included in the response, the client terminal 11 determines that there is no routing route (No in Step S1210). Then, the client terminal 11 issues a notice of an error, indicating that a routing route of the designated LAN could not be found (Step S1211). Meanwhile, in the case in which the client terminal 11 determines that there is a routing route (Yes in Step S1210), the client terminal 11 creates the route search information 195 based on the received response, and displays candidates of the routing route on the monitor (Step S1212).

The user of the client terminal 11 selects the routing route from the results of the route search, which are displayed on the monitor. In the case in which an instruction is issued on the start of the routing control through the route selected by the user (Yes in Step S1213), the client terminal 11 transmits the routing start command to the relay server 13 (Step S1214). A description will be provided later of the start processing for the routing control.

Figure 42:
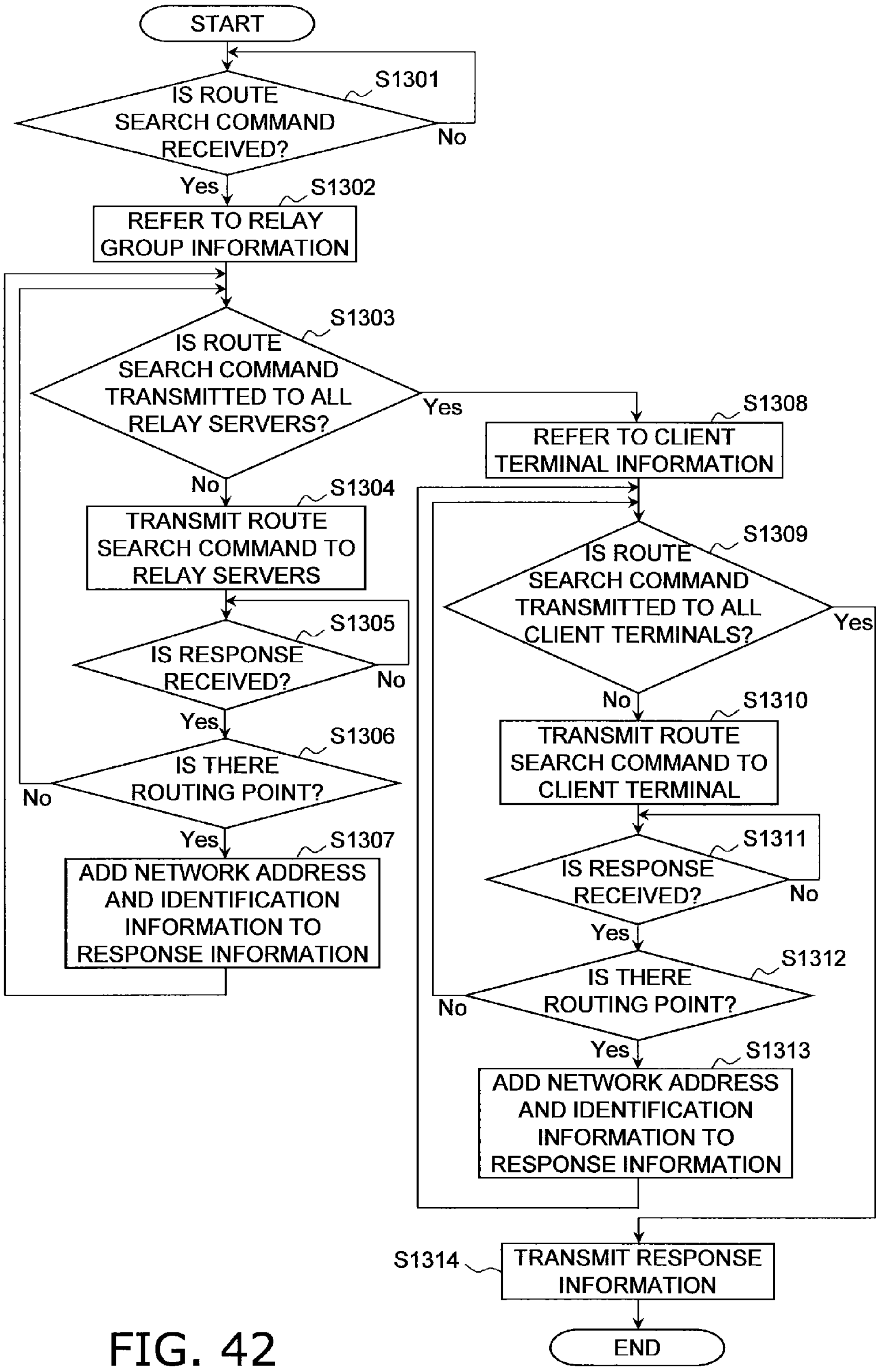
FIG. 42 is a flowchart showing operations of the relay server that has received the route search command according to a preferred embodiment of the present invention.

FIG. 42 is a flowchart showing operations of the relay server 13 that has received the route search command. When the route search command (Yes in Step S1301) has been received, the relay server 13 refers to the relay group information 141 (Step S1302). In the case in which the route search command has not been transmitted to all of the relay servers registered in the relay group information 141 (No in Step S1303), the route search command is transferred to a relay server specified in the relay group information 141 (Step S1304). This processing substantially corresponds to processing in Steps S139 and S139.1 in FIG. 39.

When having received the response to the route search command (Yes in Step S1305), the relay server 13 confirms the response (Step S1306). In the case in which the specifying information is not included in the response (No in Step S1306), the operation of the relay server 13 returns to Step S1303. In the case in which the specifying information is included in the response (Yes in Step S1306), the relay server 13 adds the specifying information to the response information to the route search command (Step S1307), and the operation returns to Step S1303. Moreover, in the case in which the relay server 13 is able to route for the LAN designated in the route search command, the relay server 13 adds specifying information which corresponds to the relay server 13 to the response information to the route search command.

In the case in which the route search command has been transmitted to all of the relay servers (Yes in Step S1303), the relay server 13 refers to the client terminal information 63 (refer to FIG. 12) (Step S1308).

In the case in which the route search command has not been transmitted to all of the client terminals (excluding the transmission source of the route search command) registered in the client terminal information 63 (No in Step S1309), the transfer destination of the route search command is specified based on the client terminal information 63. Then, the relay server 13 transmits the route search command to the specified transfer destination (Step S1310). This processing substantially corresponds to Step S141 in FIG. 39.

Processing of Steps S1311, S1312 and S1313 is similar to the processing of Steps S1305 to S1307. Then, in the case in which the route search command has been transmitted to all of the client terminals (Yes in Step S1309), the relay server 13 transmits the response information to the route search command to the client terminal 11 (Step S1314).

5.4. Flow of Routing Start Processing

Figure 43:
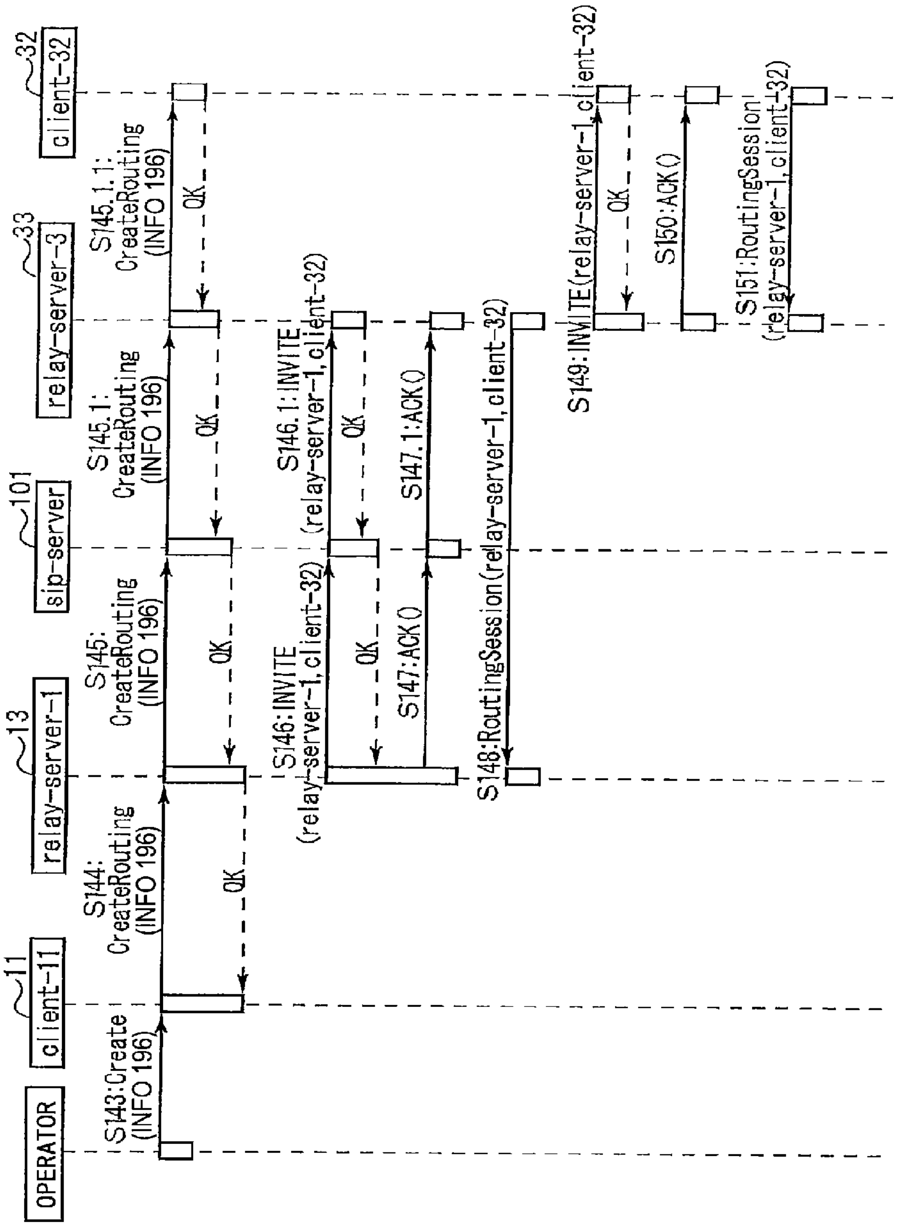
FIG. 43 is a flowchart showing the start of routing according to a preferred embodiment of the present invention.

FIG. 43 is a flowchart showing the start processing for the routing control using the relay communication system.

The user of the client terminal 11 designates the relay server 13 and the client terminal 32 as routing points based on the route search result displayed on the monitor, and issues the instruction to start the routing control (Step S143). The client terminal 11 transmits the routing start command to the relay server 13 in addition to the network information 1952-1 and 1952-2 (Step S144). Steps S143 and S144 substantially correspond to Steps S1213 and S1214 shown in FIG. 41.

Based on the received routing start command, the relay server 13 creates routing group information 196 from the route search information 195. The routing group information 196 is routing setting information to execute the routing control using the relay communication system, and is stored in the routing group information storage unit 137.

FIG. 44 is a view showing the routing group information 196. The routing group information 196 is created by adding routing permission information 1963 and session information 1964 to the route search information 195.

The routing permission information 1963 indicates the communication terminals that are capable of using the routing function of the relay communication system, and includes permitted terminal information 1963-1 and 1963-2. Here, in addition to the terms "client terminal" and "general terminal", the term "communication terminal" is also deliberately used. The "client terminals" are terminals that are capable of logging on to the relay servers, the "general terminals" are terminals that are not capable of logging on to the relay servers, and the "communication terminals" represent all of the terminals including the "relay servers", the "client terminals" and the "general terminals". This is because, by using the routing function of the relay communication system, routing is possible for the "communication terminals" which are connected to the LANs 1 to 3 and registered in the permitted terminal information without being limited to the relay servers and the client terminals which are logged on to the relay servers.

In each of the permitted terminal information, "name" and "addr" indicate the name and IP address of the communication terminal or the LAN, which is capable of using the routing function. In the permitted terminal information 1963-1, "192.168.1.*" is set, indicating all of the communication terminals connected to the LAN 10-1. In the permitted terminal information 1963-2, "200.1.3.*" is set, indicating all of the communication terminals connected to the LAN 30-3.

Note that, at the time of the start instruction of the routing (Step S143), the user of the client terminal 11 may designate the client terminals, the relay servers, the general terminals, and other components or devices, which are registered in the permitted terminal information. In this case, the route search information 195 added with the routing permission information 1963 is transmitted to the relay server 13 (Step S144).

The session information 1964 includes point information 1964-1 regarding the routing session. The routing session is a media session which the relay server 13 and the client terminal 32 use for the routing control of the communication packet. "start" of the point information 1964-1 indicates a start point of the routing session, in which the identification information of the relay server 13 is set. "end" indicates an end point of the routing session, in which the identification information of the client terminal 32 is set.

FIG. 44 is referred to again below. The relay server 13 transmits the routing group information 196 to the client terminal 32 through the SIP server 101 and the relay server 33 (Steps S145, S145.1, S145.1.1). In this manner, the relay server 13 and the client terminal 32, which function as the routing devices, share the routing group information 196.

Next, the routing session is established between the relay server 13 and the client terminal 32. The relay server 13 refers to the point information 1964-1, and confirms that the device itself is set at the start point of the routing session.

The relay server 13 transmits an establishment request of the routing session to the relay server 33 through the SIP server 101 (Steps S146 and S146.1). In response to a response from the relay server 33, the relay server 13 transmits an ACK to the relay server 33 through the SIP server 101 (Steps S147 and S147.1). In response to the ACK, the relay server 33 establishes a media session between the relay servers 13 and 33 (Step S148). Moreover, a media session is established between the relay server 33 and the client terminal 32 (Steps S149, S150 and S151). This processing is similar to Steps S146 to S148 except that the media session is established without passing through the SIP server 101. The routing session is composed of the two media sessions established in Steps S148 and S151, for example.

5.5. Routing Control of Communication Packet

Figure 45:
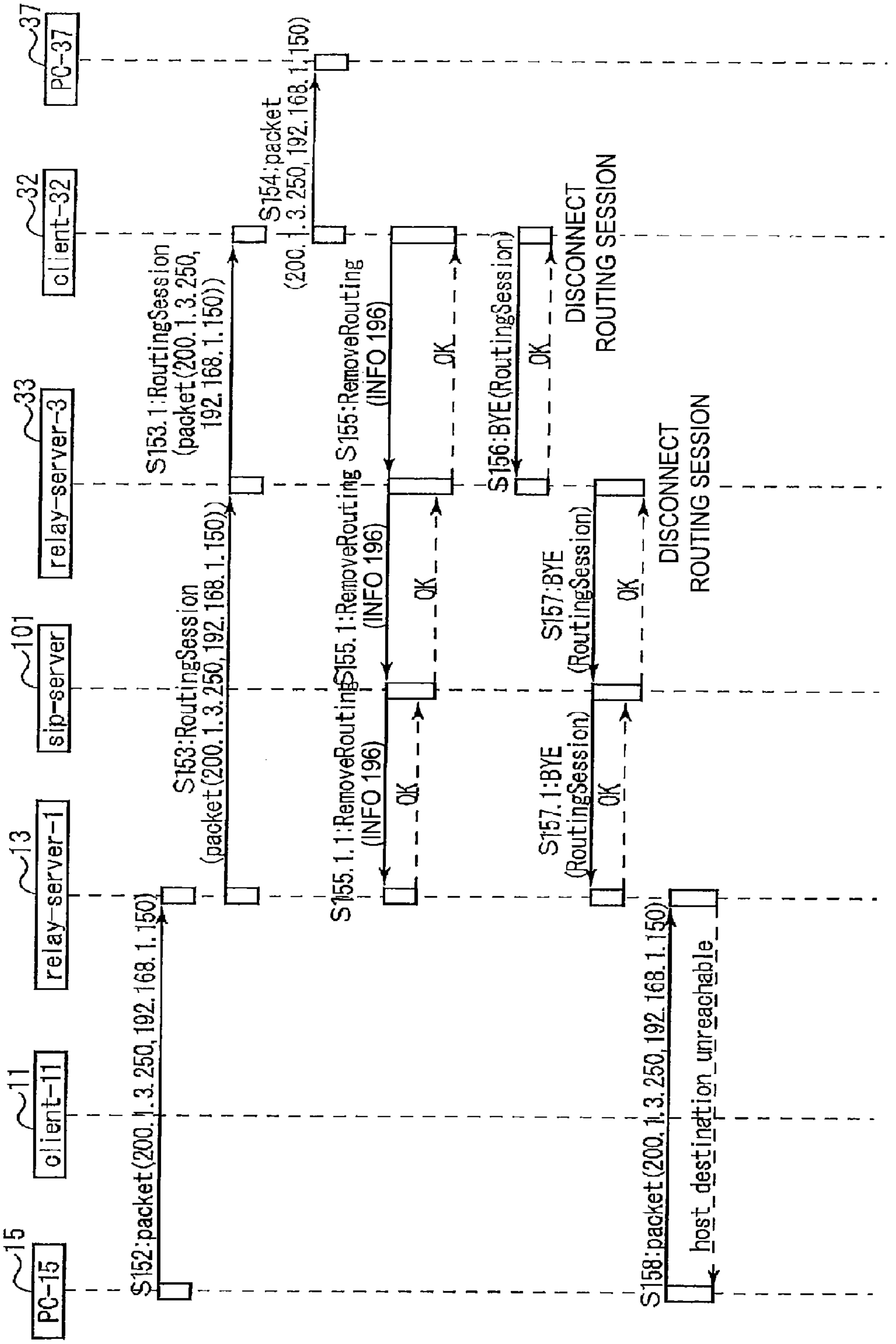
FIG. 45 is a flowchart showing routing control for the communication packet according to a preferred embodiment of the present invention.

FIG. 45 is a flowchart showing the routing control using the routing session established between the relay server 13 and the client terminal 32.

The general terminal 15 sends out a communication packet destined for the general terminal 37 (Step S152). Based on the routing group information 196, the relay server 13 determines whether or not it is possible to route the received communication packet.

First, based on the routing target information 1952, the relay server 13 determines whether or not the communication packet can be routed. An IP address "200.1.3.250" of the destination (general terminal 37) of the communication packet corresponds to the network address of the LAN 30-3 set in the network information 1952-2. An IP address "192.168.1.150" of the transmission source (general terminal 15) corresponds to the network address of the LAN 10-1 set in the network information 1952-1. Therefore, the relay server 13 determines that the received communication packet can be routed.

Next, the relay server 13 refers to the routing permission information 1963, and confirms whether or not the routing of the communication packet is permitted. The IP address of the destination (general terminal 37) of the communication packet corresponds to "200.1.3.*" set in the permitted terminal information 1963-2. Moreover, the IP address of the transmission source (general terminal 15) of the communication packet corresponds to "192.168.1.*" set in the permitted terminal information 1963-1. Therefore, the relay server 13 determines that the routing of the communication packet is permitted.

The relay server 13 sends out the communication packet, for which the routing is permitted, by using the routing session (Steps S153 and S153.1). The client terminal 32 transfers, to the general terminal 37, the communication packet received through the routing session (Step S154). The communication packet is encapsulated at the time of being transferred using the routing session, and accordingly, the general terminal 15 and 37 can communicate with each other without being conscious of the presence of the WAN 100. That is to say, the general terminals 15 and 37 can communicate with each other through the WAN 100 by using the private IP addresses.

As described above, the routing function according to this preferred embodiment is validated by sharing the routing group information 196 between the relay server 13 and the client terminal 32, which can communicate with each other. Then, by using the routing session established for the routing, the routing control for the IP packet is performed based on the function of the relay communication system. Accordingly, the routing validated in this preferred embodiment is executed in the application layer, and differs from conventional IP routing.

Next, a description will be provided of a flow of the end of the routing. In response to an instruction to end the routing, which is based on the routing group information 196, the client terminal 32 deletes the routing group information 196. Such an end instruction is transmitted to the relay server 13 through the relay server 33 and the SIP server 101 (Steps S155, S155.1 and S155.1.1). Based on the end instruction, the relay server 13 deletes the routing group information 196.

When having received a response to the end instruction, the client terminal 32 transmits a disconnection request of the routing session to the relay server 33 (Step S156). Based on the disconnection request, the media session between the client terminal 32 and the relay server 33 in the routing session is disconnected. In a similar manner, in the routing session, the media session between the relay servers 13 and 33 is disconnected (Steps S157 and S157.1). In this manner, the routing processing that is based on the routing group information 196 is ended.

Following the end of the routing processing, the communication between the general terminals 15 and 37 becomes impossible. Even if the general terminal 15 sends out a communication packet destined for the general terminal 37 (Step S158), the relay server 13 cannot recognize the destination of the received communication packet since the relay server 13 does not have the routing group information 196. Therefore, the relay server 13 notifies the general terminal 15 that the communication packet cannot reach the destination.

As described above, the relay communication system of this preferred embodiment automatically creates the routing setting information in which the network address of the designated LAN and the relay server or the client terminal, which functions as the routing device, are associated with each other. Therefore, the creation of the routing setting information used as the route information in the routing using the relay communication system is simplified. Moreover, even if the configuration of the relay communication system is changed, it is easy to create routing setting information corresponding to the configuration of the relay communication system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A relay communication system comprising:

a first relay server connected to a first LAN; and a second relay server connected to a second LAN; wherein the first relay server and the second relay server are connected to each other;

the first relay server includes:

a relay server information sharing unit configured to share relay server information with the second relay server, the relay server information including activation information of the first relay server and the second relay server, and activation/registration information of client terminals connected to the first relay server and the second relay server;

an acquisition unit configured to acquire first specifying information specifying a first routing device, which is either the first relay server or a first one of the client terminals, the first routing device executing routing control for the first LAN based on a network address of the first LAN;

a request unit configured to request the second relay server to provide second specifying information specifying a second routing device, which is either the second relay server or a second one of the client terminals, the second routing device executing routing control for the second LAN based on a network address of the second LAN; and a routing setting information creation unit configured to create routing setting information based on the first specifying information and the second specifying information, the routing setting information including information in which the network address of the first LAN and the first routing device are associated with each other, and information in which the network address of the second LAN and the second routing device are associated with each other, the second relay server includes:

a response unit configured to, in response to a request from the request unit, acquire the second specifying information, and transmit the second specifying information to the first relay server;

each of the first relay server and the second relay server includes:

a sharing unit configured to share the routing setting information; and a routing control unit configured to, upon receiving a request to start routing control, specify the first routing device and the second routing device based on the routing setting information, establish a routing session between the first routing device and the second routing device based on the relay server information, execute routing control for a communication packet between the first LAN and the second LAN through the routing session, and, upon receiving an instruction to end the routing control, disconnect the routing session, and end the routing control for the communication packet between the first LAN and the second LAN; and when a communication packet destined for a destination address of an IP address belonging to the second LAN is sent out from a communication terminal connected to the first LAN, the first routing device refers to the routing setting information to decide that routing of the communication packet to the second LAN is possible, and transfers the communication packet by using the established routing session.

2. The relay communication system according to claim 1, wherein the first relay server further includes:

a list creation unit configured to search for LANs capable of routing control, and create a list of the LANs; and a selection unit configured to select the network address of the first LAN and the network address of the second LAN by using the list.

3. The relay communication system according to claim 1, wherein the first routing device is the first one of the client terminals, which is connected to the first relay server, and is configured to perform communication with the second relay server through the first relay server; and the first one of the client terminals shares the routing setting information with the first relay server and the second relay server.

4. The relay communication system according to claim 1, wherein the second routing device is the second relay server.

5. The relay communication system according to claim 1, wherein the acquisition unit of the first relay server acquires the first specifying information from another one of the client terminals in response to receiving a route search command in which network addresses are set;

the request unit of the first relay server sends the route search command, in which the network addresses are set, to the second relay server;

the response unit of the second relay server acquires the second specifying information which corresponds to the network addresses, and transmits the second specifying information to the first relay server;

the routing setting information creation unit of the first relay server creates the routing setting information based on the first specifying information and the second specifying information, and transmits the routing setting information to the another one of the client terminals;

the routing control unit establishes a routing session between the first routing device and the second routing device upon receiving a request to start routing control from the another one of the client terminals.

6. A first relay server for use in a relay communication system in which the first relay server connected to a first LAN and a second relay server connected to a second LAN are connected to each other, the first relay server comprising:

a relay server information sharing unit configured to share relay server information with the second relay server, the relay server information including activation information of the first relay server and the second relay server, and activation/registration information of client terminals connected to the first relay server and the second relay server;

an acquisition unit configured to acquire first specifying information specifying a first routing device, which is either the first relay server or a first one of the client terminals, executing routing control for the first LAN based on a network address of the first LAN;

a request unit configured to request the second relay server to provide second specifying information specifying a second routing device, which is either the second relay server or a second one of the client terminals, executing routing control for the second LAN based on a network address of the second LAN;

a routing setting information creation unit configured to create routing setting information based on the first specifying information and the second specifying information, the routing setting information including information in which the network address of the first LAN and the first routing device are associated with each other, and information in which the network address of the second LAN and the second routing device are associated with each other; wherein each of the first relay server and the second relay server includes:

a sharing unit configured to share the routing setting information with the second relay server; and a routing control unit configured to, upon receiving a start request of routing control, specify the first routing device and the second routing device based on the routing setting information, establish a routing session between the first routing device and the second routing device based on the relay server information, execute routing control for a communication packet between the first LAN and the second LAN through the routing session, and, upon receiving an instruction to end the routing control, disconnect the routing session, and end the routing control for the communication packet between the first LAN and the second LAN;

the second relay server further includes a response unit configured to, in response to a request from the request unit, acquire the second specifying information, and transmit the second specifying information to the first relay server; and when a communication packet destined for a destination address of an IP address belonging to the second LAN is sent out from a communication terminal connected to the first LAN, the first routing device refers to the routing setting information to decide that routing of the communication packet to the second LAN is possible, and transfers the communication packet by using the established routing session.

7. The first relay server according to claim 6, wherein:

the acquisition unit is arranged to acquire the first specifying information, in response to receiving a route search command, in which network addresses are set, from another one of the client terminals;

the request unit sends the route search command, in which the network addresses are set, to the second relay server;

the routing setting information creation unit is arranged to create the routing setting information based on the first specifying information and the second specifying information, and to transmit the routing setting information to the another one of the client terminals;

the routing control unit establishes a routing session between the first routing device and the second routing device upon receiving a request to start routing control from the another one of the client terminals.

* * * * *